United States Patent
Negus et al.

(10) Patent No.: US 9,252,857 B2
(45) Date of Patent: Feb. 2, 2016

(54) EMBEDDED CONTROL SIGNALING FOR WIRELESS SYSTEMS

(71) Applicant: CBF NETWORKS, INC., San Jose, CA (US)

(72) Inventors: Kevin J. Negus, Hyattville, WY (US); James A. Proctor, Jr., Melbourne Beach, FL (US)

(73) Assignee: CBF Networks, Inc., San Jose, CA (US)

( * ) Notice: Subject to any disclaimer, the term of this patent is extended or adjusted under 35 U.S.C. 154(b) by 0 days.

(21) Appl. No.: 14/535,972

(22) Filed: Nov. 7, 2014

(65) Prior Publication Data

US 2015/0063487 A1    Mar. 5, 2015

Related U.S. Application Data

(63) Continuation of application No. 14/146,891, filed on Jan. 3, 2014, now Pat. No. 8,897,340, which is a continuation of application No. 13/763,530, filed on Feb. 8, 2013, now Pat. No. 8,649,418.

(51) Int. Cl.
*H04L 1/02* (2006.01)
*H04B 7/04* (2006.01)
(Continued)

(52) U.S. Cl.
CPC ............ *H04B 7/0486* (2013.01); *H04B 7/0413* (2013.01); *H04B 7/15* (2013.01); *H04B 7/15592* (2013.01); *H04B 7/10* (2013.01)

(58) Field of Classification Search
CPC ...... H04B 7/0417; H04B 7/0413; H04B 3/36; H04B 7/15; H04B 7/15528; H04B 7/15578; H04B 10/0777; H04L 1/06; H04L 1/0186

USPC .......... 375/267, 211; 370/316, 315; 455/13.1, 455/15
See application file for complete search history.

(56) References Cited

U.S. PATENT DOCUMENTS

| 6,253,060 B1 | 6/2001 | Komara et al. |
| D532,780 S | 11/2006 | Proctor, Jr. et al. |

(Continued)

FOREIGN PATENT DOCUMENTS

| WO | WO 204/001892 A2 | 12/2003 |
| WO | WO 2004/001986 A2 | 12/2003 |

OTHER PUBLICATIONS

Office Action in U.S. Appl. No. 13/763,530, dated May 28, 2013.
(Continued)

*Primary Examiner* — Khai Tran
(74) *Attorney, Agent, or Firm* — Nixon Peabody LLP

(57) ABSTRACT

Enhancement of wireless Channel Order and rank (ECHO) systems and ECHO repeater devices for enhancement of a wireless propagation channel for point to point or point to multipoint radio configurations are disclosed. The enhancement may be used for MIMO communications channels. Aspects support a richer multipath environment to increase the rank of the channel propagation matrix and/or to increase the magnitude of the coefficients of the propagation matrix between two or more radios. Such enhancement is applicable to backhaul radios in terms of increased range or in the number of supportable information streams. The installation provisioning optimization control monitoring and adaptation of such devices within a network of backhaul radios is also disclosed. Wireless links and control between IBR and ECHO devices and between ECHO devices and other ECHO devices are also disclosed.

30 Claims, 36 Drawing Sheets

(51) Int. Cl.
*H04B 7/15* (2006.01)
*H04B 7/155* (2006.01)
*H04B 7/10* (2006.01)

(56) References Cited

U.S. PATENT DOCUMENTS

| | | | |
|---|---|---|---|
| 7,187,904 | B2 | 3/2007 | Gainey et al. |
| 7,200,134 | B2 | 4/2007 | Proctor, Jr. et al. |
| 7,230,935 | B2 | 6/2007 | Proctor, Jr. et al. |
| 7,233,771 | B2 | 6/2007 | Proctor, Jr. et al. |
| 7,299,005 | B1 * | 11/2007 | Yarkosky et al. .......... 455/7 |
| 7,463,200 | B2 | 12/2008 | Gainey et al. |
| 7,592,969 | B2 | 9/2009 | Proctor, Jr. et al. |
| 7,613,232 | B2 * | 11/2009 | Meir et al. .......... 375/211 |
| 7,733,285 | B2 | 6/2010 | Gainey et al. |
| 7,787,408 | B2 | 8/2010 | Proctor, Jr. et al. |
| 7,893,889 | B2 | 2/2011 | Proctor, Jr. et al. |
| 7,907,513 | B2 | 3/2011 | Proctor, Jr. et al. |
| 7,907,891 | B2 | 3/2011 | Proctor, Jr. et al. |
| 7,911,985 | B2 | 3/2011 | Proctor, Jr. et al. |
| 7,990,904 | B2 | 8/2011 | Proctor, Jr. et al. |
| 8,023,885 | B2 | 9/2011 | Proctor, Jr. et al. |
| 8,027,642 | B2 | 9/2011 | Proctor, Jr. et al. |
| 8,059,727 | B2 | 11/2011 | Proctor, Jr. et al. |
| 8,060,009 | B2 | 11/2011 | Gainey et al. |
| 8,078,100 | B2 | 12/2011 | Proctor, Jr. et al. |
| 8,089,913 | B2 | 1/2012 | Proctor, Jr. et al. |
| 8,095,067 | B2 | 1/2012 | Gainey et al. |
| 8,111,645 | B2 | 2/2012 | Proctor, Jr. et al. |
| 8,116,239 | B2 | 2/2012 | Proctor, Jr. et al. |
| 8,121,535 | B2 | 2/2012 | Proctor, Jr. et al. |
| 8,122,134 | B2 | 2/2012 | Proctor, Jr. et al. |
| 8,649,418 | B1 | 2/2014 | Negus et al. |
| 8,897,340 | B2 | 11/2014 | Negus et al. |
| 2004/0157551 | A1 | 8/2004 | Gainey et al. |
| 2004/0176026 | A1 | 9/2004 | Gainey et al. |
| 2006/0141929 | A1 | 6/2006 | Lockie et al. |
| 2008/0136736 | A1 | 6/2008 | Proctor et al. |
| 2008/0225758 | A1 | 9/2008 | Proctor et al. |
| 2008/0225775 | A1 | 9/2008 | Proctor et al. |
| 2008/0225929 | A1 | 9/2008 | Proctor et al. |
| 2008/0225930 | A1 | 9/2008 | Proctor et al. |
| 2008/0225931 | A1 | 9/2008 | Proctor et al. |
| 2008/0232241 | A1 | 9/2008 | Proctor et al. |
| 2008/0311848 | A1 | 12/2008 | Proctor, Jr. et al. |
| 2009/0135745 | A1 | 5/2009 | Gainey et al. |
| 2009/0290526 | A1 | 11/2009 | Gainey et al. |
| 2009/0323582 | A1 | 12/2009 | Proctor, Jr. et al. |
| 2010/0002620 | A1 | 1/2010 | Proctor, Jr. et al. |
| 2010/0080151 | A1 | 4/2010 | Proctor, Jr. et al. |
| 2010/0165910 | A1 | 7/2010 | Mathews et al. |
| 2010/0284445 | A1 | 11/2010 | Barriac et al. |
| 2010/0284447 | A1 | 11/2010 | Gore et al. |
| 2010/0285733 | A1 | 11/2010 | Gore et al. |
| 2010/0285735 | A1 | 11/2010 | Gore et al. |
| 2010/0285736 | A1 | 11/2010 | Gore et al. |
| 2010/0291865 | A1 | 11/2010 | Gore et al. |
| 2011/0170473 | A1 | 7/2011 | Proctor, Jr. et al. |
| 2011/0299617 | A1 | 12/2011 | Maddah-Ali et al. |
| 2012/0001738 | A1 | 1/2012 | Hilgers |
| 2012/0002586 | A1 | 1/2012 | Gainey et al. |
| 2012/0015603 | A1 | 1/2012 | Proctor, Jr. et al. |
| 2012/0015608 | A1 | 1/2012 | Proctor, Jr. et al. |
| 2012/0033571 | A1 | 2/2012 | Shimezawa et al. |
| 2012/0115412 | A1 | 5/2012 | Gainey et al. |

OTHER PUBLICATIONS

Amendment and Response to Office Action in U.S. Appl. No. 13/763,530, dated Aug. 28, 2013.
Applicant Initiated Interview Summary with Examiner in U.S. Appl. No. 13/763,530, dated Oct. 3, 2013.
Notice of Allowance in U.S. Appl. No. 13/763,530 dated Oct. 3, 2013.
Applicant Summary of Interview with Examiner in U.S. Appl. No. 13/763,530, dated Oct. 30, 2013.
Office Action in U.S. Appl. No. 14/146,891, dated Mar. 7, 2014.
Amendment and Response to Office Action in U.S. Appl. No. 14,146,891, dated Jun. 9, 2014.
Notice of Allowance in U.S. Appl. No. 14/146,891 dated Jul. 25, 2014.

* cited by examiner $$H = \begin{bmatrix} h_{11} & h_{12} \\ h_{21} & h_{22} \end{bmatrix} \quad \text{Eq 4-1}$$

Where, H is a matrix of order M by N. ( M rows and N columns)

$h_{mn}$ is a complex number (potentially with a dependence on frequency) and represents the gain and phase of the wireless channel from the $n^{th}$ transmitter to the $n^{th}$ receiver $$H = \begin{bmatrix} h_{1,1} & \cdots & h_{1,n} & \cdots & h_{1,N} \\ \vdots & \ddots & \vdots & \ddots & \vdots \\ h_{m,1} & \cdots & h_{m,n} & \cdots & h_{m,N} \\ \vdots & \ddots & \vdots & \ddots & \vdots \\ h_{M,1} & \cdots & h_{M,n} & \cdots & h_{M,N} \end{bmatrix}$$

Eq 7-1

Where,

H is a matrix of order M by N, (M rows and N columns)

$h_{mn}$ represents the frequency response of the wireless channel from the $m^{th}$ transmitter to the $n^{th}$ receiver $$h_{m,n} = \sum_{k=1}^{K} \prod_{s=1}^{S(k,m,n)} L_s$$

Eq 7-2

Where,

K is the number of propagation channels from the $m^{th}$ transmitter to the $n^{th}$ receiver S is the number of sequential propagation segments of the $k^{th}$ propagation channel from the $m^{th}$ transmitter to the $n^{th}$ receiver Ls designates an individual propagation segment,
where:

$L_s =$     $h_s$ if $s = S(k,m,n)$     : the propagation segment terminates with the $n^{th}$ receiver
          $h_s \times g_{Es}$ if $s < S(k,m,n)$     : the propagation segment terminates with an ECHO device Eq 7-3 where, $h_s$ represents the frequency response of the wireless propagation channel of the $s^{th}$ segment $g_{Es}$ represents the frequency response of the $s^{th}$ ECHO device (including gain)

FIG. 7

EMBEDDED CONTROL SIGNALING FOR WIRELESS SYSTEMS

PRIORITY

The present application is a continuation application of U.S. patent application Ser. No. 14/146,891, filed on Jan. 3, 2014, entitled "ENHANCEMENT OF THE CHANNEL PROPAGATION MATRIX ORDER AND RANK FOR A WIRELESS CHANNEL", which is a continuation of U.S. patent application Ser. No. 13/763,530, filed on Feb. 8, 2013, entitled "ENHANCEMENT OF THE CHANNEL PROPAGATION MATRIX ORDER AND RANK FOR A WIRELESS CHANNEL", the entirety of which is hereby incorporated by reference.

BACKGROUND

1. Field

The present disclosure relates generally to data networking and in particular to a backhaul radio for connecting remote edge access networks to core networks.

2. Related Art

Data networking traffic has grown at approximately 100% per year for over 20 years and continues to grow at this pace. Only transport over optical fiber has shown the ability to keep pace with this ever-increasing data networking demand for core data networks. While deployment of optical fiber to an edge of the core data network would be advantageous from a network performance perspective, it is often impractical to connect all high bandwidth data networking points with optical fiber at all times. Instead, connections to remote edge access networks from core networks are often achieved with wireless radio, wireless infrared, and/or copper wireline technologies.

Radio, especially in the form of cellular or wireless local area network (WLAN) technologies, is particularly advantageous for supporting mobility of data networking devices. However, cellular base stations or WLAN access points inevitably become very high data bandwidth demand points that require continuous connectivity to an optical fiber core network.

When data aggregation points, such as cellular base station sites, WLAN access points, or other local area network (LAN) gateways, cannot be directly connected to a core optical fiber network, then an alternative connection, using, for example, wireless radio or copper wireline technologies, must be used. Such connections are commonly referred to as "backhaul."

Many cellular base stations deployed to date have used copper wireline backhaul technologies such as T1, E1, DSL, etc. when optical fiber is not available at a given site. However, the recent generations of HSPA+ and LTE cellular base stations have backhaul requirements of 100 Mb/s or more, especially when multiple sectors and/or multiple mobile network operators per cell site are considered. WLAN access points commonly have similar data backhaul requirements. These backhaul requirements cannot be practically satisfied at ranges of 300 m or more by existing copper wireline technologies. Even if LAN technologies such as Ethernet over multiple dedicated twisted pair wiring or hybrid fiber/coax technologies such as cable modems are considered, it is impractical to backhaul at such data rates at these ranges (or at least without adding intermediate repeater equipment). Moreover, to the extent that such special wiring (i.e., CAT 5/6 or coax) is not presently available at a remote edge access network location; a new high capacity optical fiber is advantageously installed instead of a new copper connection.

Rather than incur the large initial expense and time delay associated with bringing optical fiber to every new location, it has been common to backhaul cell sites, WLAN hotspots, or LAN gateways from offices, campuses, etc. using microwave radios. An exemplary backhaul connection using the microwave radios 132 is shown in FIG. 1. Traditionally, such microwave radios 132 for backhaul have been mounted on high towers 112 (or high rooftops of multi-story buildings) as shown in FIG. 1, such that each microwave radio 132 has an unobstructed line of sight (LOS) 136 to the other. These microwave radios 132 can have data rates of 100 Mb/s or higher at unobstructed LOS ranges of 300 m or longer with latencies of 5 ms or less (to minimize overall network latency).

Traditional microwave backhaul radios 132 operate in a Point-to-point (PTP) configuration using a single "high gain" (typically >30 dBi or even >40 dBi) antenna at each end of the link 136, such as, for example, antennas constructed using a parabolic dish. Such high gain antennas mitigate the effects of unwanted multipath self-interference or unwanted co-channel interference from other radio systems such that high data rates, long range and low latency can be achieved. These high gain antennas however have narrow radiation patterns.

Furthermore, high gain antennas in traditional microwave backhaul radios 132 require very precise, and usually manual, physical alignment of their narrow radiation patterns in order to achieve such high performance results. Such alignment is almost impossible to maintain over extended periods of time unless the two radios have a clear unobstructed line of sight (LOS) between them over the entire range of separation. Furthermore, such precise alignment makes it impractical for any one such microwave backhaul radio to communicate effectively with multiple other radios simultaneously (i.e., a "point-to-multipoint" (PMP) configuration).

In wireless edge access applications, such as cellular or WLAN, advanced protocols, modulation, encoding and spatial processing across multiple radio antennas have enabled increased data rates and ranges for numerous simultaneous users compared to analogous systems deployed 5 or 10 years ago for obstructed LOS propagation environments where multipath and co-channel interference were present. In such systems, "low gain" (usually <6 dBi) antennas are generally used at one or both ends of the radio link both to advantageously exploit multipath signals in the obstructed LOS environment and allow operation in different physical orientations as would be encountered with mobile devices. Although impressive performance results have been achieved for edge access, such results are generally inadequate for emerging backhaul requirements of data rates of 100 Mb/s or higher, ranges of 300 m or longer in obstructed LOS conditions, and latencies of 5 ms or less.

In particular, "street level" deployment of cellular base stations, WLAN access points or LAN gateways (e.g., deployment at street lamps, traffic lights, sides or rooftops of single or low-multiple story buildings) suffers from problems because there are significant obstructions for LOS in urban environments (e.g., tall buildings, or any environments where tall trees or uneven topography are present).

FIG. 1 illustrates edge access using conventional unobstructed LOS PTP microwave radios 132. The scenario depicted in FIG. 1 is common for many $2^{nd}$ Generation (2G) and $3^{rd}$ Generation (3G) cellular network deployments using "macrocells". In FIG. 1, a Cellular Base Transceiver Station (BTS) 104 is shown housed within a small building 108 adjacent to a large tower 112. The cellular antennas 116 that communicate with various cellular subscriber devices 120 are mounted on the towers 112. The PTP microwave radios 132 are mounted on the towers 112 and are connected to the BTSs 104 via an nT1 interface. As shown in FIG. 1 by line 136, the radios 132 require unobstructed LOS.

The BTS on the right 104a has either an nT1 copper interface or an optical fiber interface 124 to connect the BTS 104a to the Base Station Controller (BSC) 128. The BSC 128 either is part of or communicates with the core network of the cellular network operator. The BTS on the left 104b is identical to the BTS on the right 104a in FIG. 1 except that the BTS on the left 104b has no local wireline nT1 (or optical fiber equivalent) so the nT1 interface is instead connected to a conventional PTP microwave radio 132 with unobstructed LOS to the tower on the right 112a. The nT1 interfaces for both BTSs 104a, 104b can then be backhauled to the BSC 128 as shown in FIG. 1.

FIG. 2A is a block diagram of the major subsystems of a conventional PTP microwave radio 200A for the case of Time-Division Duplex (TDD) operation, and FIG. 2B is a block diagram of the major subsystems of a conventional PTP microwave radio 200B for the case of Frequency-Division Duplex (FDD) operation.

As shown in FIG. 2A and FIG. 2B, the conventional PTP microwave radio traditionally uses one or more (i.e. up to "n") T1 interfaces 204A and 204B (or in Europe, E1 interfaces). These interfaces (204A and 204B) are common in remote access systems such as 2G cellular base stations or enterprise voice and/or data switches or edge routers. The T1 interfaces are typically multiplexed and buffered in a bridge (e.g., the Interface Bridge 208A, 208B) that interfaces with a Media Access Controller (MAC) 212A, 212B.

The MAC 212A, 212B is generally denoted as such in reference to a sub-layer of Layer 2 within the Open Systems Interconnect (OSI) reference model. Major functions performed by the MAC include the framing, scheduling, prioritizing (or "classifying"), encrypting and error checking of data sent from one such radio at FIG. 2A or FIG. 2B to another such radio. The data sent from one radio to another is generally in a "user plane" if it originates at the T1 interface(s) or in the "control plane" if it originates internally such as from the Radio Link Controller (RLC) 248A, 248B shown in FIG. 2A or FIG. 2B.

With reference to FIGS. 2A and 2B, the Modem 216A, 216B typically resides within the "baseband" portion of the Physical (PHY) layer 1 of the OSI reference model. In conventional PTP radios, the baseband PHY, depicted by Modem 216A, 216B, typically implements scrambling, forward error correction encoding, and modulation mapping for a single RF carrier in the transmit path. In receive, the modem typically performs the inverse operations of demodulation mapping, decoding and descrambling. The modulation mapping is conventionally Quadrature Amplitude Modulation (QAM) implemented with In-phase (I) and Quadrature-phase (Q) branches.

The Radio Frequency (RF) 220A, 220B also resides within the PHY layer of the radio. In conventional PTP radios, the RF 220A, 220B typically includes a single transmit chain (Tx) 224A, 224B that includes I and Q digital to analog converters (DACs), a vector modulator, optional upconverters, a programmable gain amplifier, one or more channel filters, and one or more combinations of a local oscillator (LO) and a frequency synthesizer. Similarly, the RF 220A, 220B also typically includes a single receive chain (Rx) 228A, 228B that includes I and Q analog to digital converters (ADCs), one or more combinations of an LO and a frequency synthesizer, one or more channel filters, optional downconverters, a vector demodulator and an automatic gain control (AGC) amplifier. Note that in many cases some of the one or more LO and frequency synthesizer combinations can be shared between the Tx and Rx chains.

As shown in FIGS. 2A and 2B, conventional PTP radios 200A, 200B also include a single power amplifier (PA) 232A, 232B. The PA 232A, 232B boosts the transmit signal to a level appropriate for radiation from the antenna in keeping with relevant regulatory restrictions and instantaneous link conditions. Similarly, such conventional PTP radios 232A, 232B typically also include a single low-noise amplifier (LNA) 236, 336 as shown in FIGS. 2A and 2B. The LNA 236A, 236B boosts the received signal at the antenna while minimizing the effects of noise generated within the entire signal path.

As described above, FIG. 2A illustrates a conventional PTP radio 200A for the case of TDD operation. As shown in FIG. 2A, conventional PTP radios 200A typically connect the antenna 240A to the PA 232A and LNA 236A via a band-select filter 244A and a single-pole, single-throw (SPST) switch 242A.

As described above, FIG. 2B illustrates a conventional PTP radio 200B for the case of FDD operation. As shown in FIG. 2B, in conventional PTP radios 200B, then antenna 240B is typically connected to the PA 232B and LNA 236B via a duplexer filter 244B. The duplexer filter 244B is essentially two band-select filters (tuned respectively to the Tx and Rx bands) connected at a common point.

In the conventional PTP radios shown in FIGS. 2A and 2B, the antenna 240A, 240B is typically of very high gain such as can be achieved by a parabolic dish so that gains of typically >30 dBi (or even sometimes >40 dBi), can be realized. Such an antenna usually has a narrow radiation pattern in both the elevation and azimuth directions. The use of such a highly directive antenna in a conventional PTP radio link with unobstructed LOS propagation conditions ensures that the modem 216A, 216B has insignificant impairments at the receiver (antenna 240A, 240B) due to multipath self-interference and further substantially reduces the likelihood of unwanted co-channel interference due to other nearby radio links.

Although not explicitly shown in FIGS. 2A and 2B, the conventional PTP radio may use a single antenna structure with dual antenna feeds arranged such that the two electromagnetic radiation patterns emanated by such an antenna are nominally orthogonal to each other. An example of this arrangement is a parabolic dish. Such an arrangement is usually called dual-polarized and can be achieved either by orthogonal vertical and horizontal polarizations or orthogonal left-hand circular and right-hand circular polarizations.

When duplicate modem blocks, RF blocks, and PA/LNA/switch blocks are provided in a conventional PTP radio, then connecting each PHY chain to a respective polarization feed of the antenna allows theoretically up to twice the total amount of information to be communicated within a given channel bandwidth to the extent that cross-polarization self-interference can be minimized or cancelled sufficiently. Such a system is said to employ "dual-polarization" signaling. Such systems may be referred to as having two "streams" of information, whereas multiple input multiple output (MIMO) systems utilizing spatial multiplexing may achieve successful communications using even more than two streams, in practice.

When an additional circuit (not shown) is added to FIG. 2A that can provide either the RF Tx signal or its anti-phase equivalent to either one or both of the two polarization feeds of such an antenna, then "cross-polarization" signaling can be used to effectively expand the constellation of the modem within any given symbol rate or channel bandwidth. With two polarizations and the choice of RF signal or its anti-phase, then an additional two information bits per symbol can be communicated across the link. Theoretically, this can be extended and expanded to additional phases, representing additional information bits. At the receiver, for example, a circuit (not shown) could detect if the two received polarizations are anti-phase with respect to each other, or not, and then combine appropriately such that the demodulator in the modem block can determine the absolute phase and hence deduce the values of the two additional information bits. Cross-polarization signaling has the advantage over dual-polarization signaling in that it is generally less sensitive to cross-polarization self-interference but for high order constellations such as 64-QAM or 256-QAM, the relative increase in channel efficiency is smaller.

In the conventional PTP radios shown in FIGS. 2A and 2B, substantially all the components are in use at all times when the radio link is operative. However, many of these components have programmable parameters that can be controlled dynamically during link operation to optimize throughput and reliability for a given set of potentially changing operating conditions. The conventional PTP radios of FIGS. 2A and 2B control these link parameters via a Radio Link Controller (RLC) 248A, 248B. The RLC functionality is also often described as a Link Adaptation Layer that is typically implemented as a software routine executed on a microcontroller within the radio that can access the MAC 212A, 212B, Modem 216A, 216B, RF 220A, 220B and/or possibly other components with controllable parameters. The RLC 248A, 248B typically can both vary parameters locally within its radio and communicate with a peer RLC at the other end of the conventional PTP radio link via "control frames" sent by the MAC 212A, 212B with an appropriate identifying field within a MAC Header.

Typical parameters controllable by the RLC 248A, 248B for the Modem 216A, 216B of a conventional PTP radio include encoder type, encoding rate, constellation selection and reference symbol scheduling and proportion of any given PHY Protocol Data Unit (PPDU). Typical parameters controllable by the RLC 248A, 248B for the RF 220A, 220B of a conventional PTP radio include channel frequency, channel bandwidth, and output power level. To the extent that a conventional PTP radio employs two polarization feeds within its single antenna, additional parameters may also be controlled by the RLC 248A, 248B as self-evident from the description above.

In conventional PTP radios, the RLC 248A, 248B decides, usually autonomously, to attempt such parameter changes for the link in response to changing propagation environment characteristics such as, for example, humidity, rain, snow, or co-channel interference. There are several well-known methods for determining that changes in the propagation environment have occurred such as monitoring the receive signal strength indicator (RSSI), the number of or relative rate of FCS failures at the MAC 212A, 212B, and/or the relative value of certain decoder accuracy metrics. When the RLC 248A, 248B determines that parameter changes should be attempted, it is necessary in most cases that any changes at the transmitter end of the link become known to the receiver end of the link in advance of any such changes. For conventional PTP radios, and similarly for many other radios, there are at least two well-known techniques which in practice may not be mutually exclusive. First, the RLC 248A, 248B may direct the PHY, usually in the Modem 216A, 216B relative to FIGS. 2A and 2B, to pre-pend a PHY layer convergence protocol (PLCP) header to a given PPDU that includes one or more (or a fragment thereof) given MPDUs wherein such PLCP header has information fields that notify the receiving end of the link of parameters used at the transmitting end of the link. Second, the RLC 248A, 248B may direct the MAC 212A, 212B to send a control frame, usually to a peer RLC 248A, 248B, including various information fields that denote the link adaptation parameters either to be deployed or to be requested or considered.

The foregoing describes at an overview level the typical structural and operational features of conventional PTP radios which have been deployed in real-world conditions for many radio links where unobstructed (or substantially unobstructed) LOS propagation was possible. The conventional PTP radio on a whole is completely unsuitable for obstructed LOS PTP or PMP operation.

More recently, as briefly mentioned, there has been significant adoption of so-called multiple input multiple output (MIMO) techniques, which utilize spatial multiplexing of multiple information streams between a plurality of transmission antennas to a plurality of receive antennas. The adoption of MIMO has been most beneficial in wireless communication systems for use in environments having significant multipath scattering propagation. One such system is IEEE802.11n for use in home networking Attempts have been made to utilize MIMO and spatial multiplexing in line of sight environments having minimal scattering, which have generally been met with failure, in contrast to the use of cross polarized communications. For example IEEE802.11n based Mesh networked nodes deployed at streetlight elevation in outdoor environments often experience very little benefit from the use of spatial multiplexing due to the lack of a rich multipath propagation environment. Additionally, many of these deployments have limited range between adjacent mesh nodes due to physical obstructions resulting in the attenuation of signal levels.

Radios and systems with MIMO capabilities intended for use in both near line of sight (NLOS) and line of sight (LOS) environments are disclosed in U.S. patent application Ser. No. 13/212,036, now U.S. Pat. No. 8,238,318, and Ser. No. 13/536,927, both of which are incorporated herein by reference, and are referred to herein by the term "Intelligent Backhaul Radio" (IBR).

FIGS. 3A and 3B illustrate exemplary embodiments of the disclosed IBRs. In FIGS. 3A and 3B, the IBRs include interfaces 304A, interface bridge 308A, MAC 312A, modem 324A, channel MUX 328A, RF 332A, which includes Tx1 . . . TxM 336A and Rx1 . . . RxN 340A, IBR Antenna Array 348A (includes multiple antennas 352A), a Radio Link Controller (RLC) 356A and a Radio Resource Controller (RRC) 360A. The IBR may optionally include an "Intelligent Backhaul Management System" (or "IBMS") agent 370B as shown in FIG. 3B. It will be appreciated that the components and elements of the IBRs may vary from that illustrated in FIGS. 3A and 3B.

Embodiments of such intelligent backhaul radios, as disclosed in the foregoing references, include one or more demodulator cores within modem 324A, wherein each demodulator core demodulates one or more receive symbol streams to produce a respective receive data interface stream; a plurality of receive RF chains 340A within IBR RF 332A to convert from a plurality of receive RF signals from IBR Antenna Array 348A, to a plurality of respective receive chain output signals; a frequency selective receive path channel multiplexer within IBR Channel multiplexer 328A, interposed between the one or more demodulator cores and the plurality of receive RF chains, to produce the one or more receive symbol streams provided to the one or more demodulator cores from the plurality of receive chain output signals;

an IBR Antenna Array (348A) including: a plurality of directive gain antenna elements 352A; and one or more selectable RF connections that selectively couple certain of the plurality of directive gain antenna elements to certain of the plurality of receive RF chains, wherein the number of directive gain antenna elements that can be selectively coupled to receive RF chains exceeds the number of receive RF chains that can accept receive RF signals from the one or more selectable RF connections; and a radio resource controller, wherein the radio resource controller sets or causes to be set the specific selective couplings between the certain of the plurality of directive gain antenna elements and the certain of the plurality of receive RF chains.

The intelligent backhaul radio may further include one or more modulator cores within IBR Modem 324A, wherein each modulator core modulates a respective transmit data interface stream to produce one or more transmit symbol streams; a plurality of transmit RF chains 336A within IBR RF 332A, to convert from a plurality of transmit chain input signals to a plurality of respective transmit RF signals; a transmit path channel multiplexer within IBR Channel MUX 328A, interposed between the one or more modulator cores and the plurality of transmit RF chains, to produce the plurality of transmit chain input signals provided to the plurality of transmit RF chains from the one or more transmit symbol streams; and, wherein the IBR Antenna Array 348A further includes a plurality of RF connections to couple at least certain of the plurality of directive gain antenna elements to the plurality of transmit RF chains.

The primary responsibility of the RLC 356A in exemplary intelligent backhaul radios is to set or cause to be set the current transmit "Modulation and Coding Scheme" (or "MCS") and output power for each active link. For links that carry multiple transmit streams and use multiple transmit chains and/or transmit antennas, the MCS and/or output power may be controlled separately for each transmit stream, chain, or antenna. In certain embodiments, the RLC operates based on feedback from the target receiver for a particular transmit stream, chain and/or antenna within a particular intelligent backhaul radio.

The intelligent backhaul radio may further include an intelligent backhaul management system agent 370B that sets or causes to be set certain policies relevant to the radio resource controller, wherein the intelligent backhaul management system agent exchanges information with other intelligent backhaul management system agents within other intelligent backhaul radios or with one or more intelligent backhaul management system servers.

FIG. 3C illustrates an exemplary embodiment of an IBR Antenna Array 348A. FIG. 3C illustrates an antenna array having Q directive gain antennas 352A (i.e., where the number of antennas is greater than 1). In FIG. 3C, the IBR Antenna Array 348A includes an IBR RF Switch Fabric 312C, RF interconnections 304C, a set of Front-ends 308C and the directive gain antennas 352C. The RF interconnections 304C can be, for example, circuit board traces and/or coaxial cables. The RF interconnections 304C connect the IBR RF Switch Fabric 312C and the set of Front-ends 308C. Each Front-end 308C is associated with an individual directive gain antenna 352A, numbered consecutively from 1 to Q.

FIG. 3D illustrates an exemplary embodiment of the Front-end circuit 308C of the IBR Antenna Array 348A of FIG. 3C for the case of TDD operation, and FIG. 3E illustrates an exemplary embodiment of the Front-end circuit 308C of the IBR Antenna Array 348A of FIG. 3C for the case of FDD operation. The Front-end circuit 308C of FIG. 3E includes a transmit power amplifier PA 304D, a receive low noise amplifier LNA 308D, SPDT switch 312D and band-select filter 316D. The Front-end circuit 308C of FIG. 3E includes a transmit power amplifier PA 304E, receive low noise amplifier LNA 308E, and duplexer filter 312E. These components of the Front-end circuit are substantially conventional components available in different form factors and performance capabilities from multiple commercial vendors.

As shown in FIGS. 3D and 3E, each Front-end 308E also includes an "Enable" input 320D, 320E that causes substantially all active circuitry to power-down. Power-down techniques are well known. Power-down is advantageous for IBRs in which not all of the antennas are utilized at all times. It will be appreciated that alternative embodiments of the IBR Antenna Array may not utilize the "Enable" input 320D, 320E or power-down feature. Furthermore, for embodiments with antenna arrays where some antenna elements are used only for transmit or only for receive, then certain Front-ends (not shown) may include only the transmit or only the receive paths of FIGS. 3D and 3E as appropriate.

As described above, each Front-end (FE-q) corresponds to a particular directive gain antenna 352A. Each antenna 352A has a directivity gain Gq. For IBRs intended for fixed location street-level deployment with obstructed LOS between IBRs, whether in PTP or PMP configurations, each directive gain antenna 352A may use only moderate directivity compared to antennas in conventional PTP systems at a comparable RF transmission frequency.

In the exemplary IBR Antenna Array 348A illustrated in FIGS. 3A, 3B and 3C, the total number of individual antenna elements 352A, Q, is greater than or equal to the larger of the number of RF transmit chains 336A, M, and the number of RF receive chains 340A, N. In some embodiments, some or all of the antennas 352A may be split into pairs of polarization diverse antenna elements realized by either two separate feeds to a nominally single radiating element or by a pair of separate orthogonally oriented radiating elements. Such cross polarization antenna pairs enable either increased channel efficiency or enhanced signal diversity as described for the conventional PTP radio. The cross-polarization antenna pairs as well as any non-polarized antennas are also spatially diverse with respect to each other. Additionally, the individual antenna elements may also be oriented in different directions to provide further channel propagation path diversity.

Additional embodiments supporting MIMO technology in specific embodiments include the use so-called zero division duplexed (ZDD) intelligent backhaul radios (ZDD-IBR), as disclosed in U.S. patent application Ser. No. 13/609,156, which is additionally incorporated herein by reference.

Embodiments of the ZDD systems provide for the operation of a IBR wherein the ZDD-IBR transmitter and receiver frequencies are close in frequency to each other so as to make the use of frequency division duplexing, as known in the art, impractical. Arrangements of ZDD operation disclosed in the foregoing referenced application include so-called "co-channel" embodiments wherein the transmit frequency channels in use by a ZDD-IBR, and the receive frequencies are partially or entirely overlapped in the frequency spectrum. Additionally disclosed embodiments of ZDD-IBRs include so-called "co-band" ZDD operation wherein the channels of operation of the ZDD-IBR are not directly overlapped with the ZDD-IBR receive channels of operation, but are close enough to each other so as to limit the performance the system. For example, at specific receiver and transmitter frequency channel separation, the frequency selectivity of the channel selection filters in an IBR transmitter and receiver chains may be insufficient to isolate the receiver(s) from the transmitter signal(s) or associated noise and distortion, resulting in significant de-sensitization of the IBR's receiver(s) performance at specific desired transmit power levels, without the use of disclosed ZDD techniques. Embodiments of the disclosed ZDD-IBRs include the use of radio frequency, intermediate frequency and base band cancelation of reference transmitter and interference signals from the ZDD-IBR receivers in a MIMO configuration. Such disclosed ZDD techniques utilize the estimation of the channels from the plurality of IBR transmitters to the plurality of IBR receivers of the same intelligent backhaul radio, and the adaptive filtering of the reference signals based upon the channel estimates so as to allow the cancelation the transmitter signals from the receivers utilizing such estimated cancelation signals. Such ZDD techniques allow for increased isolation between the desired receive signals and the ZDD-IBR's transmitters in various embodiments including MIMO configurations.

Referring now to FIG. 4A the MIMO channel matrix is depicted. Transceiver MIMO Station 405 is in communication with MIMO Station 410 utilizing MIMO channel matrix (Eq.4-1) of FIG. 4B between the 2 stations of FIG. 4A. In an example of a two-by-two MIMO system, two spatial streams are utilized between the two MIMO stations. The channel propagation matrix of Eq.4-1 is of order M by N comprised of M rows and N columns. A particular element of the channel propagation matrix, $h_{mn}$, represents the frequency response of the wireless channel from the $n^{th}$ transmitter to the $m^{th}$ receiver. Therefore each element of the channel propagation matrix H is comprised of an individual complex number, if the channel is "frequency flat," or a complex function of frequency, if the channel is "frequency selective," which represents the amplitude and phase of the propagation channel between one transmitter and one receiver of MIMO Stations 405 and 410. Often, the channel propagation matrix and the individual propagation coefficients are frequency selective, meaning that the complex value of the coefficients vary as a function of frequency as mentioned. In a rich, multipath scattering environment, as depicted in FIG. 4C, in which sufficient signal strength reaches an intended receiver but is scattered amongst the various structures between a particular MIMO transmitter and MIMO receiver, the spatial distribution of the arriving signals is referred to as a rich multipath environment in which there is a significant angular scattering among the receiving signals at the intended receiver.

In order to separate the MIMO streams received at an intended receiver, such as MIMO Station 410 or MIMO Station 405, the channel propagation matrix H must be determined, as known in the art. The process of determining the channel propagation matrix is often performed utilizing pilot channels, preambles, and/or symbols or other known reference information. Examples of prior art systems utilizing such techniques include IEEE 802.11n, LTE, or HSPA, as well as various embodiments of intelligent backhaul radios described in U.S. Pat. No. 8,238,818 and U.S. patent application Ser. Nos. 13/536,927 and 13/609,156, which are hereby incorporated by reference in their entireties.

In order for MIMO systems (including the foregoing mentioned MIMO systems) to support a plurality of spatial MIMO streams, the order of the propagation matrix (referenced as Eq. 4-1) must exceed the desired number of streams. While this condition is necessary, it is not sufficient. The rank of the matrix must also exceed the number of desired spatial streams. The rank of a matrix is the maximum number of linearly independent column vectors of the propagation matrix. Such terminology is known in the art with respect to linear algebra. The number of supportable MIMO streams must be less than or equal to the rank of the channel propagation matrix. When the propagation coefficients from multiple transmitters of a MIMO station to a plurality of intended receive antennas are correlated, the number of linearly independent column vectors of the channel propagation matrix H is reduced and consequently the system supports fewer MIMO streams. Such a condition often occurs in environments where a small angular spread at the desired intended receiver is present, such as is the case with a line-of-sight environment where the two MIMO stations are a significant distance apart, such that the angular resolution of the receiving antennas at MIMO Station 410 is insufficient to resolve and separate the signals transmitted from the plurality of transmitters at MIMO Station 405. Such a condition is referred to as an ill-conditioned channel matrix for the desired number of streams in the MIMO system, due to the rank of the channel propagation matrix (i.e. the number of linearly independent column vectors) being less than the desired number of MIMO streams between the two MIMO stations. The reason that the rank of the channel propagation matrix is required to be greater than or equal to the desired number of MIMO streams is related to how the individual streams are separated from one another at the intended receiving MIMO station. As is known in the art, the MIMO performance is quite sensitive to the invertability of the channel propagation matrix. Such invertability, as previously mentioned, may be compromised by the receiving antenna correlation, which may be caused by close antenna spacing or small angular spread at the intended MIMO receiver. The line-of-sight condition between two MIMO stations may result in such a small angular spread between the MIMO receivers, resulting in the channel matrix being noninvertible or degenerate. Multipath fading, which often results from large angular spreads amongst individual propagation proponents between two antennas, enriches the condition of the channel propagation matrix, making the individual column vectors linearly independent and allowing the channel propagation matrix to be invertible. The inversion of the channel propagation matrix results in weights (vectors), which are utilized with the desired receive signals to separate the linear combination of transmitted streams into individual orthogonal streams, allowing for proper reception of each individual stream from spatially multiplexed composite information streams. In a line-of-sight environment, all of the column vectors of the channel propagation matrix H may be highly correlated, resulting in a matrix rank of 1 or very close to 1. Such a matrix is noninvertible and ill-conditioned, resulting in the inability to support spatial multiplexing and additional streams (other than by the use of polarization multiplexing, which provides for only 2 streams as discussed).

FIG. 4C illustrates an exemplary deployment of intelligent backhaul radios (IBRs). As shown in FIG. 4C, the IBRs 400C are deployable at street level with obstructions such as trees 404C, hills 408C, buildings 412C, etc. between them. Embodiments of intelligent backhaul radios (IBRs) are discussed in U.S. Pat. No. 8,238,318, and co-pending U.S. patent application Ser. No. 13/536,927, the entities of which are hereby incorporated by reference. The IBRs 400C are also deployable in configurations that include point-to-multipoint (PMP), as shown in FIG. 4C, as well as point-to-point (PTP). In other words, each IBR 400C may communicate with more than one other IBR 400C.

For 3G, and especially for $4^{th}$ Generation (4G), cellular network infrastructure is more commonly deployed using "microcells" or "picocells." In this cellular network infrastructure, compact base stations (eNodeBs) 416C are situated outdoors at street level. When such eNodeBs 416C are unable to connect locally to optical fiber or a copper wireline of sufficient data bandwidth, then a wireless connection to a fiber "point of presence" (POP) requires obstructed LOS capabilities, as described herein.

For example, as shown in FIG. 4C, the IBRs 400C include an Aggregation End IBR (AE-IBR) and Remote End IBRs (RE-IBRs). The eNodeB 416C of the AE-IBR is typically connected locally to the core network via a fiber POP 420C. The RE-IBRs and their associated eNodeBs 416C are typically not connected to the core network via a wireline connection; instead, the RE-IBRs are wirelessly connected to the core network via the AE-IBR. As shown in FIG. 4C, the wireless connection between the IBRs include obstructions (i.e., there may be an obstructed LOS connection between the RE-IBRs and the AE-IBR). Note that the Tall Building 412C substantially impedes the signal transmitted from RE-IBR 400C to AR-IBR 400C. Additionally, in at least one example scenario, the tree (404C) provides unacceptable signal attenuation between an RE-IBR 400C and the AE-IBR 400C.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments of the invention support a richer multipath environment or otherwise enhance the propagation matrix between either point-to-point or point-to-multipoint radios. Embodiments of the invention provide a device to increase the rank of the channel propagation matrix or to increase the magnitude of the coefficients of the propagation matrix between two radios. Some embodiments of the invention are directed to devices to enhance the performance of either point-to-point or point-to-multipoint backhaul radios in one or both of range or of number of supportable information streams. Further embodiments of the invention are directed to devices to provide for flexibility in deployment scenarios of either point-to-point or point-to-multipoint backhaul radios. Yet other embodiments of the invention are directed toward methods for and implementations enabling the installation, provisioning, optimization, control, monitoring, and adaptation of such devices within a network of backhaul radios. Specific embodiments include wireless communications links, and processes for communication and control. Some embodiments that provide common control communications between IBR and ECHO devices and between ECHO devices and other ECHO devices, include an embedded wireless communication signal within the existing wireless communications signals. Some embodiments utilize a direct sequence spread spectrum MODEM in one or more of the IBR and the ECHO devices, which allow for the transmission and reception of control channel signals in the presence of ongoing IBR communications. Some embodiments of the control channel signals provide a structure allowing for stream, channel, device or link specific control communications in a format referred to as a common control channel.

Yet other embodiments of the invention include methods and devices for the measurement of RF parameters and the control of RF parameters of an RF repeater device for use with backhaul radio networks. Some embodiments utilize the control channel signal properties for the optimization of various RF parameters in one or more of the IBR and ECHO devices utilizing the control channel signal properties.

Additional embodiments of the invention provide for the structure and functioning of various ECHO devices, and associated communications and control to and from other devices.

Embodiments of the invention solve the problem of a line-of-sight propagation path, wherein the multipath environment may not be rich enough to support more than two streams utilizing cross polarization in a MIMO radio configuration or more than a single stream when cross polarization is not employed. Embodiments of the invention are able to support a single stream, or a plurality of MIMO streams in environments where the propagation environment is such that the signal strength at a receiving radio is insufficient. Further embodiments of the invention provide methods for the operation of a wireless network in non-line-of-sight deployments for either point-to-point or point-to-multipoint backhaul radios to be able to support a "piecewise" line-of-sight, near line-of-sight, and/or non line-of-sight operation, wherein multiple segments of a particular link are utilized to provide a point-to-point-like propagation environment, avoiding obstructions, such as buildings or other geographical features that would otherwise unacceptably impair a link between two radios. Such features may severely attenuate the signal propagating from a transmitter to an intended receiving device in such a backhaul radio configuration, in some embodiments. Additionally, embodiments of the invention support one, two, or more streams, utilizing such MIMO configuration in a line-of-sight propagation environment, such as is present in direct line-of-sight backhaul radio configurations or in piecewise line-of-sight propagation configurations. Embodiments of the invention enhance the wireless propagation environment, such that multipath propagation (which is required for spatial multiplexing of multiple streams) is sufficient, wherein otherwise such an environment would not allow for more than two streams, where two streams in such configurations is generally supported by using cross polarization of two orthogonally polarized transmitting antennas and two orthogonally polarized receiving antennas (as discussed). Embodiments of the invention also provide for a piecewise line-of-sight configuration, utilizing a middle node, providing an enhanced wireless propagation matrix rank. Such a middle node between the two ends of either a point-to-point or a point-to-multipoint wireless link may comprise a complete demodulating radio including two transceivers with a bridging or routing function between them. Other embodiments of a middle node may utilize an RF repeater configuration, or a digital repeater configuration, which provides for less functionality in some embodiments of such a node but at a greatly reduced cost.

Embodiments of the invention include the use of ECHO devices with point-to-point and point-to-multipoint radios, such as an IBR, as disclosed in U.S. patent application Ser. No. 13/212,036, now U.S. Pat. No. 8,238,318, and Ser. No. 13/536,927, both of which are incorporated herein by reference. Additionally, further embodiments include the use of ECHO devices with so-called zero division duplexed (ZDD) intelligent backhaul radios (ZDD-IBR), as disclosed in U.S. patent application Ser. No. 13/609,156.

According to an aspect of the invention, a multiple input multiple output (MIMO) wireless communication system is disclosed that includes a first radio for transmission of a plurality of first information streams having one or more associated embedded first control signals; a second radio for reception of the plurality of first information streams and reception of one or more embedded second control signals respectively associated with one or more of the plurality of first information streams; a repeater device for repeating one or more of the plurality of first information streams, wherein the repeater device further includes one or more of each of: a channel filter for channel filtering a signal comprising at least one of the plurality of first information streams and at least one of the one or more associated embedded first control signals; a detector for performing detection of at least one of the one or more associated first embedded control signals; a repeater device controller for enabling one or more transmitters of the repeater device based upon the detection; a demodulator for demodulating at least one of the associated first embedded control signals to determine associated first control information; a modulator for generating one or more second control signals; a coupler for combining the one or more second control signals respectively with the signal comprising the one or more first information streams to produce a composite signal comprising the one or more second embedded control signals respectively associated with at least one of the one or more first information streams; a transmitter for the transmission of the composite signal; wherein the second radio further demodulates the one or more second embedded control signals to determine second control information, and communicates information within the second control information to the first radio; and wherein performance of the MIMO wireless communication system is enhanced based upon adjustment of parameters associated with one or more of: the repeater device, based upon information within the first control information; and, the first radio, based upon information within the second control information.

The one or more associated embedded first control signals may each include a signature signal. A particular signature signal may be unique to one of the one or more associated first information streams.

The particular signature signal may be orthogonal to at least one other signature signal associated with another first information stream of the plurality of first information streams.

The repeater device may utilize the information within the first control information to adjust the parameters associated with the repeater device.

In one embodiment, the repeating is only performed following detection of at least one of the one or more associated embedded first control signals.

The enhancement of the performance of the MIMO wireless communication system may include reducing a receive signal level difference between at least two of the plurality of the first information streams at the second radio.

The adjustment of parameters may set a signal level of one of the plurality of the first information streams at the repeater device relative to signal levels of one or more of the other first information streams of the plurality of first information streams to be comparable with a predetermined ratio.

The parameters may be radio frequency (RF) parameters associated with phased array weights or settings for the repeater device and may be related to at least two of the following: a first receiver signal associated with the repeater device, a second receiver signal associated with the repeater device, a first transmitter signal associated with the repeater device, and a second transmitter signal associated with the repeater device.

The parameters may be associated with digital transmit beam former weights or settings for the first radio.

The adjustment of parameters associated with the first radio may set the signal level of one of the plurality of the first information streams at the repeater device.

The adjustment of parameters associated with the repeater device may set the signal level of one of the plurality of the first information streams detected at the second radio device.

The repeater device may further include: a plurality of receive antenna structures coupled to a respective plurality of low noise amplifiers (LNAs) to provide a respective plurality of LNA output receive signals; a plurality of receive chains respectively coupled to the plurality of LNAs to receive the respective plurality of LNA output receive signals and to provide a respective plurality of receive chain output receive signals; a plurality of intermediate frequency (IF) couplers comprising a respective plurality of the couplers, the plurality of IF couplers respectively coupled to the plurality of receive chains to receive the respective receive chain output receive signals and to provide a respective plurality of IF coupler output receive signals and a respective plurality of IF coupler Modem receive signals; a plurality of frequency translating feedback cancellers respectively coupled to the plurality of IF couplers to respectively receive the IF coupler output receive signals and to provide one or more frequency translating feedback canceller RF output signals; a plurality of repeater transmitters comprising the one or more transmitters, the plurality of repeater transmitters each respectively coupled to the plurality of frequency translating feedback cancellers to receive a respective frequency translating feedback canceller RF output signal and to transmit the composite signal; wherein the repeater device includes one or more repeater device Modems, and wherein one or more of the one or more repeater device Modems further include at least one Embedded Link Processor, one or more of the one or more repeater device Modems coupled to one or more of the plurality of IF couplers to receive one or more IF Modem receive signals, and one or more of the one or more repeater device Modems further includes the detector for performing detection of at least one of the one or more associated first embedded control signals; wherein the repeater device controller is coupled to the one or more repeater device Modems to exchange information with and provide control to the one or more repeater device Modems and to further provide control associated with the parameters, wherein the parameters are associated with the repeater device.

One or more of the outputs of one or more of the plurality of frequency translating feedback cancellers may be further coupled to an RF combiner interposed between at least one of the LNAs and the respective receive chains.

One of the one or more channel filters may be respectively interposed between the receive chains and the plurality of IF couplers.

The one or more of the one or more repeater device Modems may further include a detector for performing detection of at least one of the associated second embedded control signals to determine second control information, the second control information being utilized to perform adjustment of parameters associated with the repeater device or the first radio device.

The receive signal may include at least one of the following: an LNA output receive signal; a receive chain output receive signal; an IF coupler output receive signal; and IF coupler Modem receive signal.

According to another aspect of the invention, a multiple input multiple output (MIMO) wireless communication system is disclosed that includes: a first radio for transmission of a plurality of first information streams each having an associated embedded first control signal; a second radio for reception of the plurality of first information streams; a repeater device for repeating one or more of the plurality of first information streams, wherein the repeater device further includes one or more of each of: a channel filter for channel filtering a signal comprising at least one of the plurality of first information streams and at least one of the one or more associated embedded first control signals; a detector for performing detection of at least one of the one or more associated first embedded control signals; a repeater device controller for enabling one or more transmitters of the repeater device based upon the detection; a demodulator for demodulating at least one of the associated first embedded control signals to determine associated first control information; a transmitter for the transmission of the composite signal comprising the at least one of one or more first information streams and the respectively associated one or more second embedded control signals; wherein the performance of the MIMO wireless communication system is enhanced based upon adjustment of parameters associated with the repeater device and based upon information within the first control information.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

FIG. 7 illustrates the MIMO channel propagation matrix equation for piece wise propagation segments utilizing ECHO Relays.

DETAILED DESCRIPTION

Figure 1:
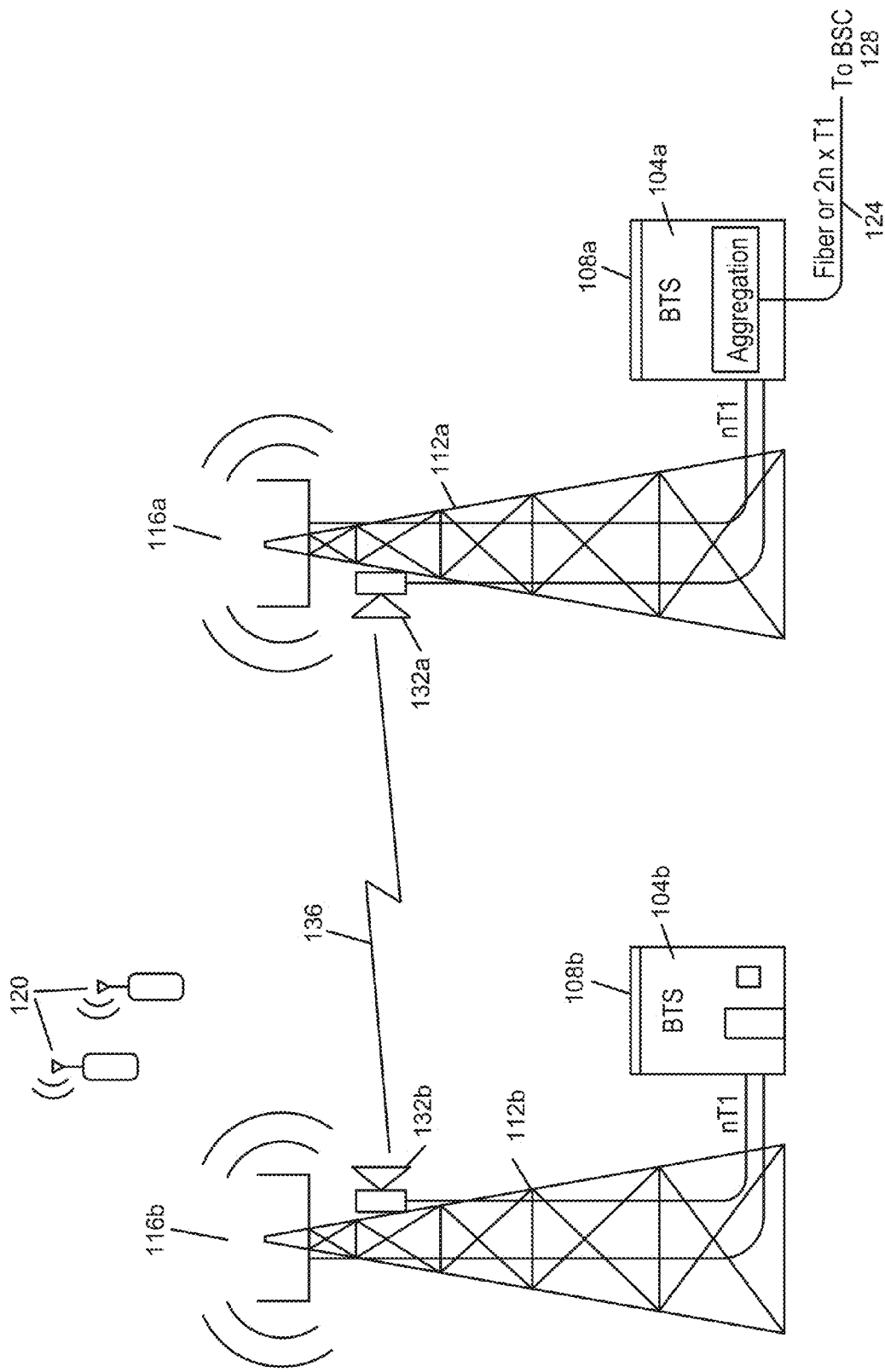
FIG. 1 is an illustration of conventional point-to-point (PTP) radios deployed for cellular base station backhaul with unobstructed line of sight (LOS).
Figure 2A:
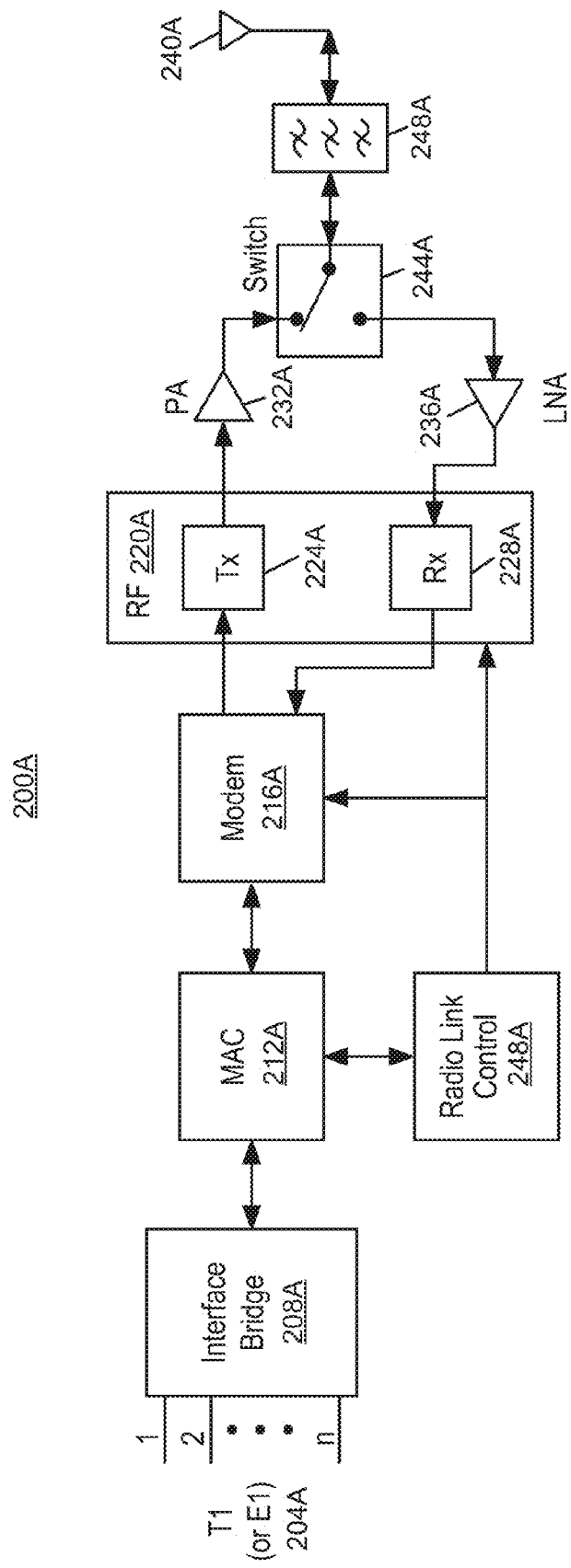
FIG. 2A is a block diagram of a conventional PTP radio for Time Division Duplex (TDD).
Figure 2B:
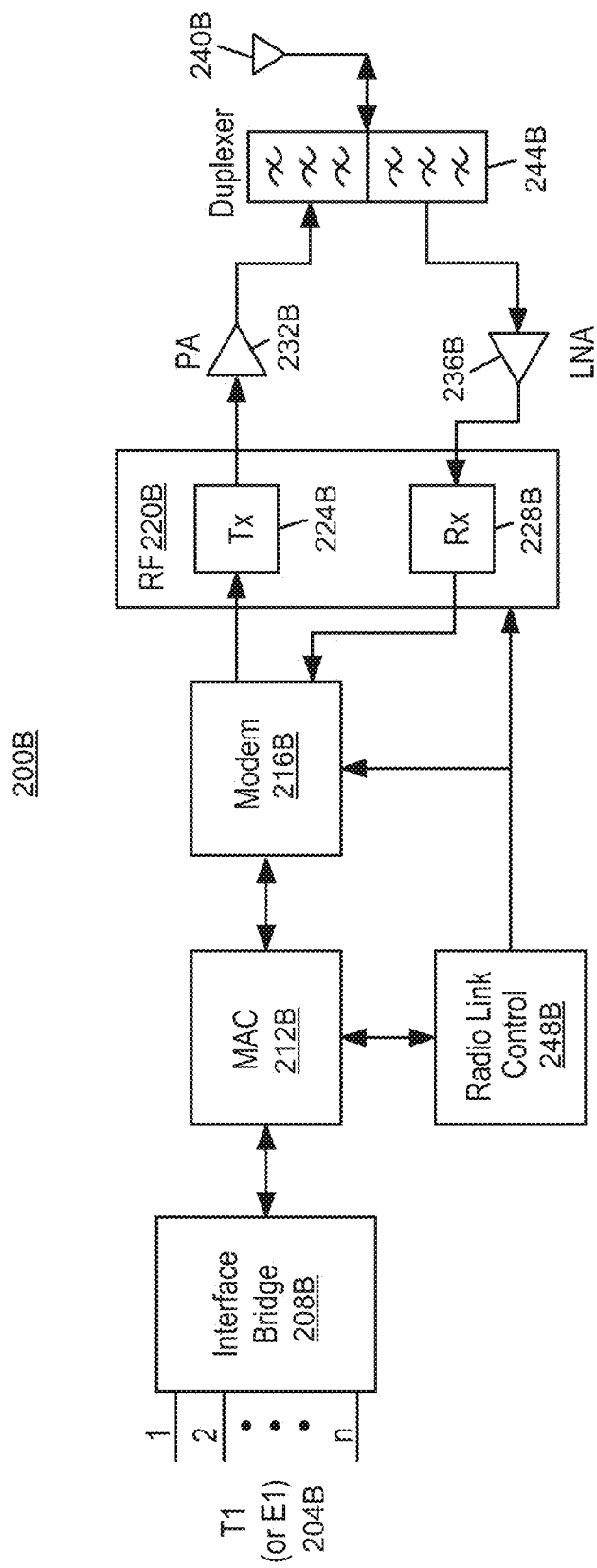
FIG. 2B is a block diagram of a conventional PTP radio for Frequency Division Duplex (FDD).
Figure 3A:
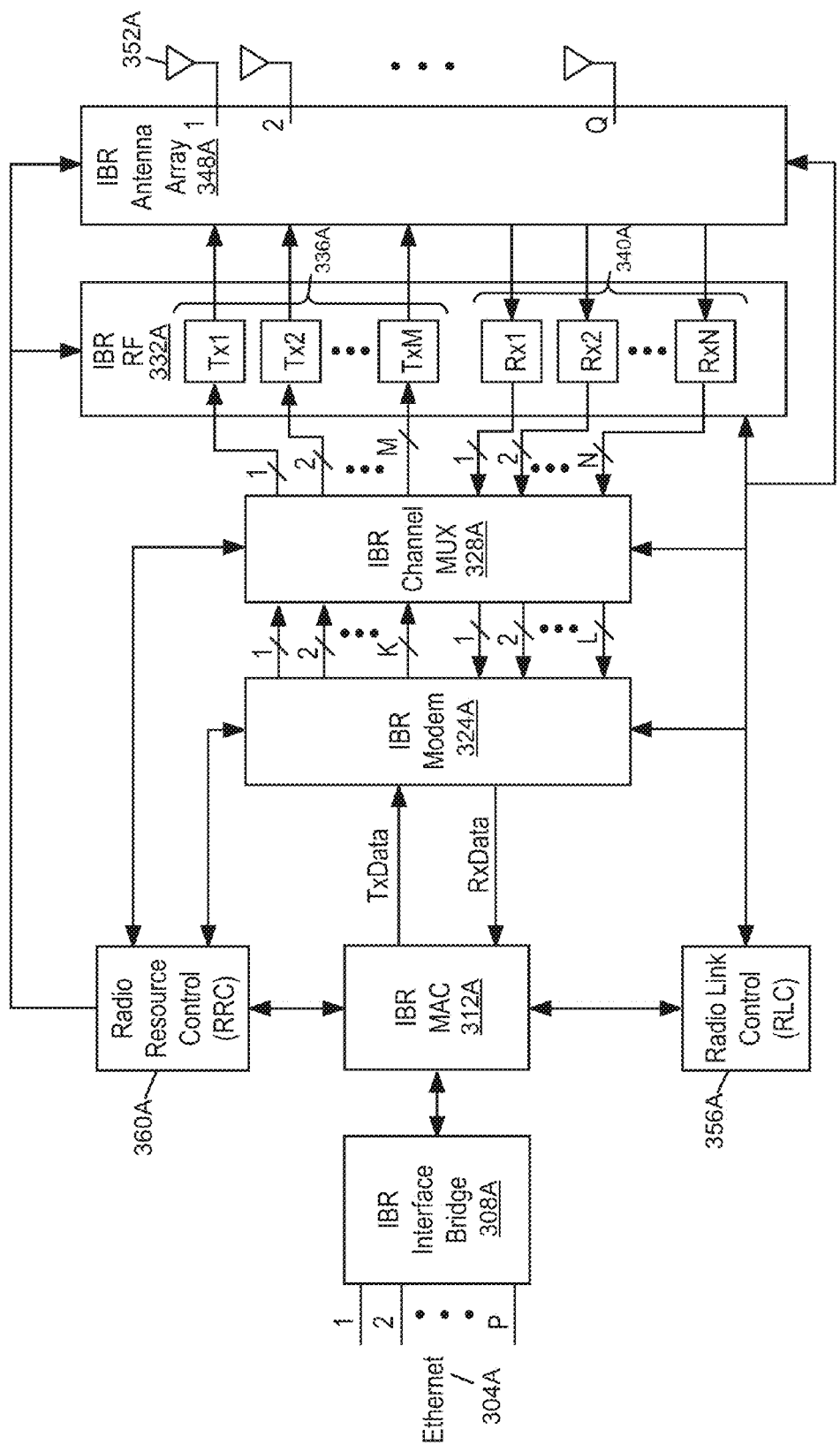
FIG. 3A is an exemplary block diagram of an IBR.
Figure 3B:
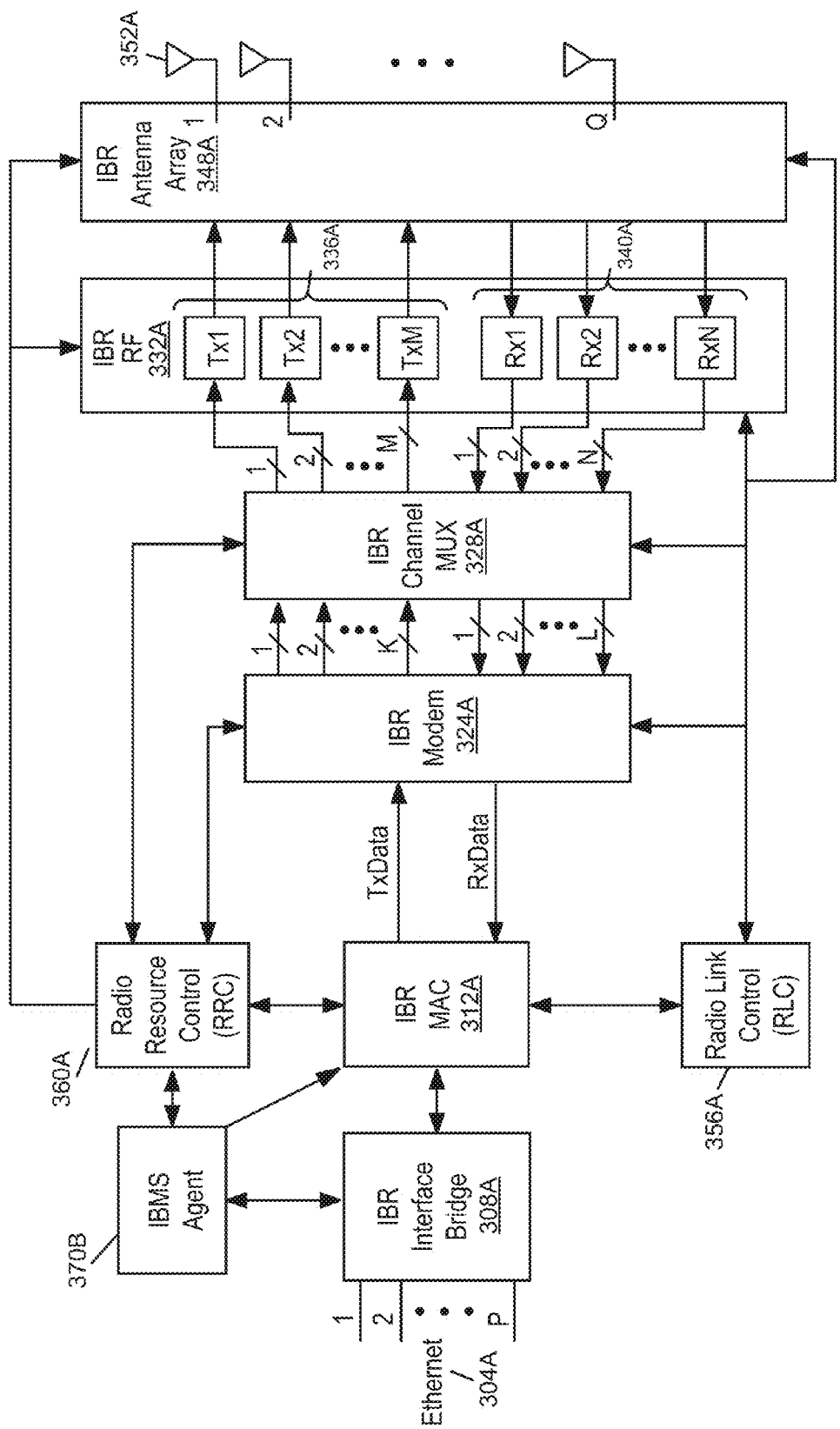
FIG. 3B is an alternative exemplary block diagram of an IBR.
Figure 3C:
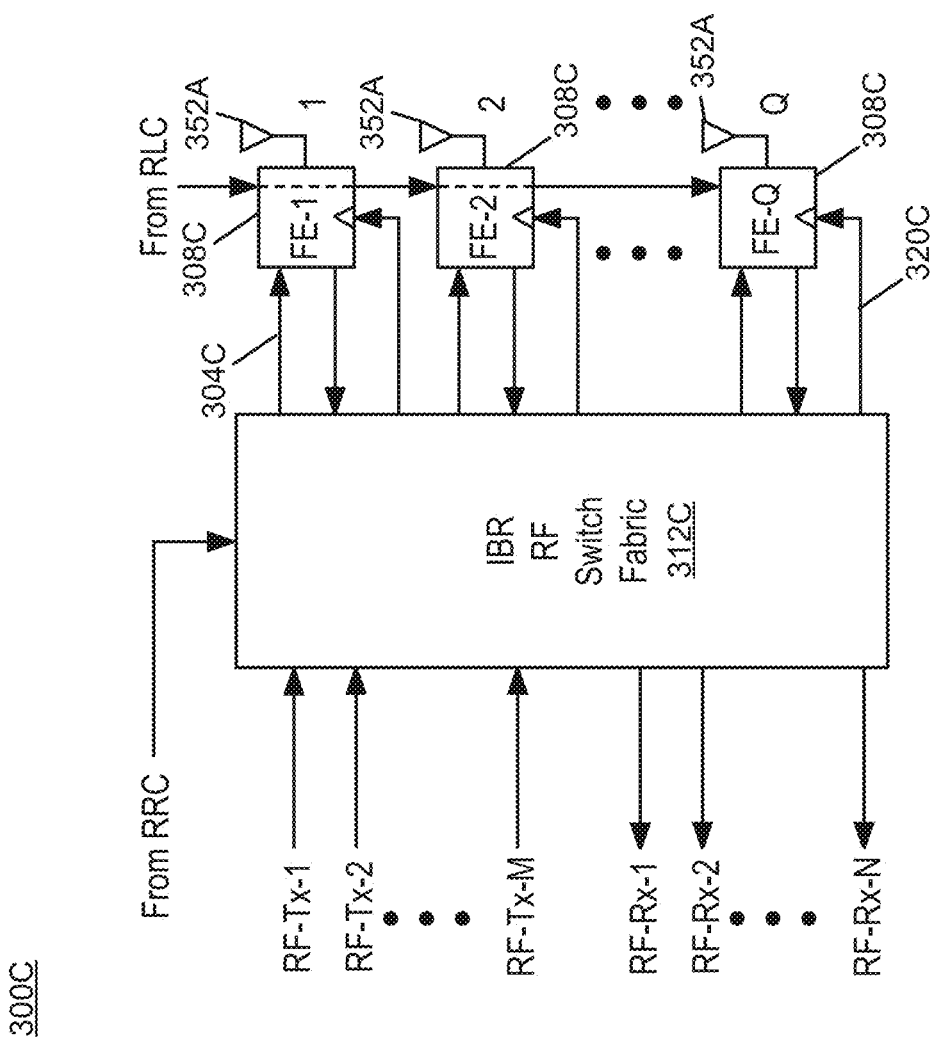
FIG. 3C is an exemplary block diagram of an IBR antenna array.
Figure 3D:
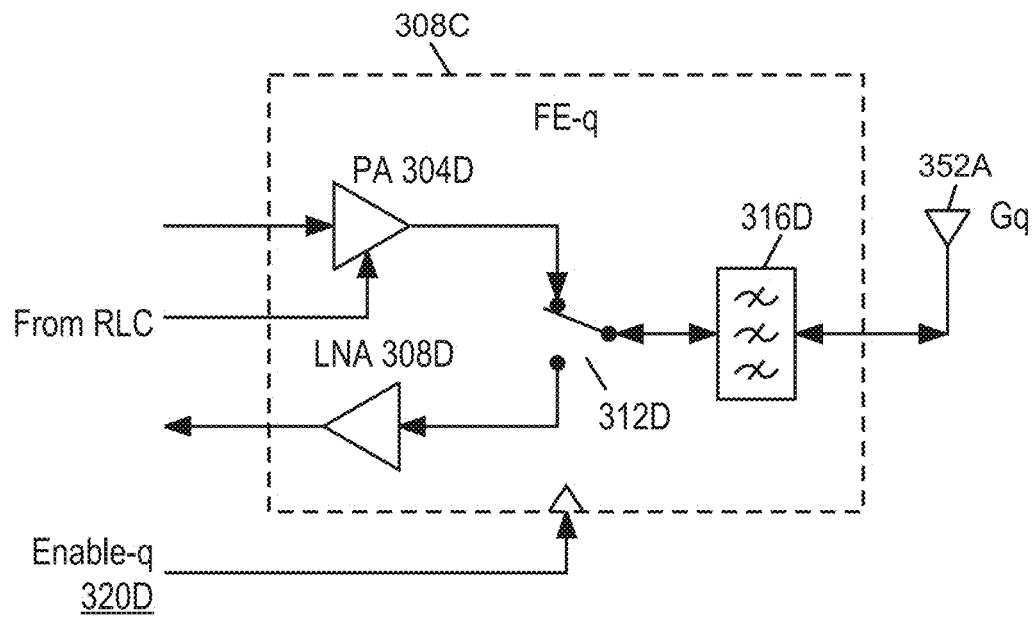
FIG. 3D is an exemplary block diagram of a front-end unit for TDD operation of an IBR.
Figure 3E:
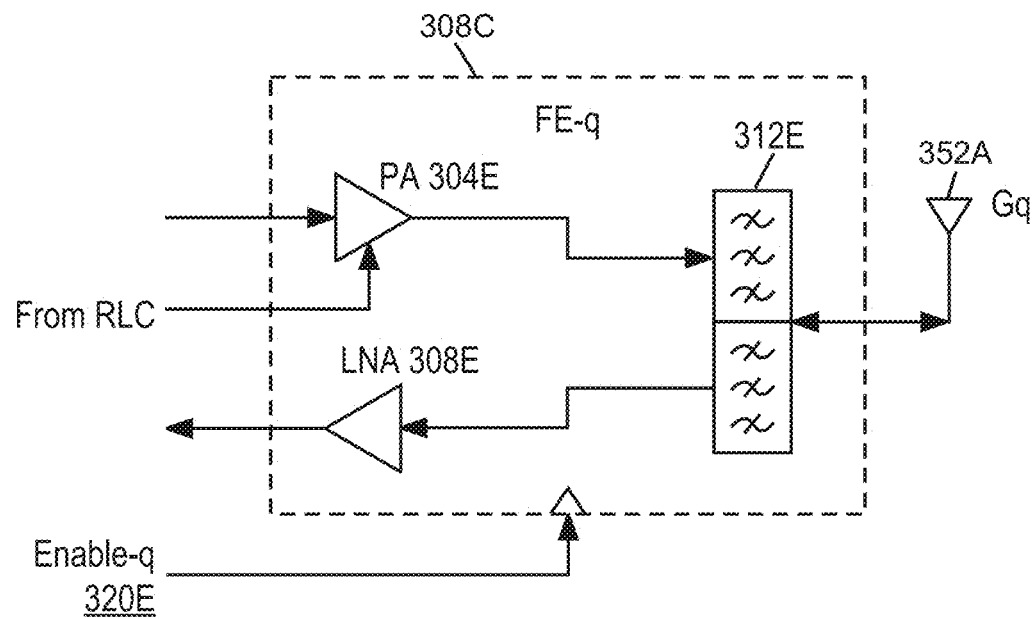
FIG. 3E is an exemplary block diagram of a front-end unit for FDD operation of an IBR.
Figures 4A, 4B:
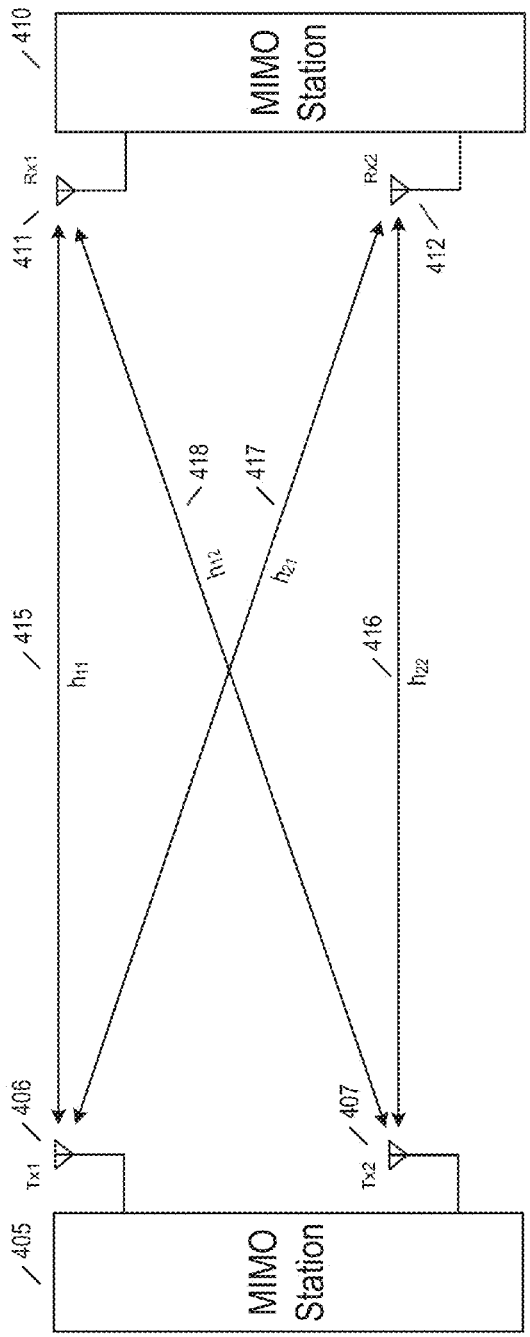
FIG. 4A is an illustration of the MIMO station propagation matrix elements.
FIG. 4B illustrates the MIMO channel propagation matrix equation and associated terminology.
Figure 4C:
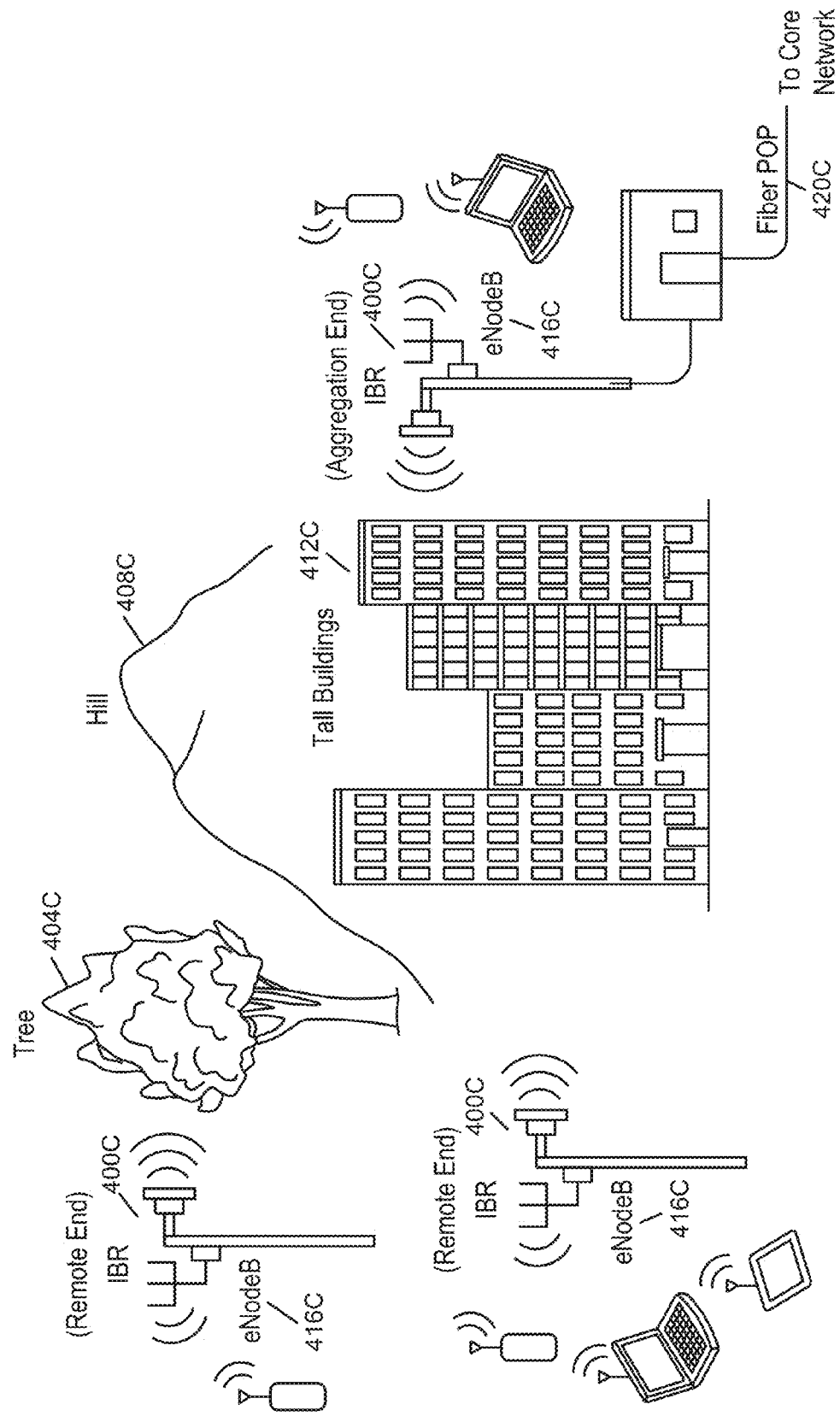
FIG. 4C is an exemplary illustration of intelligent backhaul radios (IBRs) deployed for cellular base station backhaul with obstructed LOS.
Figure 5A:
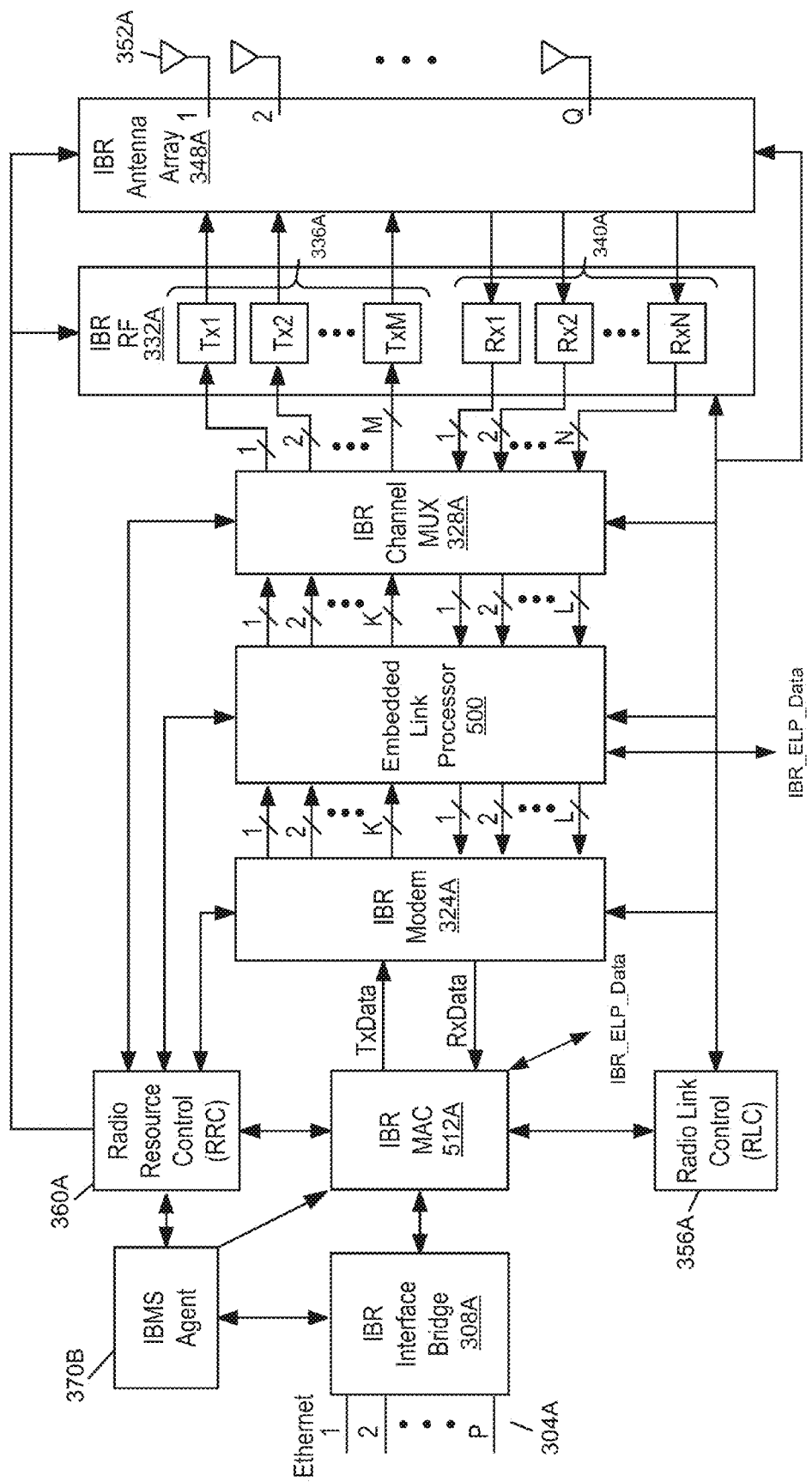
FIG. 5A is an exemplary block diagram of an IBR including an Embedded Link Processor (ELP).

Referring now to FIG. 5A, an embodiment of an IBR including an Embedded Link Processor (ELP) is depicted. A number of the blocks common with FIG. 3B are shown, whose functioning is generally described associated with the foregoing description. Relative to FIG. 3B, FIG. 5A provides for a modified IBR MAC 512A, and an additional block referred to as an Embedded Link Processor (ELP) 500.

Embodiments of IBR MAC 512A generally incorporate the functionality of the various embodiments of IBR MAC 312A. Some Embodiments of IBR MAC 512A additionally include MAC processing supporting the optimization of the wireless links utilizing ECHO devices. Additionally some embodiments of IBR MAC 512A support peer to peer and communications with other devices (e.g. ECHO devices) utilizing an embedded control channel for the transfer of control information.

Embodiments of the Embedded Link Processor (ELP) 500 provide for the reception and insertion of an additional wireless communications channel referred to as an embedded control channel in specific embodiments. Associated with IBR transmission, the Embedded Link Processor (ELP) receives transmit symbol streams (1 ... K) from IBR Modem 324A and provides the same transmit symbol streams (1 ... K) to the IBR Channel MUX 328A with additional embedded control channels added to the individual streams, if such processing is enabled. In some embodiments where embedded control channels are not actively associated with any specific transmit symbol stream, the transmit symbol streams are passed to their respective output streams with no addition of embedded control channel signal. Embodiments of the ELP may provide for a unique embedded control channel to be added to each of the respective transmit symbol streams. In other embodiments the ELP may provide for the components of the control channel, or the control channel in its entirety, to be added commonly to all transmit symbol stream in a related fashion.

In one exemplary embodiment utilizing a common control channel structure, a direct sequence spread spectrum pilot signal utilizing a first orthogonal code is added commonly to all streams processed for transmission by the ELP. Additionally, in the instant embodiment, each individual stream receives a respective second copy of the direct sequence spread spectrum (DSSS) pilot signal, but modulated with a differing orthogonal code respectively associated with the individual transmit symbol streams. Such modulation may be accomplished using modulo 2 additions, or bi-phase modulation as known in the art. The individual orthogonal codes may additionally be modulated by information bits in the form of the IBR_ELP_Data transmit data interface stream, resulting in an embedded control sub-channel symbol stream. One such reference teaching DSSS and CDMA modulation and demodulation techniques is *CDMA: Principles of Spread Spectrum Communications*, by Andrew J. Viterbi (Addison Wesley Longman, Inc., ISBN: 0-201-63374-1). Some embodiments of the embedded control channel having a specific structure utilizing multiple sub-channels is referred to as a common control channel. The use of either term in specific instances should not be considered limiting, and in some cases the terms are utilized interchangeably.

Embodiments of the Embedded Link Processor (ELP) 500 further provide for the reception and demodulation of embedded control channels inserted into one or more transmitted symbol streams by other devices, such as an ECHO device. Associated with IBR reception, the Embedded Link Processor 500 receives receive symbol streams (1 ... L) from IBR Channel MUX 328A and provides the same transmit symbol streams (1 ... L) to the IBR Modem 324A, with the detection and or demodulation of any associated embedded control channels within the individual streams, if such processing is enabled. The resulting demodulated data from the embedded control channels is provided by to the IBR MAC 512A by the ELP 500 as IBR_ELP_Data. Embodiments of the ELP may provide for a unique embedded control channel to be received and demodulated and associated with each of the respective receive symbol streams. In other embodiments the ELP may provide for the components of the control channel or the control channel in its entirety to be detected and demodulated commonly from all receive symbol streams.

In alternative embodiments, with appropriate interfaces, the ELP may be placed between the IBR Channel Mux 328A and the IBR RF 332A so as to allow for a single embedded control channel on a per transmit or receive channel basis rather than on per symbol stream basis.

In yet further alternative embodiments, a similar per channel embedded control channel result may be obtained utilizing the ELP placement as shown in FIG. 5A utilizing amplitude and phase weightings so as to cause the IBR Channel MUX to achieve the intended result. Such combinations of IBR Channel MUX processing with coordinated ELP processing further allow for additional control of capabilities of mapping specific embedded control streams with specific transmit or receive channels associated with the IBR RF 332A.

Figure 5B:
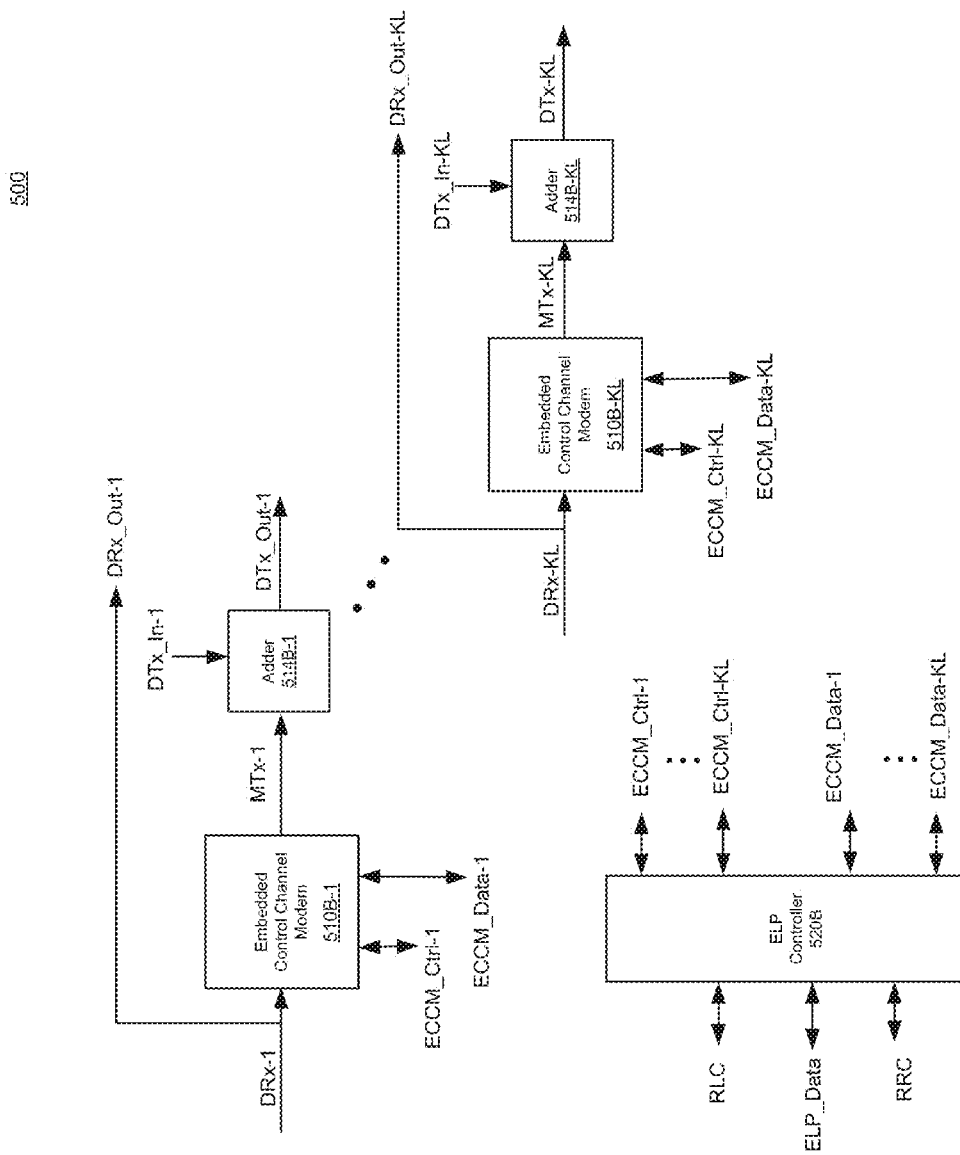
FIG. 5B is an exemplary block diagram of an Embedded Link Processor (ELP).

FIG. 5B is an exemplary block diagram of an embodiment of the Embedded Link Processor (ELP) 500. The ELP controller provides for interfacing the ELP_Data, RLP, RRC and/or RLC with the ECCM_Data-(1 ... KL) and ECCM_Ctrl-(1 ... KL) communication with the individual Embedded Control Channel Modems (510B-1 ... 510B-KL). Such interfaces allow for the interchange of data, including and control information with the individual modems. For example the relative signal level and timing of the individual per stream control channels and sub-channels to be embedded within transmit symbol streams may be set utilizing the control information contained within the ECCM_Ctrl-kl signals (where kl varies linearly from 1 to KL). Additionally the correlated signal level of an embedded control channel or sub-channel, the received signal level indication of all the signals, the timing information of the received signals may be additionally communicated from the individual ECCM Modems to the ELP Controller 520B, and to the RLP, ELP_Data, and RRC subsequently. It should be understood that the ELP_Data signal of FIG. 5B corresponds to the IBR_ELP_Data signal of FIG. 5A. It will be appreciated that the ELP will be described in further detail hereinafter with reference to ECHO devices, and, accordingly, the naming within FIG. 5B is generic for purposes of the present discussion.

Additionally, the DRx-kl signals (where kl varies from 1 to KL) provide for digitally sampled signals associated with the 1 to L receive symbol streams, in some embodiments. The DRx_Out-kl signals (where kl varies from 1 to KL) are respectively coupled to DRx-kl, to provide for a pass through operation of the respective DRx-kl signals, for example when an ELP is utilized within an IBR. Such a pass through coupling, in some embodiments, allows for the coupling of the receive symbol streams from the IBR Channel MUX 238A to the IMR Modem 324A. In some alternative embodiments where the ELP is utilized within a repeater device, such DRx_Out-kl signals may not be utilized by the repeater device and may not be depicted as external ports to the ELP in such embodiments.

The DTx_In-kl and DTx_Out-kl signals (where kl varies from 1 to KL) provide for a digitally sampled signals associated with the 1 to K transmit symbol streams respectively input and output from ELP 500, in some embodiments. An individual Embedded Control Channel Modem 510B-kl, provides a modulated control channel (MTx-kl) to a respective Adder 514B-kl, which in sums MTx-kl with the input transmit symbol stream DTx_In-kl. Adder 514B-kl in turn provides the Embedded Control Channel Signal DTx_Out. In embodiments where no input to the DTx_In-kl is provided, the MTx-kl signal is provided directly as DTx-kl.

Note that KL need not be equal to either K or L. In some embodiments where there is a one to one correspondence between transmit symbol streams and embedded control channels (or sub-channels in a common control channel structure), KL must be equal to or greater than K. In cases where KL (the number of ECCMs) exceeds K (the number of transmit symbol streams) the excess ECCMs may not be utilized for transmission, or may be used for other purposes. One such purpose would be for use dedicated to a transmit channel, such as might be used with a single high gain antenna panel for example.

Further, when there is a one to one correspondence between the number of receive symbol streams and the number of embedded control channels associated with these streams, KL (number of ECCMs) must be equal to or exceed L (number of receive symbol streams). In the case where KL exceeds L, a number of the ECCMs may remain unused for reception of embedded control channels, or may be utilized for other purposes such as receiving embedded control channels from individual receive channels.

Figure 5C:
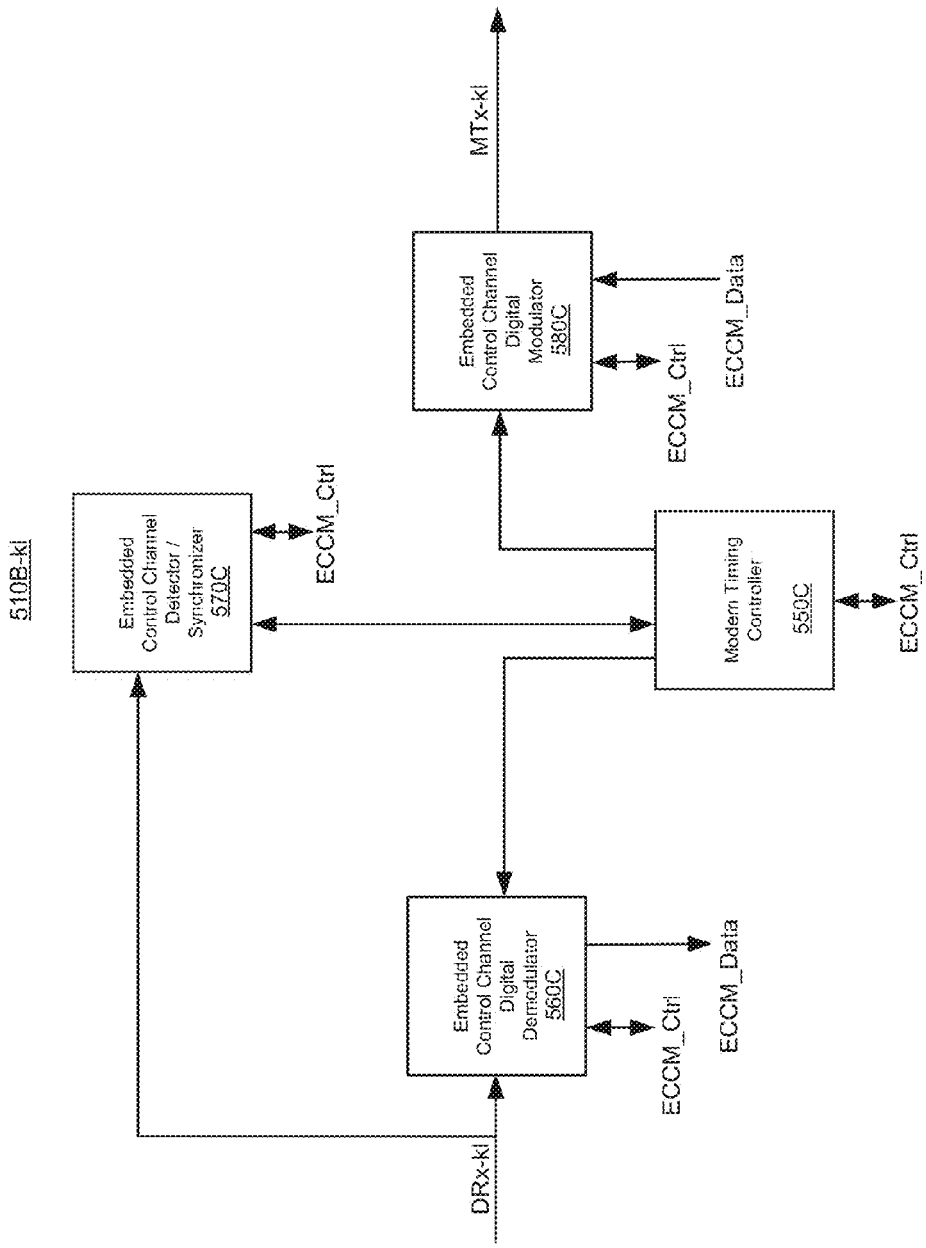
FIG. 5C is an exemplary block diagram of an embedded control channel modem.

FIG. 5C is an exemplary block diagram of an embodiment of an embedded control channel modem 510B-kl. Digitally sampled receive symbol stream DRx-kl is coupled to Embedded Control Channel Detector/Synchronizer block 570C, which preforms timing synchronization with the DSSS signals within the input signal, and detects the presence and associated signal levels (in uncorrelated and correlated levels for example, Io, Ec, Es, Ec/Io and/or, Es/Io), and associated timing information and provides one or more of the determined values to the Modem Timing Controller 550C. The Modem Timing Controller, in one embodiment, utilizes the timing and received Ec/Io information to trigger the demodulation and or transmission of embedded control signals respectively associated with the Digital Demodulator 560C and the Digital Modulator 580C. The digitally sampled receive symbol stream DRx-kl is additionally coupled to the Digital Demodulator 560C, which upon receiving ECCM_Ctrl configuration information, and timing information from the Modem Timing Controller dispreads and demodulates the DSSS signals associated with the Embedded Control Channel and any associated pilot, and data sub-channels. The ECCM_Ctrl configuration information, in specific embodiments, may contain a specific PN code, Gold code, or other code to be utilized for spreading and dispreading in the ECCM 510B for use in Digital Demodulator 560C and Digital Modulator 580C. Additionally, the ECCM_Ctrl may contain the identity of values of specific orthogonal codes for use with specific sub-channels of a common control channel structure. Such orthogonal codes may include Walsh Codes, CAZAC Codes, Zadoff-Chu codes and the like. Further, the specific codes may be designated for use with a pilot channel utilized for synchronization and as a phase and amplitude reference for demodulation, and other codes may be designated for use with specific data sub-channels carrying BPSK modulated data in one example embodiment. Referring to FIG. 5C, Digital Modulator 580C provides a modulated control channel signal MTx-kl, upon receiving the mentioned configuration information from the ECCM_Ctrl, the ECCM_Data to be transmitted, and the timing from the Modem Timing Controller 550C. Either, or both of the Digital Modulator 580C and the Digital Demodulator 560C may be disabled utilizing the ECCM_Ctrl signal.

As mentioned previously, such DSSS and CDMA transmission and reception approaches and structures are well known in the art including as utilized in the downlink of IS-95, W-CDMA, CDMA-2000 and the like. Further aspects of such art is disclosed in the previously references book *CDMA: Principles of Spread Spectrum Communications*, by Andrew J. Viterbi (Addison Wesley Longman, Inc., ISBN: 0-201-63374-1).

Figure 6A:
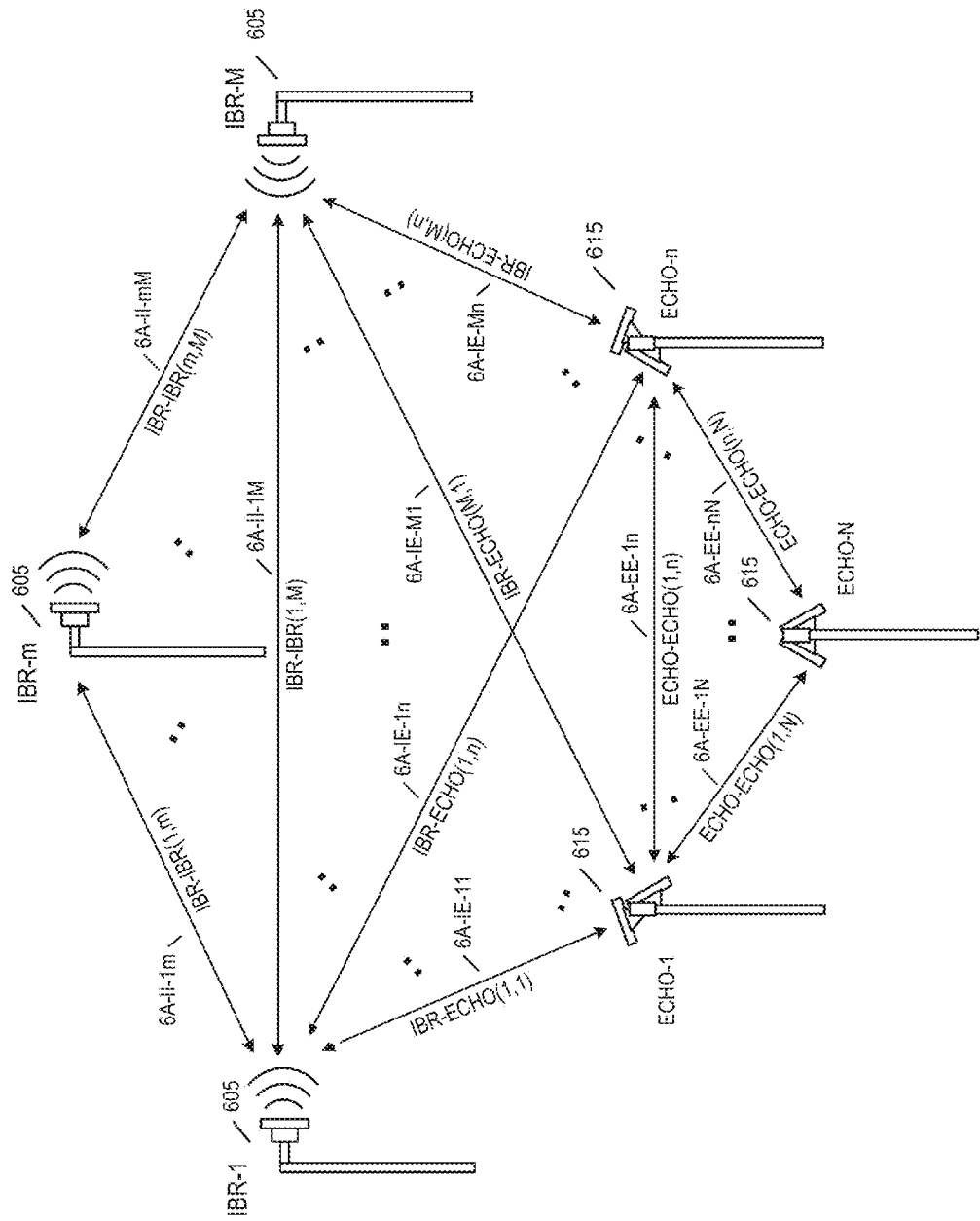
FIG. 6A is an illustration of IBR radios deployed in a point-to-point (PTP) or point-to-multipoint (PTMP) configuration utilizing ECHO relays deployed for cellular base station backhaul according to certain embodiments of the invention.

FIG. 6A is an illustration of IBR radios deployed in both point-to-point (PTP) and point-to-multipoint (PTMP) configurations, utilizing ECHO relays deployed for remote backhaul (i.e. of a cellular base station), according to embodiments of the invention. A plurality of Intelligent Backhaul Radios 1 through M, as well as embodiments of the current invention, referred to as ECHO (Enhanced CHannel propagation matrix Order and rank) relays are depicted. FIG. 6A shows a topology of the combination of IBRs and ECHOS, which allow for the enhancement of channel propagation matrices between two or more IBRs, utilizing one or more ECHO devices. The nomenclature of the figure describes the individual propagation channels between each of the IBRs and ECHOs depicted in the figure. As an example, the propagation channel between IBR-1 and IBR-m (6A-II-1m) may be referred to as IBR-IBR(1,m). The propagation channel between an IBR and an ECHO device, such as depicted in Link 6A-IE-11 is referred to using the nomenclature IBR-ECHO (1,1). A third type of link between two ECHO devices is depicted in Link 6A-EE-1n, as ECHO-ECHO (1,n). Embodiments of the use of ECHO devices in the current invention, may utilize one or a plurality of links between individual nodes. In various embodiments of point-to-point and point-to-multipoint links, for instance between IBR-1, IBR-m, and IBR-M, one or more links may be utilized, including in one embodiment, a direct line-of-sight link 6A-II-1M, while in other embodiments, a line-of-sight link may not be used at all, while in still other embodiments the line-of-sight link may be used in combination with piecewise propagation links via an ECHO device. In specific embodiments, one or both point-to-point and point-to-multipoint configurations of IBRs utilizing ECHO devices are disclosed. In general the disclosed point-to-point embodiments are also contemplated and disclosed for use with point-to-multipoint links if not specifically stated. In some embodiments, such omissions are for the purpose of the clarity of the disclosure. In yet further embodiments, the full duplex communications between two IBRs may utilize the same or different configurations in one direction, relative to the return path between two IBRs. For instance, a path from IBR-1, desiring a rich channel matrix, may employ both the direct line of sight path (or near line of sight path) to IBR-M, as well as the path utilizing ECHO-1, such that a richer angular spread is created at IBR-M while the return path from IBR-M to IBR-1 may utilize only the line-of-sight path or may utilize any combination of ECHO devices which may or may not include the line-of-sight path returning to IBR-1. In such a configuration, the path from IBR-1 to IBR-M may be time multiplexed with the return path from IBR-M to IBR-1 in a (TDD) time division duplexed mode, or may be (FDD) frequency duplexed or (ZDD) zero division duplexed with the return path. Additionally two or more ECHO devices may be used to combine a serial propagation path from IBR-1 to IBR-M, utilizing ECHO-1, ECHO-N, and/or ECHO-n to IBR-M. The use of differing configurations between the propagation in one direction relative to the other direction, between two IBRs, may be desirable due to the required data rate of the links or may be due to the frequency selectivity between the two links or other factors such as localized interference.

Figure 6B:
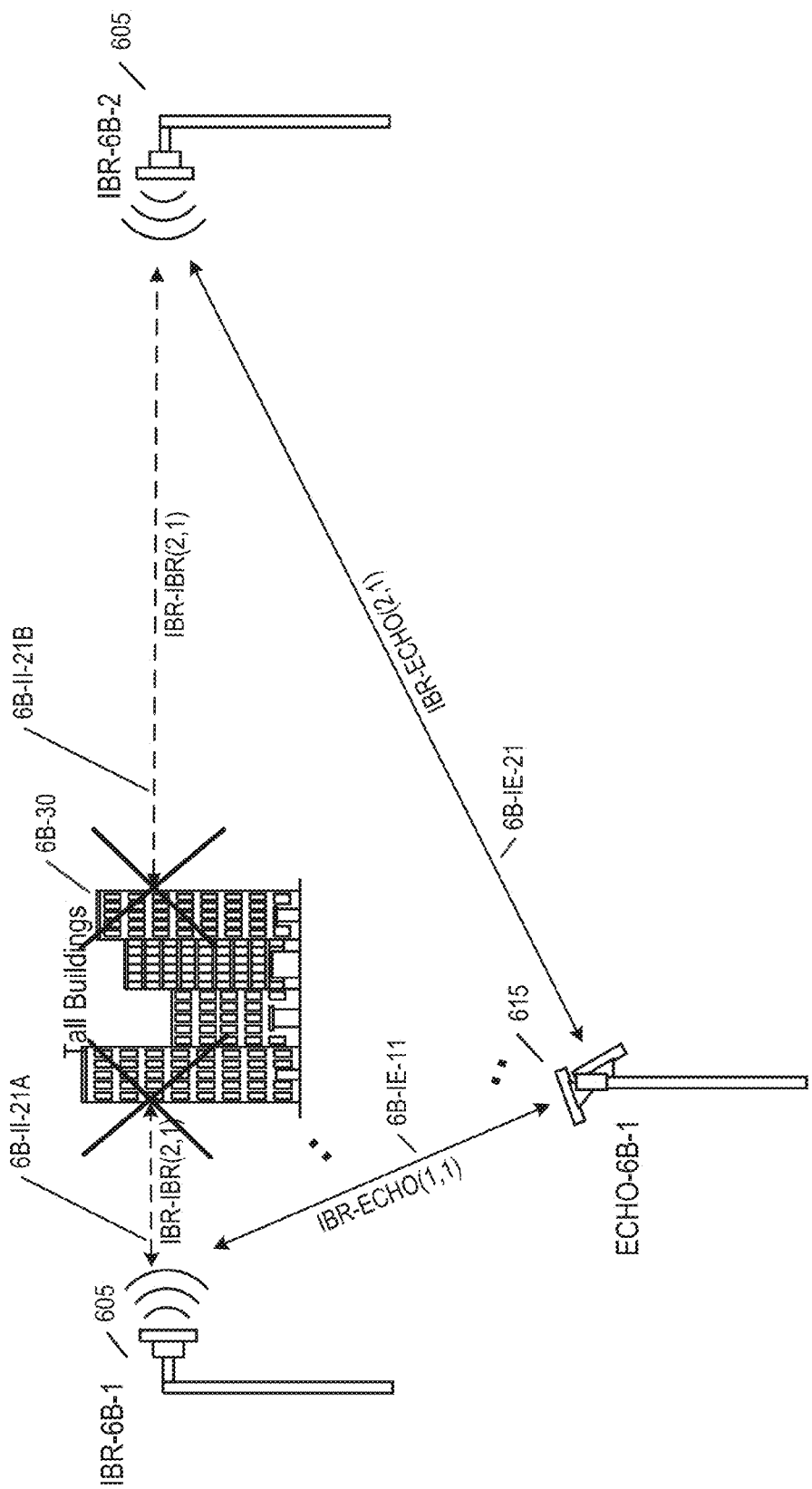
FIG. 6B is an illustration of IBR radios deployed in a point-to-point (PTP) configuration utilizing an ECHO relay with an obstructed direct propagation path, and bidirectional ECHO links.

FIG. 6B is an illustration of IBR radios deployed in a point-to-point (PTP) configuration utilizing an ECHO relay with an obstructed direct propagation path, and bidirectional ECHO links.

FIG. 6B depicts a specific configuration showing a line-of-sight path between two IBRs wherein the signal strength between the two IBRs is insufficient to support a propagation path enabling line-of-sight communications between IBR-6B-1 and IBR-6B-2, due to the obstruction of the line-of-sight path by tall buildings (6B-30). The inability for the line-of-sight path between the two IBRs poses a significant problem which is resolved by utilizing ECHO-6B-1 to provide for a piece-wise line-of-sight propagation between the IBRs. Such a piece-wise propagation is supported by IBR-ECHO (1, 1) and IBR-ECHO (2, 1) via ECHO-6B-1. Each of the propagation segments includes an individual line-of-sight propagation environment, allowing for two streams to be supported by polarization of the transmitting and receiving antennas or an alternative embodiment utilizing MIMO propagation relying on the multipath of the propagation channels. Such a piece-wise propagation path may be supported utilizing time division duplexed, frequency division duplexed, or zero division duplexed repeating at the ECHO device. However, in environments where the individual propagation segments are line-of-sight and no multipath exists, the same degenerate channel matrix condition for MIMO communications may exist. In such environments, only two streams utilizing orthogonal polarizations between the antennas of the receiving and transmitting stations of each piece-wise segment may be utilized, resulting in the support of two streams only. In yet other embodiments, where polarized antennas are not utilized, only a single stream may be supported when the piece-wise line-of-sight segments are utilized.

Figure 6C:
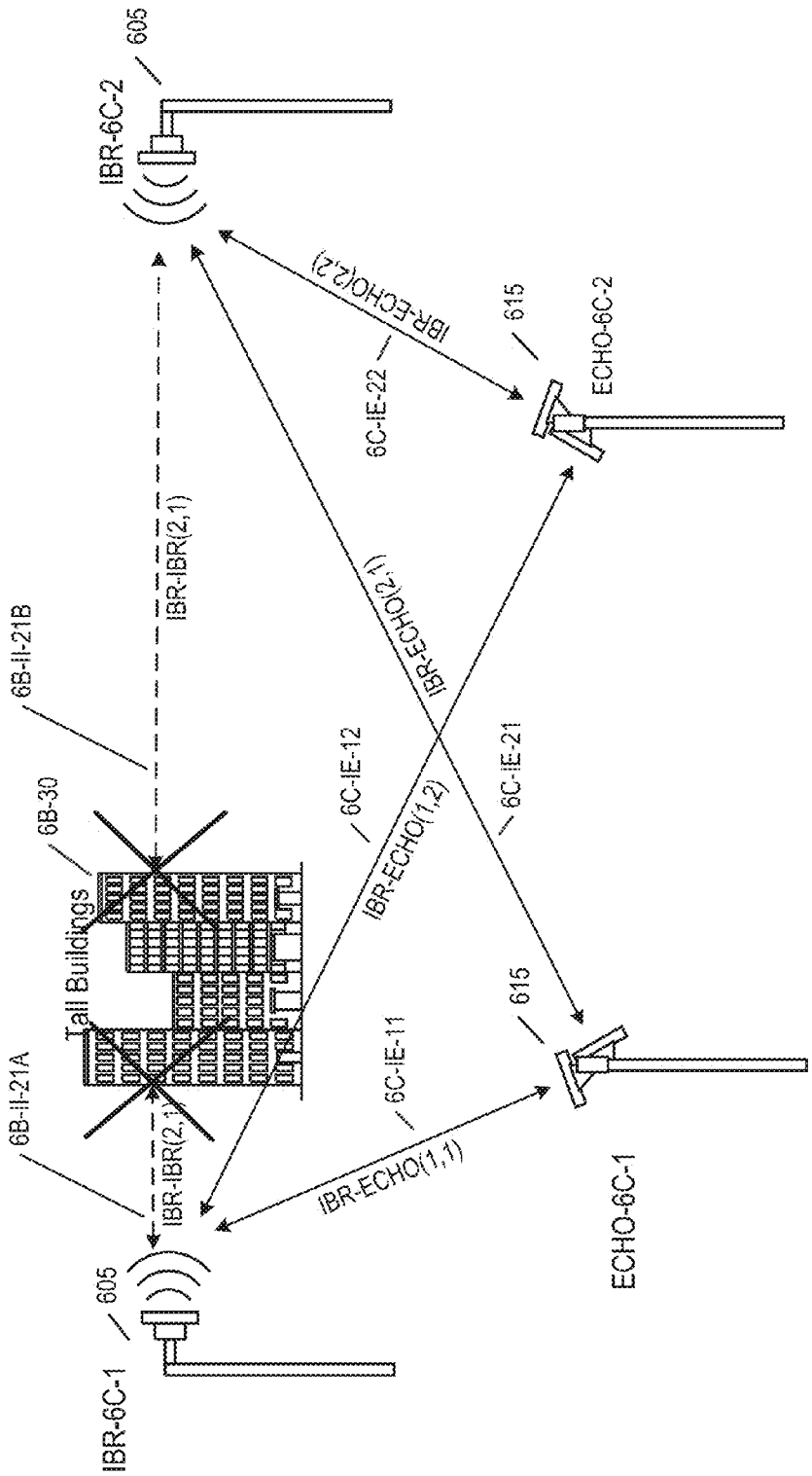
FIG. 6C is an illustration of IBR radios deployed in a point-to-point (PTP) configuration utilizing a plurality of ECHO relays with an obstructed direct propagation path, and bidirectional ECHO links.

FIG. 6C is an illustration of IBR radios deployed in a point-to-point (PTP) configuration utilizing a plurality of ECHO relays with an obstructed direct propagation path, and bidirectional ECHO links.

FIG. 6C depicts, in some embodiments, the problem of piece-wise line-of-sight propagation addressed by utilizing a plurality of ECHO devices. Such a configuration allows for a richer multipath environment, created by the plurality of line-of-sight segments propagated by the plurality of ECHO devices. In such a configuration, up to four streams may be supported by the piece-wise line-of-sight segments, utilizing polarization on each of the individual line-of-sight segments, allowing for two streams to be relayed by each ECHO device between each IBR. As with FIG. 6B, the direct line-of-sight propagation between IBR-6C-1 and IBR-6C-2, depicted in FIG. 6C, is obstructed by the tall buildings (6B-30). Bidirectional communications may be supported in the current embodiment with frequency division duplexing, time division duplexing, or zero division duplexing depending upon the configurations of the IBRs and the ECHO devices. Additionally, a plurality of ECHO devices may be co-located at ECHO-6C-1 and ECHO-6C-2, each of which are unidirectional relaying devices, wherein each of the depicted ECHO-6C-1 and ECHO-6C-2 include a plurality of ECHO devices, as depicted in further detail below. Such embodiments allow for the support of frequency division duplexing, as well as time division duplexing or zero division duplexing, bidirectional communications between the two IBRs. It should be recognized that embodiments disclosed herein may support the general use of TDD, FDD, or ZDD (Zero Division Duplex) communications between endpoint IBRs and the various configurations of ECHO devices utilized to support them should be considered as disclosed throughout the various embodiments as depicted in the current and subsequent figures showing deployment scenarios of IBRs and their link enhancement utilizing ECHO devices.

Figure 6D:
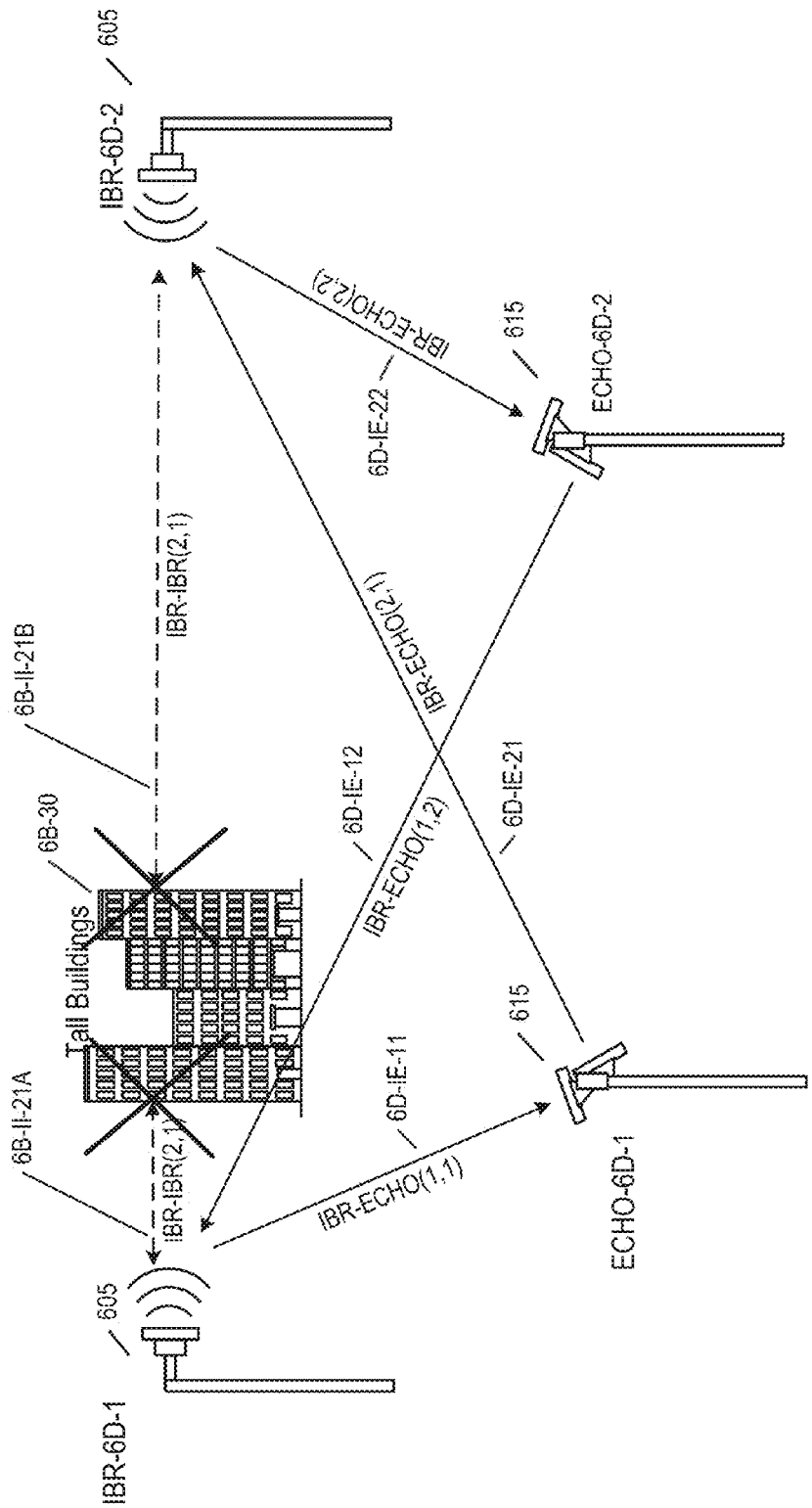
FIG. 6D is an illustration of IBR radios deployed in a point-to-point (PTP) configuration utilizing a plurality of ECHO relays with an obstructed direct propagation path, and unidirectional ECHO links.

FIG. 6D is an illustration of IBR radios deployed in a point-to-point (PTP) configuration utilizing a plurality of ECHO relays with an obstructed direct propagation path, and unidirectional ECHO links.

FIG. 6D depicts a similar configuration to the previous deployment; however, rather than each of the ECHO devices being bidirectional as described, each ECHO device is unidirectionally allowing for the deployment of differing propagation paths utilizing piece-wise line-of-sight or other embodied MIMO channels between IBR-6D-1 to IBR-6D-2, wherein the forward path from IBR-6D-1 to IBR-6D-2 utilizes ECHO-6D-1 via piece-wise propagation path 6D-1E-11 (IBR-ECHO (1,1)), utilizing ECHO device ECHO-6D-1, and piece-wise propagation path 6D-IE-21 (IBR-ECHO (2,1)) to IBR 6D-2. The return path from IBR-6D-2 to IBR-6D-1 utilizes ECHO device ECHO-6D-2 via piece-wise propagation paths 6D-IE-22 (IBR-ECHO (2,2)), and 6D-IE-12 (IBR-ECHO (1,2)). As can be seen, the different unidirectional ECHO devices each support either the forward path or the reverse path between the two devices. These two ECHO devices may be physically co-located or may be physically separated. In the case where they are physically separated there may be some advantage, in specific embodiments, in supporting significant angular differences in propagation between the piece-wise propagation paths at the transmitting and receiving IBRs, which may provide for the opportunity for further performance enhancement utilizing transmitter and receiver beam forming techniques within the IBRs to provide for additional isolation and performance relative to the forward path and reverse path between the two IBRs. Further, each of the unidirectional propagation paths may be comprised of two spatial streams enabled by polarized antennas in piece-wise line-of-sight environments or in multipath rich environments, enabled by individual spatially multiplexed streams which may support one, two or more propagated streams between each piece-wise propagation path. The direct line-of-sight path in the current embodiment is also obstructed, preventing the direct communication without the use of an ECHO device between the IBRs. Alternative embodiments may have a weak or a direct line-of-sight propagation path between the two IBRs which may be used in conjunction with the plurality of ECHO devices, the ECHO devices being unidirectional or bidirectional.

Figure 6E:
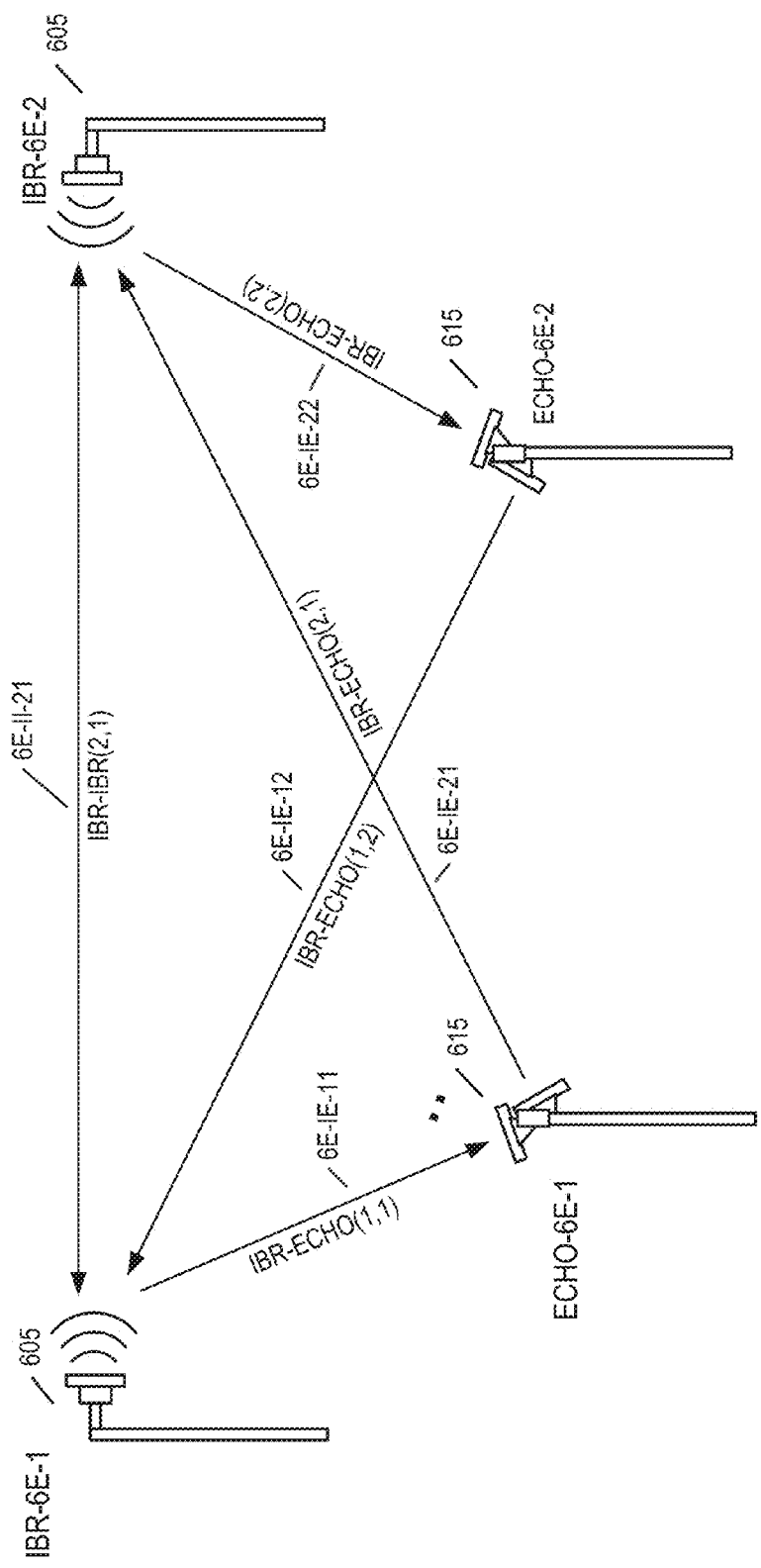
FIG. 6E is an illustration of IBR radios deployed in a point-to-point (PTP) configuration utilizing a plurality of ECHO relays with a line of sight (LOS) direct propagation path, and bidirectional ECHO links.

FIG. 6E is an illustration of IBR radios deployed in a point-to-point (PTP) configuration utilizing a plurality of ECHO relays with a line of sight (LOS) direct propagation path, and bidirectional ECHO links.

FIG. 6E, depicts, in one embodiment, a deployment wherein the line-of-sight path between IBR-6E-1 and IBR-6E-2 provides for a direct communication between the two IBRs. This communication may be bidirectional in some embodiments and may be unidirectional in other embodiments. The supporting of the two unidirectional ECHO devices operate in a manner similar to that described with reference to FIG. 6D, except that the two unidirectional ECHO devices are used in combination with the direct line-of-sight propagation path in one or both the forward and reverse directions. One key consideration when a plurality of propagation paths between a transmitting and receiving IBR are present and at least one of those paths utilize an ECHO device, the relative magnitude of the propagation path (i.e., the path loss between the two IBRs for that specific path) is of particular importance. If the relative magnitude of the individual propagation paths is too large, the performance of the spatial multiplexing amongst those paths may be compromised. A first path being received at a receiving IBR, which is sufficiently larger than the magnitude of the signal from a second path, each path supporting an individual spatial stream, dominates the second path, preventing the de-multiplexing and isolation of the individual streams and compromising performance. For every decibel (dB) of increased dynamic range between the two paths, an equal increase in the overall stream isolation is required so as to support the data rates of the individual streams, which would otherwise be possible. As a result, adjusting the gains of paths through ECHO devices so as to minimize the dynamic range of individual receive signal levels is desirable. In embodiments of the invention, such an adjustment may be supported utilizing control communications amongst the IBRs and the ECHO devices. In some embodiments where the communications are bidirectional, ECHO devices may communicate with the transmitting IBR directly or may communicate with another device, which then communicates with the transmitting IBR, as an example. In other embodiments where the ECHO device is unidirectional, the ECHO device may transmit information to another device which may then process or simply relay the information to the original transmitting IBR utilizing the return link between the IBR-to-IBR, point-to-point links. Embodiments describing such communication are disclosed later in this specification.

Figure 6F:
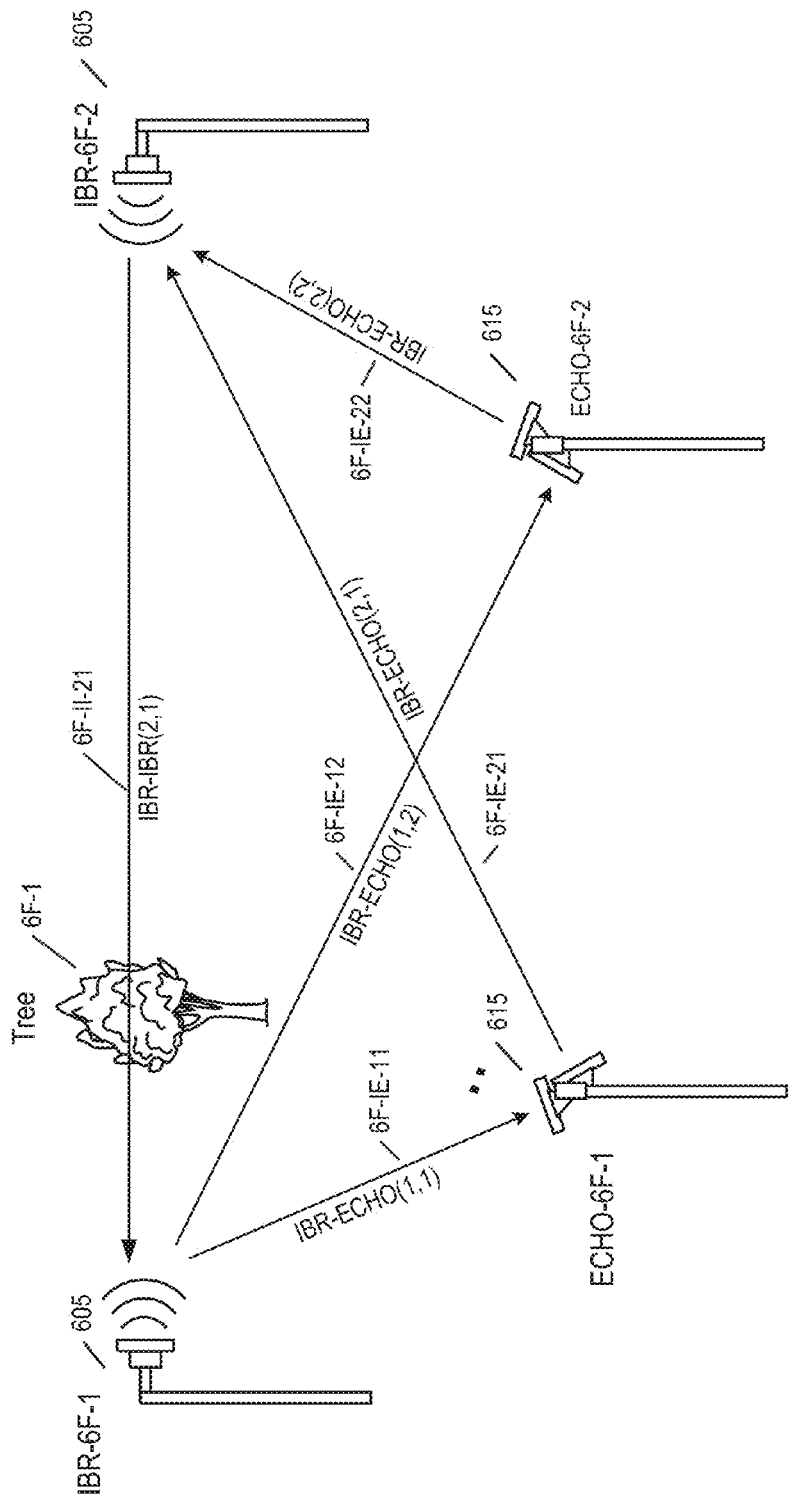
FIG. 6F is an illustration of IBR radios deployed in a point-to-point (PTP) configuration utilizing a plurality of ECHO relays with a near line of sight (NLOS) direct propagation path utilizing a unidirectional link, and unidirectional ECHO links.

FIG. 6F is an illustration of IBR radios deployed in a point-to-point (PTP) configuration utilizing a plurality of ECHO relays with a near line of sight (nLOS) direct propagation path utilizing a unidirectional link, and unidirectional ECHO links.

FIG. 6F depicts the example scenario where the direct path between IBR-6F-2 and to IBR-6F-1 is near line of sight and is utilized with signal propagating through and scattering amongst Tree 6F-1 via Link 6F-II-21, comprising Link IBR-IBR (2,1). While this propagation path supports communications from IBR-6F-2 to IBR-6F-1, the path from IBR-6F-1 to IBR-6E-2 does not use the near line-of-sight Path 6F-II-21. This communication channel is supported utilizing two ECHO devices, ECHO-6F-1 and ECHO-6F-2. The forward path from IBR-6F-1 via the ECHO devices is capable of producing a plurality of piecewise line-of-sight links wherein propagation from IBR-6F-1 to ECHO-6F-1 via Link 6F-IE-11 supports two streams in the current embodiment utilizing orthogonal polarizations of the transmitting and receiving antennas. The same configuration is supported from ECHO-6F-1 to IBR-6E-2 via Propagation Path 6F-IE-21 utilizing Link IBR-ECHO (2, 1). Likewise as additional two paths may be supported by piecewise line-of-sight link from IBR-6F-1 to IBR-6F-2 utilizing ECHO-6F-2 and piecewise line-of-sight Links 6F-IE-12 (IBR-ECHO (1, 2)), and Link 6F-IE-22 (IBR-ECHO (2, 2)). Each piecewise line-of-sight link utilizing unidirectional ECHO devices supports one or two streams utilizing orthogonal polarizations, resulting in four streams in a piecewise line-of-sight configuration in some embodiments.

FIG. 7 illustrates the MIMO channel propagation matrix equation for piece wise propagation segments utilizing ECHO Relays.

FIG. 7 depicts the individual elements of the channel propagation matrix of Eq. 7-1 in the context of utilization of the ECHO devices. Eq. 7-1 depicts the channel matrix elements having the individual propagation segments of Eq. 7-2. Each individual propagation segment of Eq. 7-2 is represented by $L_s$. Each individual propagation channel from the $n^{th}$ transmitter to the $m^{th}$ receiver is depicted by the product of S(k,m,n) individual propagation segments together comprising one propagation path, where there are s=1 to S (k,m,n) propagation segments. The individual element of the propagation channel matrix $h_{m,n}$ is the summation of K (where k=1 to K) propagation paths.

$L_s$ designates an individual propagation segment where $L_s=h_s$, if the individual propagation segment s is equal to S (k, m, n), indicating that the propagation segment terminates with the $n^{th}$ receiver on an IBR. Otherwise $L_s=h_s \times g_{Es}$, ifs is less than S (k,m,n) indicating that the propagation segment terminates with an ECHO device where $h_s$ represents the frequency response of the wireless propagation channel of the $s^{th}$ segment and $g_{Es}$ represents the frequency response of the $s^{th}$ ECHO device (including gain). Thus Eq. 7-2 describes the summation of K propagation paths, each having the products of individual propagation segments comprising a cumulative frequency selective channel response between the transmitter and the nth receiver between two IBRs. As may be appreciated, the adjusting of $g_{Es}$ for each propagation segment contained within a particular channel propagation matrix element of Eq. 7-2 and relative to other channel propagation matrix elements of Eq. 7-1 allows for the dynamic range of the magnitude of an individual channel propagation matrix element relative to the other channel propagation elements to be managed actively through dynamic adjustment of the individual $g_{Es}$, for each segment. As a result an optimal set of gain settings for the segments may be chosen such that an appropriate received signal level for each individual stream is received at the receiving destination IBR from the transmitting source IBR in combination of direct paths between the two IBRs as well as paths utilizing ECHO devices alone or in combination. Such gain adjustment may be made through communications between ECHO devices and IBRs with the feedback of measurements from receivers through the transmitting devices and to the repeating devices. Such measurements may be made directly on signal level or control signals such as pilot signals, control messages, imbedded pilot signals, spread spectrum CDMA signals or other pilot tones or references signals within the signal or and associated out of band channel. Additionally, the control communications may be made in one direction only or in both directions from IBR to ECHO device or ECHO device to IBR or may be made by an ECHO device transmitting to an IBR that relays measurement commands or requests to the transmitting IBR via a receiving IBR which in turn signals the transmitting ECHO device to adjust transmit power or gain or other associated receiving parameters such as receiving antenna selection, antenna switches, parameters in a feedback cancelation circuit associated with an interference cancelling repeater or other RF parameters or signal processing parameters. One such parameter may include the desired stability margin in an interference cancelling repeater such that a specific signal-to-noise ratio or C/I is maintained at all times, or a minimum C/I is maintained or a desired output transmission power is maintained or a particular gain is always maintained independent of the output power. Additionally, alarm conditions may be communicated in such a manner as requested transmit power or desired transmit power of an ECHO device being too high or isolation required for a desired gain setting being too low or insufficient gain being possible and such parameters or performance measurements may be communicated either to IBRs or to a network operation center or other coordinating controller either co-located with IBRs, imbedded in IBRs or other ECHO devices or a remote server configuring and optimizing the network in various embodiments.

Figure 8A:
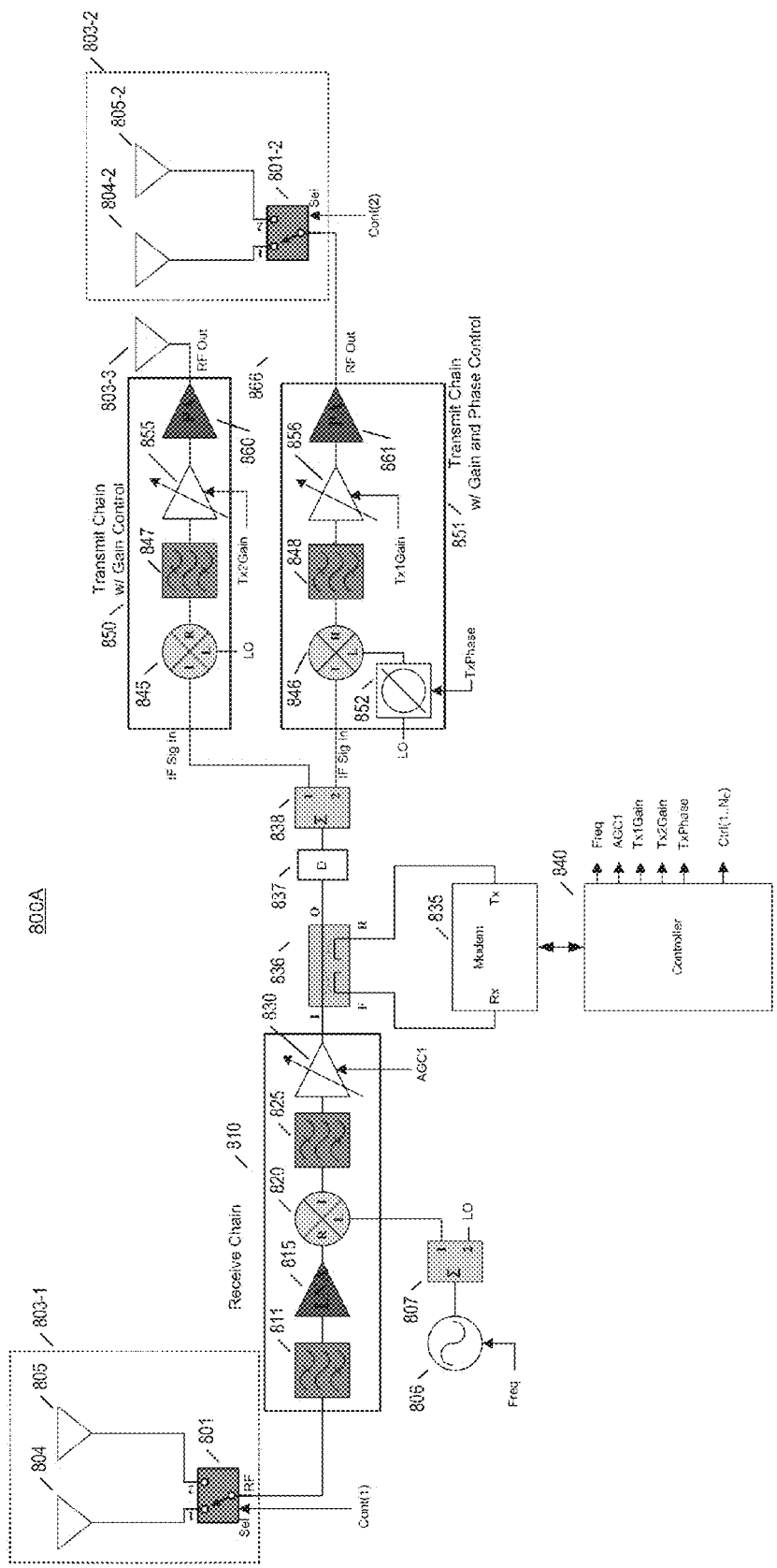
FIG. 8A is a block diagram illustrating an exemplary single stream ECHO Relay according to one embodiment of the invention.

FIG. 8A is a block diagram illustrating an exemplary single stream ECHO Relay according to one embodiment of the invention. The operation of this embodiment is now described from receiving antenna structure 803-1 through transmitting antenna structures 803-3 and 803-2. Antenna structure 803-1 may be a single antenna element or a plurality of antenna elements utilizing a selection switch, or other phased array or beam forming components. As an example depicted with reference to 803-1, antenna element 804 and 805 may be selected utilizing switch 801, a control Ctrl(1) such that one antenna element may be connected to receive chain 810 at any given time. The antenna elements 804 and 805 in the current embodiment are cross-polarized, one being a vertical polarization and the other a horizontal polarization. However, in other embodiments, there may be more than two antenna elements and the antenna elements may be directive antenna elements, patch antenna elements, or other types of antenna elements such as dipoles, collinear dipole arrays, directive array panels, Yagi elements and directional dishes or other types of single and two port antenna structures known in the art. Further, in yet other embodiments, the polarization of the individual antenna elements may be the same or vary, be orthogonal diagonally, or circularly, while in yet further embodiments such elements may be directive gain elements having differing angular orientations to provide diversity. The description of antenna structure 803$x$-$y$ (where x and y represent any of the antennas in any of the figures) should be considered as any one or combination of the embodiments described herein without the need to repeat those variations as described in additional figures in alternative embodiments of the ECHO devices.

Signal is received in ECHO device depicted in FIG. 8A as one embodiment at antenna structure 803-1 and coupled to receive chain 810. Receive chain 810 performs a band pass filtering function with filter 811. The purpose of band pass filter 811 is to provide for band selectivity allowing for operation in one or more channels of a relatively large overall bandwidth. Channel selectivity is performed using a heterodyne structure wherein low noise amplifier 815 provides amplification and mixer down converter 820 provides for frequency conversion utilizing a local oscillator and intermediate frequency (IF) band pass filter (or "Channel Filter") 825 performs channel selectivity. Filter 825 has a bandwidth restricted to the operating channel bandwidth or slightly wider whereas band pass filter 811 has, in the current embodiment, a wider bandwidth which allows for a flexibility of the operating frequency within an overall frequency band. IF band pass filter 825 may be implemented with a ceramic filter, a surface acoustic wave (SAW) filter, a coupled-line filter, a lumped-element filter, or an active analog or digital filter that may be varied in bandwidth, or other such techniques as are known in the art.

Automatic gain control variable amplifier 830 is controlled utilizing AGC1 signal provided by Controller 840. Various AGC control algorithms may be employed. The AGC control provides for an adjustment in the received signal level and the overall gain of the repeater structure allowing for the control of the transmit power level from antenna structures 803-3 and 803-2. Directional coupler 836 provides for the injection and extraction of signal to be received and transmitted by Modem 835. The specific signals utilized by Modem 835 are described later in this specification. The operation of the modem is further controlled and coupled to Controller 840. In this exemplary embodiment, the output of directional coupler 836 is coupled to delay element 837, which may also be a band pass filter in some embodiments or not present in other embodiments. Divider 838 (which may also be called a "split-ter") provides for a splitting of the intermediate frequency signal to two outputs. One output is provided to transmit chain with gain control block 850 while the other IF signal is provided to transmit chain and phase control block 851. Both blocks include a mixer up converter 845 and 846 respectively for converting signal from IF signal in to an RF signal level and band pass filter 847 and 848 respectively for filtering off mixer products which are not desired to be transmitted. The bandwidth of band pass filters 847 and 848 are the same or similar in the current embodiment to band pass filter 811. Transmit AGC amplifiers 855 and 856 are controlled by controller 840 utilizing Tx1Gain and Tx2Gain control signals. The outputs of the variable gain amplifiers 855 and 856 are coupled to power amplifiers 860 and 861 respectively which are then coupled to transmit antenna structures 803-3 and 803-2 respectively. Controller 840 controls the frequency of the voltage controlled oscillator or numerically controlled oscillator in various embodiments, 806, to produce a local oscillator signal which is power divided by splitter/divider 807 and provided to mixer 820 as well as up converters 845 and 846 and potentially other structures in various embodiments. Additionally, control lines one through $N_c$ provide for antenna selection control into antenna structures 803-1, 803-2 and 803-3 as well as additional antenna structure selection controls in alternative embodiments having more than two antenna elements per antenna structure. Controller 840 within FIG. 8A acts to optimize the operation of ECHO device depicted in the embodiments. For instance, the control of the antenna selections to allow for a reduction in coupling between transmitted signals and the received signals of the ECHO device may be performed. Additionally, the adjustment of transmit gains, TxPhase as well as IF AGC1 gain allow for an optimization of transmitter to receiver isolation, and stability. For example, the control of TxPhase to block 852 provides for phase shift of the local oscillator signal into up converter 846. The shifting of phase of the LO signal into the up converter results in a phase shift of the IF signal in relative to the RF signal out of block 851. Such an adjustment may act as a phase weighting capability for the signal transmitted out of antenna structure 803-2. TxGain1 provides for gain settings of the transmitted signal from antenna 802-2, while TxGain2 provides for the gain weighting of signal transmitted from 803-3. The adjustment of gain and phase of the two transmitted signals relative to each other allows for adjustment of the signal coupled back into receiver antenna structure 803-1. Additionally, the adjustment of IF gain, AGC1 by variable gain amplifier 830 does not change the overall "isolation" between the transmit antenna and the receive antenna as the gain is changed evenly between the two transmit chains. The optimization of the selection of the receive antenna, transmit antenna and transmit AGCs and transmit phases relative to each other optimizes the transmitter to receiver isolation allowing for maximum stability and gain in the repeater structure of the current embodiment and various embodiments of the ECHO device depicted in FIG. 8A.

The measurements of the relative stability of embodiments of FIG. 8A may be provided by injecting a signal through the R Port of coupler 836 such that the signal injected is also transmitted out of antennas 803-3 and/or 803-2 and coupled back to receive antenna structure 803-1, which in turn is coupled through receive chain 810 to receive coupler port F of coupler 836 and to receive port of modem 835. Because of the delay between the transmitted signal of the R port of 836 and its reception into the F port of 836 at the modem these signals, if chosen appropriately, may be uncorrelated such that using correlation processing allows for the discrimination of a transmitted signal relative to the received "pilot reference" signal which was injected, transmitted, and re-received, and compared (or correlated) to the originally transmitted reference signal, allowing for an overall measurement of the isolation of the transmitted signal relative to the received signal including the gain provided by variable gain amplifiers 830, 855 and 856. Adjustment of various parameters allows for an understanding of the overall isolation and gain stability of the repeater at any given time. When the signal is injected into coupler 836 by Tx modem port of modem 835, the measured signal level from the F port into the receive port of modem 835 must be less than or equal to the signal level injected from the Tx port. Otherwise, the repeater is unstable and oscillate. In fact, the ratio of the transmitted pilot signal to the receive signal from modem 835 additionally defines the overall carrier to interference ratio and signal to noise ratio that the repeater supports. Additionally this ratio of transmit power divided by received power of the reference pilot signals provides for a stability margin of the repeater. In general, such a stability margin is adjusted to be at least −15 dB and ideally −20 dB or more. Generally the amount of gain from the output of antenna structure 803 through the input of the antenna structures 803-3 and 803-2 must be less than the overall isolation minus the stability margin and thus the adjustment of the various variable gain amplifiers may be computationally computed using MMSE approaches of the transmitted and received reference signal or alternatively utilizing an adaptive approach such as the steepest decent algorithm to achieve maximum isolation utilizing Tx1Gain, Tx2Gain and TxPhase while AGC1 would be adjusted based upon a target isolation margin based upon the isolation margin measured as a ratio of TX power to RX power of modem 835 utilizing pilot signal measurements. Note that the power levels may be frequency selective and therefore an approach monitoring the frequency specific isolation margin may be appropriate in specific embodiments. Such a pilot signal may further include information that, since it is being transmitted as pilot tone, may also carry this information such that the information may be communicated to target devices such as receiving IBRs. Further other modulated pilot reference signals may communicate information to the ECHO device from transmitting IBRs such that the status and control information may be communicated and received to modem 835 and ultimately to controller 840 allowing for the optimization of transmit gain isolation margins and the adjustment of various parameters as described herein.

In another embodiment of an ECHO device depicted in FIG. 8A, the transmit antenna structures 803-2 and 803-3 include a single transmitting antenna each, one having a vertical polarization and the other having a horizontal polarization, whereas receive antenna 803-1 has a single polarization, which, in one embodiment, is a vertical polarization. The transmit gains and/or the transmit phase of transmit chains 850 and 851 may be adjusted so as to provide maximum isolation between the transmitters and the receiver antennas. If no scattering on the structure of ECHO device of the current embodiment is encountered then there is only coupling predominantly between the vertical transmit antenna and the vertical receive antenna. Thus, making the transmit gain of the vertical antenna element 803-2 such that all the transmit power is transmitted from horizontal transmit antenna element 803-3 may be preferable. However, in practice some cross-polarization between the transmit antennas and the receive antenna elements occurs and therefore horizontal transmit antenna 803-3 in the current embodiment may provide for the maximum transmit power used to transmit to the target device which may be another ECHO device or an IBR while transmit antenna element having vertical polarization 803-2 may be used to null the cross-polarization leakage signal from horizontal transmit 803-3 back into vertical receive antenna element 803-1. The phase adjustment by phase shifter 852 and a gain adjustment by Tx1Gain control via variable gain amplifier 856 allows for fine grain adjustment of the cancellation signal coupled to the receiver antenna. However, such a structure is not frequency selective and may only consider a single phase shift, not an equalization approach. Other embodiments within this disclosure discuss equalization structures, which allow for frequency selective cancellation and feedback. In further embodiments of FIG. 8A the antenna devices may be fixed and mounted high gain antenna structures, which during installation may be articulated and aligned, then permanently mounted with mechanical adjustments in azimuth and elevation alignment settings, so as to provide appropriate signal reception and transmission to target devices. Additionally adjustments are made to provide reasonable isolation between the transmitter and the receiver. Part of this adjustment may include the operation of Controller 840 so as to perform adaptive gain and phase adjustments to perform isolation enhancement such that a closed-loop system may be considered during installation. Once again, this closed-loop process may be facilitated utilizing Modem 835 and a pilot reference signal used for measuring the isolation between the transmit to the receive. In alternative embodiments, an electromechanical adjustment may be made to fine tune the alignment of the antenna structures to achieve the designed receive signal level, target receiver alignment, and desired transmit to receive isolation. Such adjustments are during initial installation, or periodically during operation by the controller 840 using appropriate control of electromechanical structures.

An additional function for Modem 835 may be utilized in embodiments where some of or each of every packet or signal received into the repeater are qualified before enabling the transmitter. Such conditions may be required to meet certain regulatory operation of repeaters in some embodiments in unlicensed frequency bands such as Part 15.247 operation. Operation of such a qualification mechanism might be enabled utilizing coupler 835 and specific embodiments in which a signal with a buried pilot reference tone and information signal from a transmitting IBR is detected by Modem 835 and upon detection qualifying the signal as an appropriately received signal which is allowed per regulatory requirements to be transmitted preventing the repeating of arbitrary signals which may not be qualified for repeating by the ECHO devices (or repeaters). Upon the detection of the qualifying tone embedded within the signal to be repeated or relayed, Modem 835 alerts Controller 840 which then makes adjustments enabling the repeater to perform the repeating function. This repeating function and enablement may have a time out associated with it such that the qualification of a specific signal as being permissible to transmit and repeat may require the pilot tone or a "signature tone" to be present for a specific period of time prior to enabling the transmitter and require the transmitter to turn off in the ECHO device if such a tone disappears or is not received for a specific period of time.

Figure 8B:
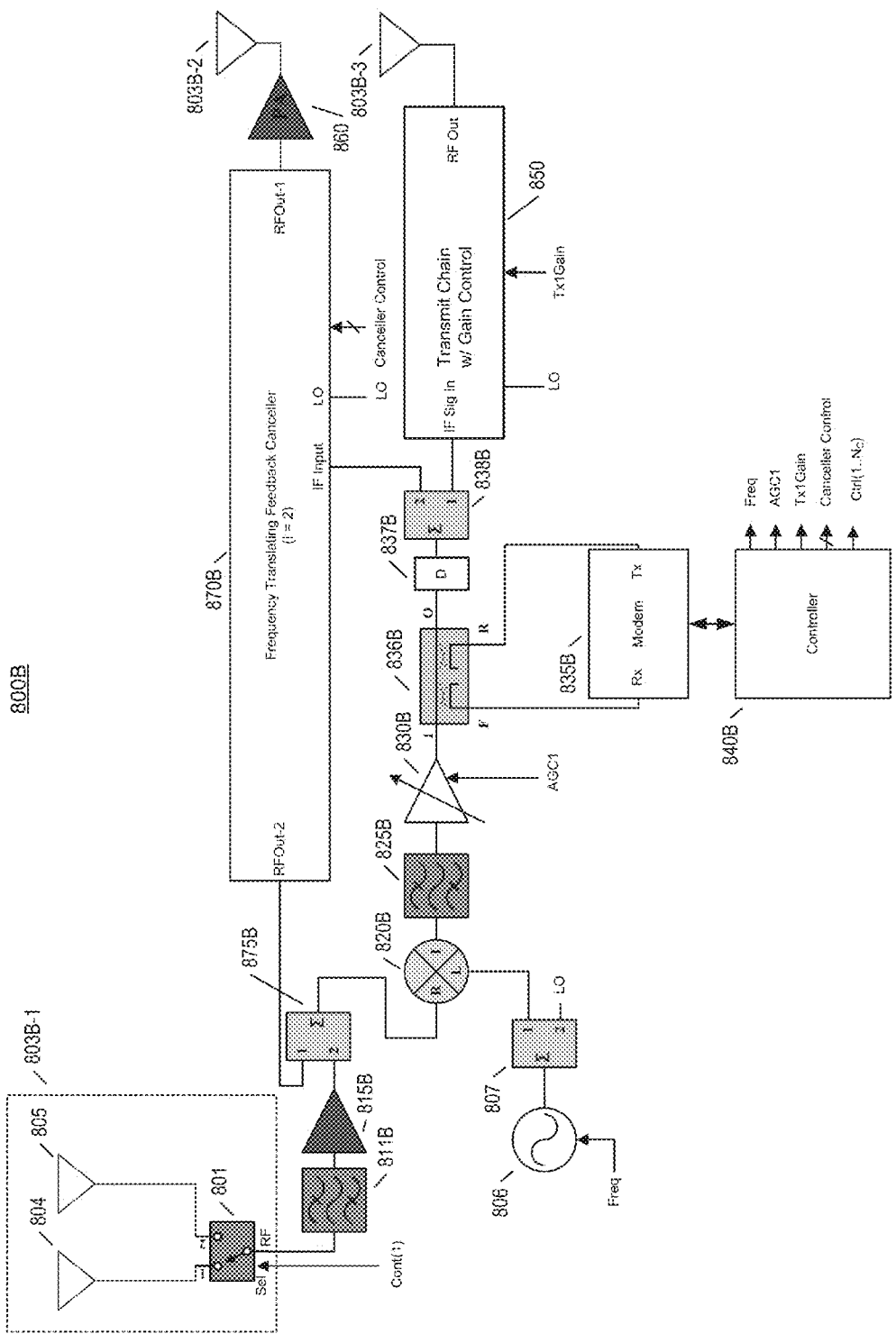
FIG. 8B is a block diagram illustrating an exemplary single stream ECHO Relay including a Frequency Translating Feedback Canceller according to one embodiment of the invention.

FIG. 8B is a block diagram illustrating an exemplary single stream ECHO Relay including a Frequency Translating Feedback Canceller according to one embodiment of the invention.

Referring now to FIG. 8B, an alternative embodiment of an ECHO device utilizing a "Frequency Translating Feedback Canceller", is depicted. Antenna structures 803B-1, 803B-2 and 803B-3 are equivalent to those previously described as 803-1, 803-2 and 803-3 in various embodiments including alternative antenna structures. Bandpass Filter 811B is applied to the output of the selected of the signal received by 803B-1. Low noise amplifier 815B provides amplification to the signal, which then is coupled to a summer 875B. Summer 875B provides the combination of the received signal with the output of the frequency translating feedback canceller 807B from its output port RFOut-2. The signal produced by RFOut-2 of 870B is provided so as to null repeated transmitter leakage from Antenna 803B-2 and 803B-3 into antenna 803B-1 providing for additional isolation and stability margin allowing for operation at higher gain levels. Downconverter 820B provides for a conversion of the summation of the received signal and the cancellation signal from the frequency translating feedback canceller such that an intermediate frequency signal is produced and filtered utilizing Channel Filter 825B. Variable Gain Amplifier 830B provides for the overall gain adjustment for the repeater and typically is used in conjunction with Controller 840B making adjustments in transmit isolation margin or stability margin utilizing AGC1 control signal. The operation of the Modem 835B is similar in specific embodiments to that of 840 of FIG. 8A including the use of control reference and information signals for communicating with other devices and receiving communications from other devices as well as pilot signals for measuring and adapting the various control parameters associated with enhancing the isolation margin of the repeater and making gain adjustments to 830B and other gain settings. The output of Coupler 836B, including injected and coupled pilot signals in some embodiments, passes through a Delay Element 837B and Splitter 838B. Port 1 of the splitter goes to the "Transmit Chain with Gain Control" 850 which up converts the signal as described previously associated with FIG. 8A, which then transmits the signal utilizing antenna structure 803B-3. The second port of Splitter 838B is coupled to the IF input of frequency translating feedback canceller 870B. "I" of frequency translating feedback canceller 807B indicates the number of output ports associated with the canceller. The frequency translating feedback canceller 807B receives a local oscillator signal as well as a cancellation control, the cancellation control coming from Controller 840B, the LO coming from Splitter 807 for use in up converting the IF input signal to the plurality of RF Output Signals RFOut-1 and RFOut-2 (in the current embodiment). It is envisioned that in specific embodiments depicted herein the signal transmitted from 803B-3 may be directed toward the target device. Such a signal may include a vertical or horizontal polarization or both in a directed gain element positioned in azimuth and elevation so as to transmit to a target device. Transmit Antenna 803B-2 may be utilized to perform cancellation into Receive Antenna 803B-1. RFOut-1 is coupled to PA 860 to achieve the transmit cancelation function. Furthermore, RFOut-2 of frequency translating feedback canceller also provides a direct cancellation signal into the receiver chain of the ECHO device. Controller 840B utilizing canceller control signals provides adjustments to structure 870B so as to enhance the overall isolation margin and maximize the desired gain of the ECHO repeater of the current embodiment. In an alternative embodiment the output of frequency translating feedback canceller of RFOut-1 and Antenna 803B-2 may further be used to communicate with the target IBR device allowing for adaptation of polarization or beam forming or other transmit diversity mechanisms or pattern mechanisms such as phased arrays or beamformers in conjunction with Transmit Antenna 803B-3 allowing for higher performance reception at the target receiving device.

Furthermore Modem 835B may be in communication with the target receiving device which may relay control signals to transmitting IBR or ECHO device, which may perform a similar beam forming or polarization adaptation allowing for an adjustment of the received polarization or gain or multipath at Receive Antenna 803B-1 to allow for an enhanced isolation of the ECHO device embodiments depicted in FIG. 8B.

In alternative embodiments, more than one transmitter may be coupled to frequency translating feedback canceller 870B where "I" may be equal to 3 or more. In such an embodiment the additional transmitters may be used to perform frequency selective nulling or spatial beam forming in conjunction with RFOut-1 and Antenna 803B-2 to allow for further transmitter to receiver isolation for the ECHO device or enhanced performance of the transmit signal to the target device.

Figure 8C:
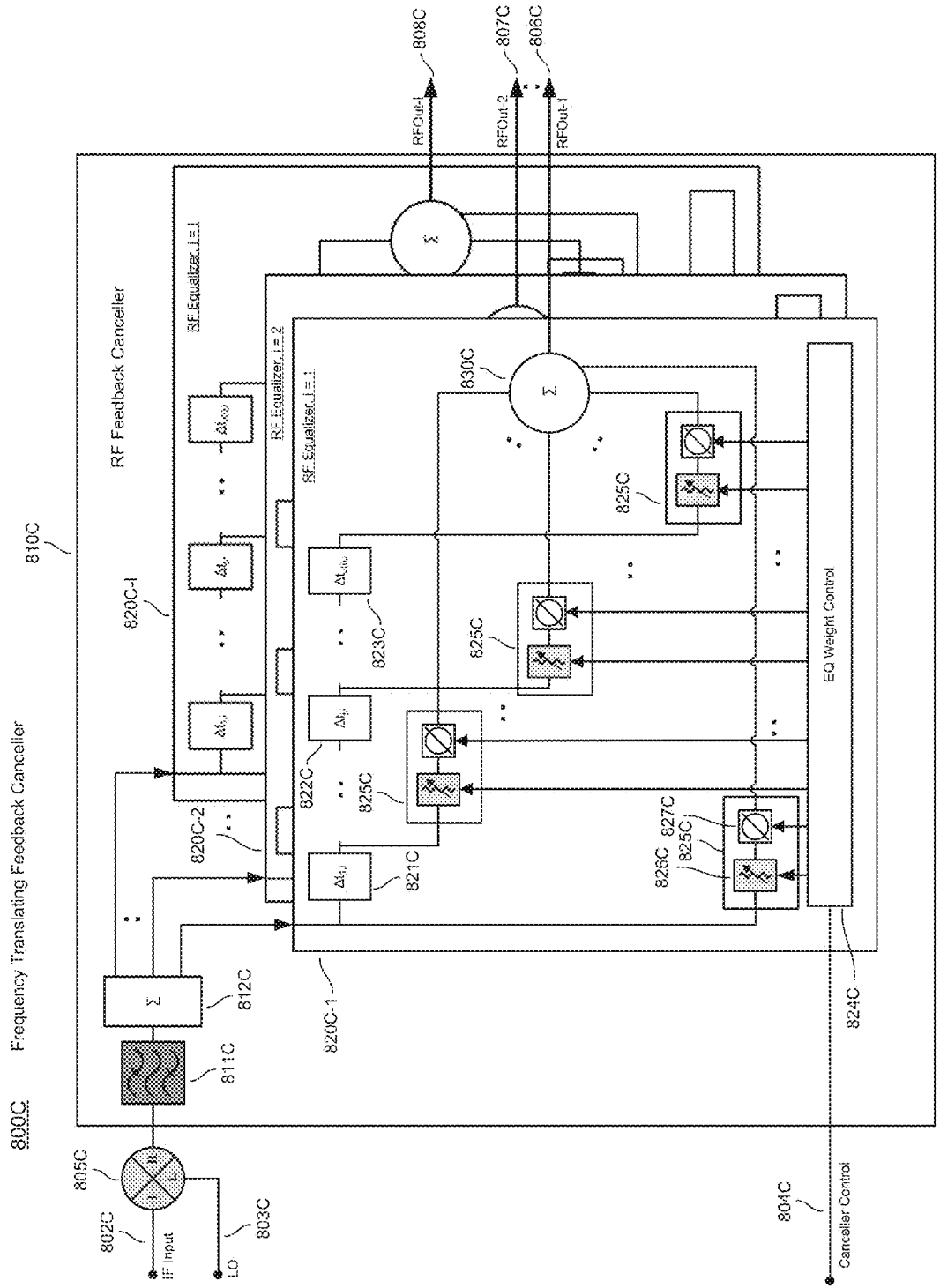
FIG. 8C is a block diagram illustrating an exemplary Frequency Translating Feedback Canceller according to one embodiment of the invention.

FIG. 8C is a block diagram illustrating an exemplary Frequency Translating Feedback Canceller according to one embodiment of the invention. Various embodiments are enabled by the structure of FIG. 8C including an arbitrary number of RF out signals from 1 to "I". IF input signal 802C is received into up converter 805C, which utilizes LO 803C to provide for an upconverted input signal into band pass filter 811C. The band pass filter 811C is of equivalent bandwidth in some embodiments to that of 811B and is intended to select the band of operation, not the specific channel of operation in specific embodiments. Splitter 812C provides for a split input and filtered RF signal to the plurality of transversal RF equalizers comprising 820C-1 through 820C-I. Canceller Control 804C is coupled to the plurality of RF Equalizers 820C-1 through 820C-I. RF Feedback Canceller 810C includes all the components of the frequency translating feedback canceller with the exception of the up-conversion functionality provided by 805C in specific embodiments. Individual RF Equalizer 820C-1 is equivalent in function to 820C-2 through 820C-I. The RF signal from Splitter 812C is provided to the input of 820C-1 which is coupled to Delay Element 821C and Gain and Phase Adjuster 825C. Gain and Phase Adjuster 825C includes a Gain Adjustment Element 826C which may be a variable gain amplifier or a variable attenuator in another embodiment, or alternatively, may in conjunction with Phase Shifter 827C be a vector modulator or complex multiplier circuit in alternative embodiments. The output of Gain and Phase Adjuster 825C is provided to Summer 830C. 830C receives a plurality of inputs from a plurality of gain and phase adjusters. Each gain and phase adjuster is coupled to a different delay of the input RF signal to 820C-1. The output of Delay Element 821C is provided to a plurality of additional delay elements, each of which is coupled to a Gain and Phase Shift Element 825C so to provide gain and phase weighted and delayed inputs from $\Delta t_0$ (no delay), $\Delta t_{1,i}$ (821C) through $\Delta t_{j(i),i}$ (823C). The output of the combination of the Gain and Phase Adjusters 825C of 0 through J(i) are summed by 830C and provided as RFOut-1 Signal 806C. Likewise similar functionality is provided for RFOut-2 through RFOut-I 808C.

Figure 8D:
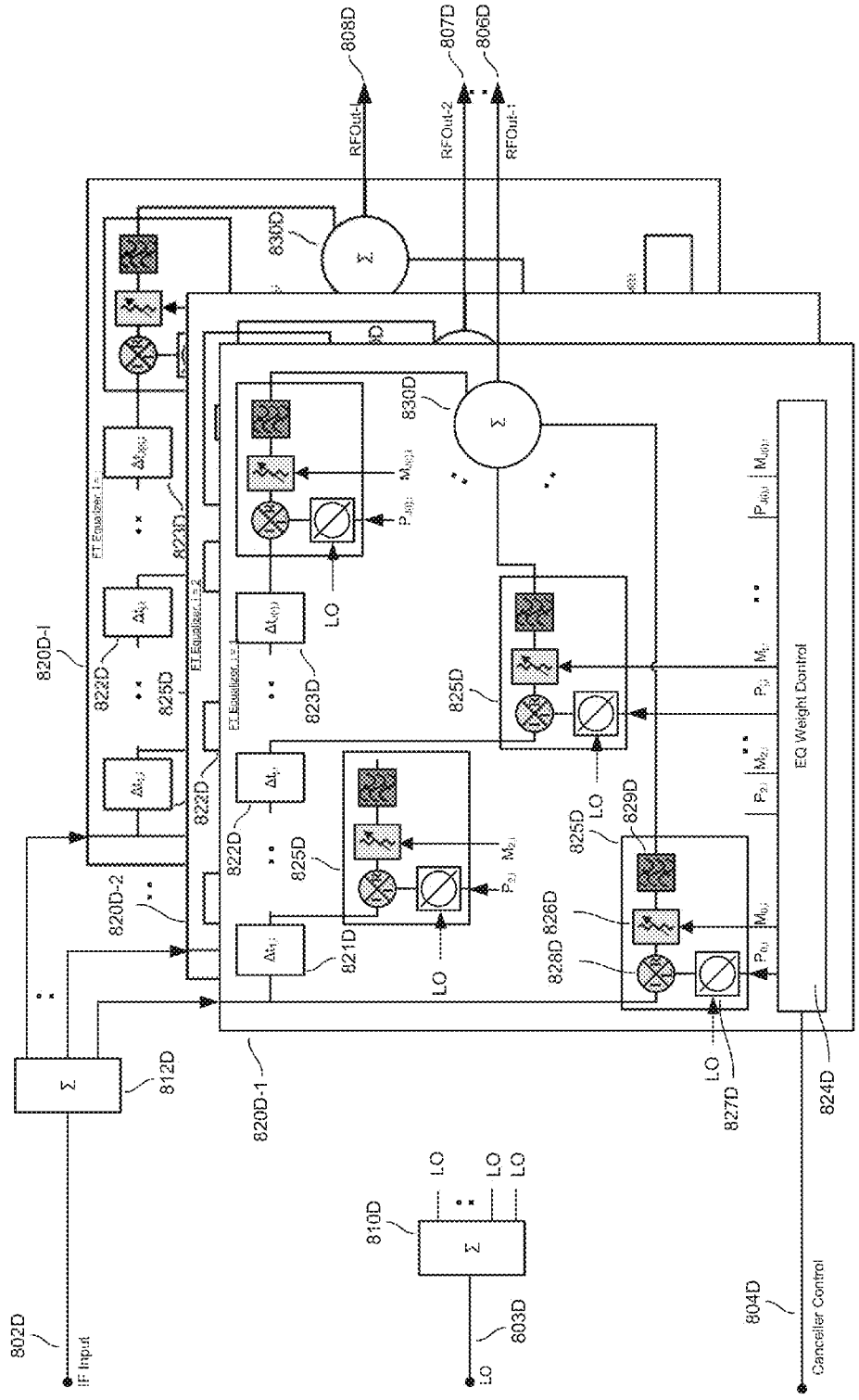
FIG. 8D is a block diagram illustrating an alternative exemplary Frequency Translating Feedback Canceller according to one embodiment of the invention.

FIG. 8D is a block diagram illustrating an alternative exemplary Frequency Translating Feedback Canceller according to one embodiment of the invention.

In an alternative embodiment of frequency translating feedback canceller the IF Input Signal 802D is first split utilizing Splitter 812D and provided to Frequency Translating Equalizer 820D-1 through 802D-I, wherein the Gain and Phase Weight Elements 825D additionally include Mixer 828D, collectively to perform gain, phase, up-conversion and filtering functionality. One benefit of including phase shifter incorporated with gain and up-conversion is that the phase adjustment may be applied to the local oscillator signal from Splitter 810D allowing for a very consistent phase shifting across frequency, so as to apply a phase shifted LO to Upconverter 828D resulting in a phase shifted up-converted signal where there is no frequency selectivity or frequency dependence associated with the phase shift, but rather a very flat and broadband phase shift functionality, which may be applied and further which is advantageous in some embodiments. Gain Adjustment 826D is then applied in band pass filter 829D collectively comprising Up-converting Gain and Phase Adjuster 825D. Furthermore, the phase and gain and up-conversion functionality may be applied by a complex multiplier or vector modulator circuit in alternative embodiments. As with the previous embodiments, the output of delayed copies of the input signal through Delay Elements 821D, 822D, 823D, and so forth, are summed to provide a frequency equalized RF output signal. RFOut-1 through RFOut-I, respectively 806D to 808D, are then provided as the output to the frequency translating feedback canceller. As previously described, one or more of the RF out signals may be used as transmit signals coupled to power amplifiers and transmit antennas whereas one or more RF out signals may be used as direct feedback signals and summed with receive signals directly utilizing a summer.

Figure 8E:
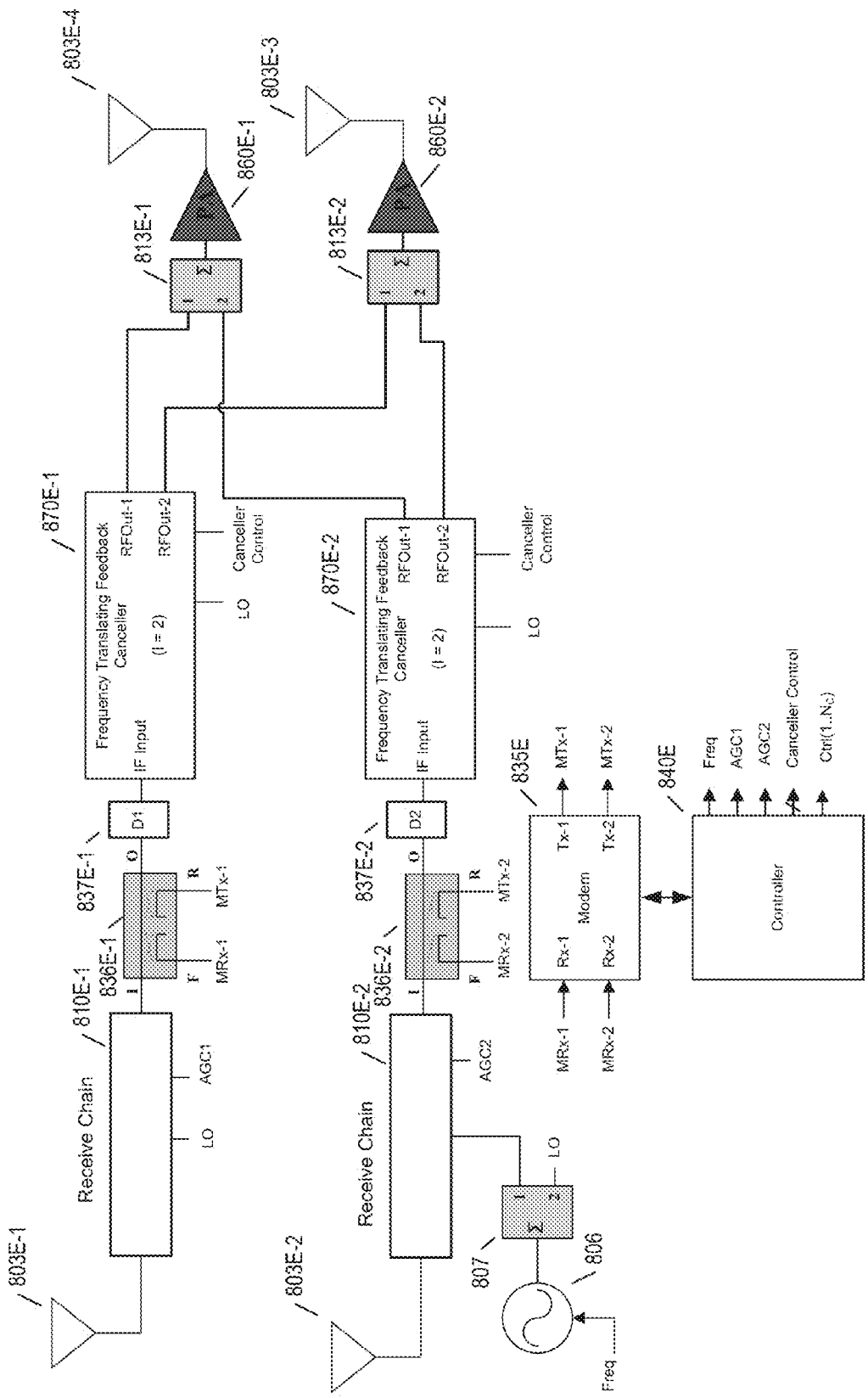
FIG. 8E is a block diagram illustrating an exemplary dual stream ECHO Relay including Frequency Translating Feedback Cancellers according to one embodiment of the invention.

FIG. 8E is a block diagram illustrating an exemplary dual stream ECHO Relay including Frequency Translating Feedback Cancellers according to one embodiment of the invention. FIG. 8E depicts an embodiment of an ECHO device wherein two signals may simultaneously be repeated or relayed. Receive Antennas 803E-1 and 803E-2 may include a single directive antenna structure with cross polarization output ports or may a plurality of elements as previously described. It is envisioned that some embodiments of these antennas may have mechanical or electromechanical articulation so as to maximize the received signal level from a transmitting IBR or ECHO device while minimizing coupling to the Transmit Antennas 803E-4 and 803E-3. The input signals from Antennas 803E1 and 803E2 are passed to Receive Chains 810E-1 and 810E-2 which have Gain Control Signals AGC-1 and AGC-2 respectively and coupled to Controller 840E. The outputs of the receivers are respectively coupled to Coupler Devices 836E-1 and 836E-2 each of which includes coupler ports coupled to Modem 835E in the current embodiment. Modem receive port (MRx-1) and Modem transmit port (MTx-1) are coupled to coupler 836E-1 while MRx-2 and MTx-2 are coupled to coupler 836E-2 associated with Receive Signal from antenna structure 803E-2. The functionality of Modem 835E is such that the same or different pilot signals may be transmitted through MTx-1 and MTx-2. In one embodiment, different signals are transmitted from MTx-1 and MTx-2, allowing for more discrimination of the coupling effects between Receive Chain 810E-1 and 810E-2 and Transmitter Antenna Elements 803E-4 and 803E-3. Next the output of Couplers 836E-1, 837E-2 are respectively coupled to Delay Elements 837E-1 and 837E-2 which in some embodiments may additionally act as filters. Such filters may be implemented as SAW devices providing for delay and filtering functionality. The output of Delay Elements 837E-1, 2 are coupled to Frequency Translating Feedback Cancellers 870E-1, 2 respectively and contain functionality as previously described in embodiments associated with FIG. 8C and FIG. 8D. The outputs of 870E-1, 2 are then coupled to Combiners 813E-1 and 813E-2, which respectively combines Frequency Translating Feedback Canceller outputs, which are respectively coupled to PAs 960E-1, 2 and Transmit Antennas 803E-4, 3 respectively. These antenna elements may have orthogonal polarizations in specific embodiments on both the receive side and on the transmit side so as to cause 803E-1 to have an orthogonal polarization to 803E-2 and 803E-4 to have an orthogonal polarization to 803E-3 allowing for a cross-polarization of similar signals. For instance, the signal received on 803E-1 may mainly be transmitted out of RFOut-2 of 870E-1 and Antenna 803E-3 while RFOut-1 port may be used to generate a cancellation signal to further isolate the coupling from 803E-3 antenna to Receive Antenna 803E-1 whereas the opposite is true with the Feedback Canceller 870E-2. The Transmit Antenna 803E-3 provides the cancellation signal for coupling to Receive Antenna 803E-2 whereas RFOut-1 of 870E-2 is utilized in some embodiments for the primary transmit signal out of 803E-4. As a result, each frequency translating feedback canceller is responsible for a transmit signal out of one RFOut port and a cancellation signal out of the other RFOut port and couples the transmit signal to the opposite polarization from its associated receive antenna and provides a cancellation signal to the RFOut port with a similarly associated transmit antenna polarization to its respective receive antenna polarization.

In alternative embodiments associated with the ECHO device of FIG. 8E, additional transmit output ports may be configured so as to cause frequency translating feedback canceller 870E-1 or 870E-2 to have more than two RF output ports allowing for a plurality of transmit antennas beyond the two transmit antennas 803E-3 and 4, depicted in FIG. 8E, allowing for additional spatial beam forming techniques. Such beam forming techniques provide for an enhanced transmit capability to target IBRs or ECHO devices, as well as for further isolation between the transmit and receive antennas, allowing for additional gain performance of the ECHO device with increased stability margin. In such a case, controller 840E provides additional control information to each frequency translating feedback canceller, so as to optimize their performance. In yet other embodiments, more than two receive chains and receive antennas may be utilized with additional frequency translating feedback cancellers, allowing for additional receive signals for the support of more than two streams based on polarization or based upon spatial multiplexing or separation.

In some embodiments with two receive chains and two receive antennas, polarization isolation between the two receive chains and antennas may be used or alternatively spatial separation may be utilized in conjunction with transmit beam forming from the transmitting IBRs or ECHO devices. In such an embodiment, feedback from controller 840E via modem 835E to target IBR coupled to transmitting IBR or transmitting ECHO device may be utilized to optimize the transmit beam forming parameters. Additionally, in alternative embodiments utilizing a plurality of receive chains beyond the two depicted in FIG. 8E, a received beam forming functionality may be provided by combining the receive signals from each receive chain with appropriate waiting, utilizing the frequency translating feedback cancellers into combiners 813E-1, 813E-2 and beyond. Such receive beam forming capability may be utilized in embodiments with two or more receive antennas and receive chains utilized. The performance of this beam forming capability is further enhanced with additional receive chains employed in various embodiments. In yet further embodiments, the combination of feedback from controller 840E to the transmitting source (IBR or another ECHO device) enables an optimization of transmit beam forming weights. Such techniques may be employed in combination with receive beam forming processing allowing for further optimizations to be performed. Further information received by the modem from the receiving target of the transmissions from 803E-4 and 803E-3 may be utilized as a metric for the optimization of transmit beam forming from the current ECHO device for specific embodiments associated with FIG. 8E as well.

Additionally, in the case of an ECHO device receiving MIMO signals having multiple streams, the adaptation of transmit antenna patterns from a transmitting device to embodiments of ECHO devices may provide for a separation of one stream being predominantly received at 803E-1 and another stream being predominantly received at antenna structure 803E-2. Such a process may additionally be achieved utilizing a receive beam forming function performed in combination with or separate from the transmitting IBR or source ECHO device. Having a receive antenna structure and associated receive chain with predominantly one stream, relative to another receive chain, provides for specific performance advantages when operating in a multiple stream environment so as to prevent a "co-stream" AGC capture resulting in the suppression of a common non-dominant information stream by an automatic gain control algorithm. Such common stream AGC capture provides a reduction in the rank of the effective end-to-end channel propagation matrix, thereby reducing the number of supported streams.

Figure 8F:
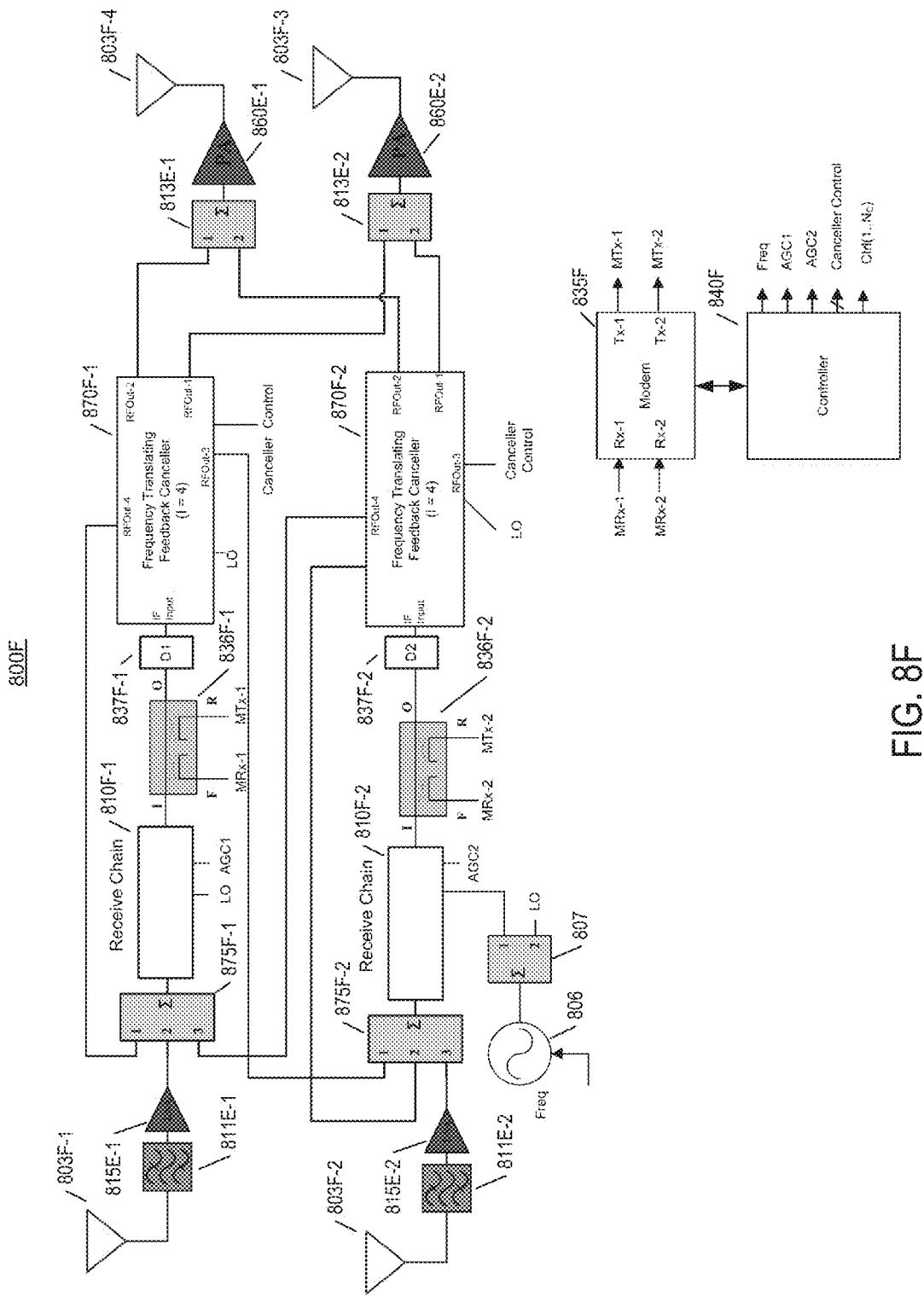
FIG. 8F is a block diagram illustrating an exemplary dual stream ECHO Relay including Frequency Translating Feedback Cancellers utilizing internal feedback according to one embodiment of the invention.

FIG. 8F is a block diagram illustrating an exemplary dual stream ECHO Relay, including Frequency Translating Feedback Cancellers, that utilizes internal feedback according to one embodiment of the invention. Referring now to FIG. 8F, the functionality of embodiments associated with FIG. 8E are further depicted in FIG. 8F with the additional functionality of feedback canceller 870E-1 and 2, having an additional output port coupled to each of the receive combiners 875F1 and 875F2, providing for feedback cancellation directly into the receivers associated with receive antennas 803F-1 and 803F-2. Such a structure allows for direct frequency selective cancellation from each of the frequency translating feedback cancellers (with "I"=4) into each of the receive channels, as well as providing for transmit signal and/or cancellation signal transmission from each of the transmit antennas 803F-4 and 803F-3. Providing for direct feedback cancellation to both receivers from each of the feedback cancellers allows for further degrees of freedom for the use of the transmit antennas to be used for transmit spatial beam forming rather than feedback cancellation in specific embodiments. Further modem 835F provides, in specific embodiments, injected pilot signals into MTx-1 and MTx-2 of couplers 836F-1, 2, respectively, to allow for the optimization of transmit gain, receive signal, and transmitter to receive isolation, as well as stability margin parameters. MRx-1, 2 into modem 835F further allows for receiving of communications control information and pilot information from the target receiver transmitting to the ECHO device of embodiments depicted in FIG. 8F, allowing for the optimization of receive parameters, as well as transmit parameters, based upon receiving of the injected pilot in communication signals from the modem. In yet other embodiments, more than two receive antennas, receive chains and frequency translating feedback cancellers may be utilized with two or more transmit antenna elements and associated transmit chains. The number of receive chains and feedback cancellers need not be equal to the number of RFOut ports. In some embodiments only two transmit RF output ports are present while more than two receive chains may be present in each ECHO device. In specific embodiments, each receive chain may receive a subset of the output of the frequency translating feedback cancellers whereas in other embodiments each transmitter receives outputs from each and every frequency translating feedback canceller. It is important to recall that in addition to cancellation, each frequency translating feedback canceller may be optimized to additionally provide for the transmission of the repeated or relayed signals so as to optimize their reception at the intended receiving IBR or target ECHO devices.

Embodiments of the forgoing ECHO relays may be used in pairs or sets so as to enable FDD, ZDD, or TDD configurations of point-to-point and point-to-multipoint wireless networks. As an example, two unidirectional ECHO relays may be independently operated so as to enable a respective direction of a TDD link. The control of such ECHO relays may be operated in a number or approaches including utilizing the composite control channel to perform detection of transmissions intended for repeating or relaying signal in one direction utilizing a first of the two ECHO devices, which may occur in one set of TDD directions and timings. Additional control may be provided by the ECHO controller so as to allow for the synchronization of the TDD links so as to only allow for repeating at pre-determined timings, which correspond to one of the plurality of TDD communications timings. The second of the two ECHO devices would be configured in a similar way so as to repeat the timing and detections enabling communications in the opposite TDD link directions. In such configurations, the two or more ECHO devices may be co-located or each may be positioned at different locations.

In FDD configurations two or more ECHO devices may be configured so as to each turn their band and/or channel selection so as to repeat or relay differing frequency channels. Further the arrangement of directional antennas (as is the case with TDD configurations) may be aligned so as to support optimized signal transmission and reception to the intended network nodes (IBRs or other ECHO device), which are their respective intended signals to relay or repeat.

In ZDD operation, the individual ECHO devices maybe advantageously positioned by respectively aligning direction antennas in separate locations, providing for additional transmitter and receiver isolation between the two ECHO devices despite operating at the same frequency channels. In other embodiments, a single ECHO device of FIG. 8F, for example, may be utilized such that a subset or receive and transmit antennas may each be arranged to support ZDD relaying or repeating in one or both specific physical directions and feedback cancelation may be utilized so as to provide stability between both the respective Rx and Tx subsets of antennas, but additionally between the oppositely arranged sets or receivers and transmitters. Such an arrangement allows for the operation of a bi-directional ZDD ECHO relay device in a single unit. The description of additional configurations follows, each of which may be embodied as explained as multiple ECHO devices, or integrated as a single device in various embodiments.

Figure 8G:
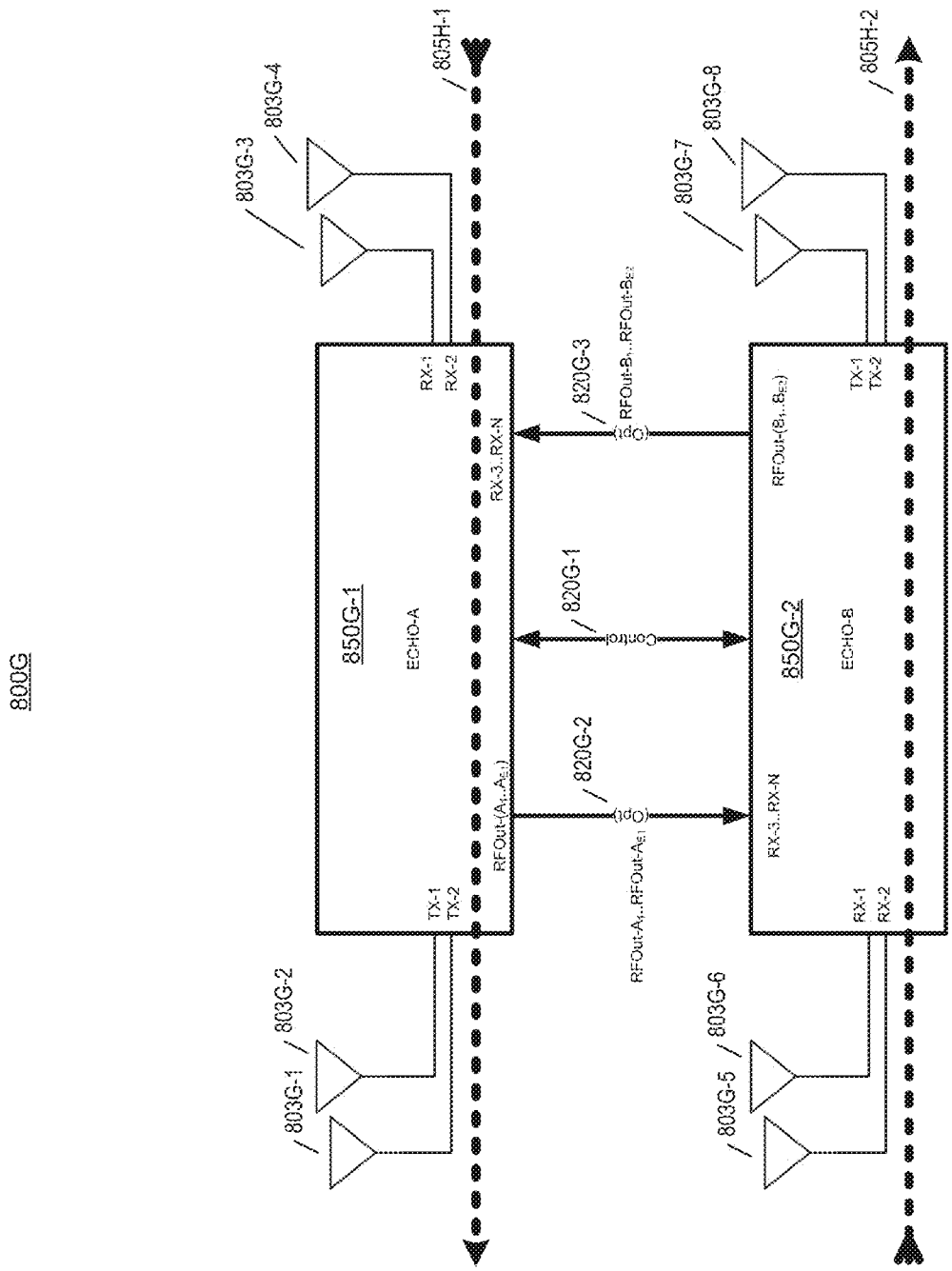
FIG. 8G is a block diagram illustrating an exemplary FDD/ZDD configuration of two dual stream ECHO Relays according to embodiments of the invention.

FIG. 8G depicts a block diagram illustrating an exemplary FDD/ZDD configuration of two dual stream ECHO Relays according to embodiments of the invention. The embodiments of 850G-1 and 850G-2 may be any one of the disclosed embodiments and in any variation or combination. The dashed lines 805H-1, associated with ECHO-A, and 805H-2, associated with ECHO-B, depict the direction of the processing of the signals from the receive antennas (803G-3 and 803G-4 of ECHO-A and 803G-5 and 803G-6 of ECHO-B) to respective transmit antennas (803G-1 and 803G-2 of ECHO-A and 803G-7 and 803G-8 of ECHO-B). In the case of FDD operation, ECHO-A tunes to one frequency channel, and ECHO-B tunes to another frequency channel. The two FDD channels may be in the same or different frequency bands. In such an embodiment, control information may be shared between the respective ECHO controllers of the various embodiments of 8050G-1 and 8050G-2 using control lines 820G-1. Alternatively, a single controller shared between the two devices may provide the control described herein. In embodiments where frequency translating feedback cancellers are utilized, cross device cancelation signals may be shared using 820G-2 and 820G-3 RF Output and RF Input connections. Such cancelation signals may be received into the respective ECHO device and injected into the receivers or the transmitters as described herein, including those embodiments described with reference to FIG. 8F. Such cancelation may be highly beneficial when the separation of operation of the frequency channels for frequency duplexing is small relative to the filtering capability of the individual ECHO devices. When configured for ZDD operation, the embodiments of FIG. 8G include tuning the individual ECHO devices (850G-1 and 850G-2) to the same or overlapping channels of operation.

Figure 8H:
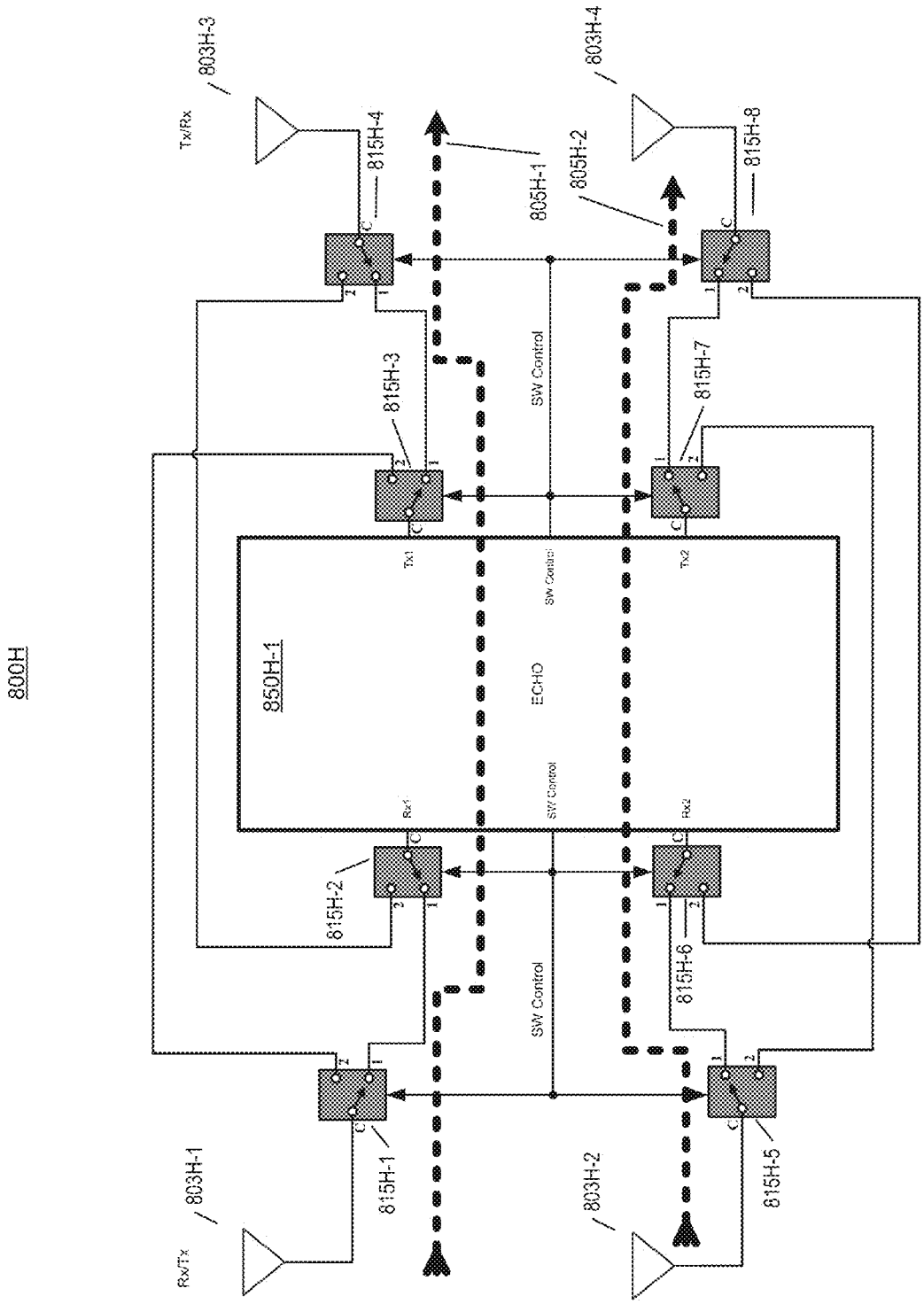
FIG. 8H is a block diagram illustrating an exemplary TDD configuration of a dual stream ECHO Relay according to embodiments of the invention.

FIG. 8H depicts a block diagram illustrating an exemplary TDD configuration of a dual stream ECHO Relay according to embodiments of the invention. In various embodiments of FIG. 8H the ECHO device operates in a time division duplexed mode, wherein during one time period signals from antenna 803H-1 and 803H-2 are coupled to the receive ports of ECHO device 850H-1, respectively by switches 815H-1,-2 and 815H5-5,-6. The ECHO device 850H-1 then performs processing, as previously described herein, and couples the transmitter signals to antennas 803H-3 and 803H-4 respectively by switches 815-3,-4 and 815H-7,-8. Dashed arrows 805H-1 and 805H-2 indicate the signal flow of the foregoing description. During the opposite time periods, when communications are in the opposite direction to that of the opposite time duplexing periods, the controller of ECHO device 850H-1 changes the control (SW Control) causing the switches to change their selection of coupled ports. In such arrangements, the signal flow does not proceed as depicted in dashed lines 805H-1 and 805H-2, but in the opposite direction, from antenna structures 803H-3 and 803H-4 respectively to antenna structures 803H-1 and 803H-2. The signals from antenna structures 803H-3,-4 are respectively coupled to switches 815H-4,-8, which couple the respective signals to the receive ports of 850H-1 via switches 815H-2 and 815H-6. The transmit ports of 850H-1 provide their respective output signals to switches 815-3,-7 respectively to antenna structures 803-1,-2 via switches 815H-1 and 815H-5. In some embodiments of 850H-1, the controller of the ECHO device, where beam forming and or frequency translating feedback cancelation is utilized, causes the value of the various control to be adapted and applied independently between the two time duplexed time periods.

Figure 8I:
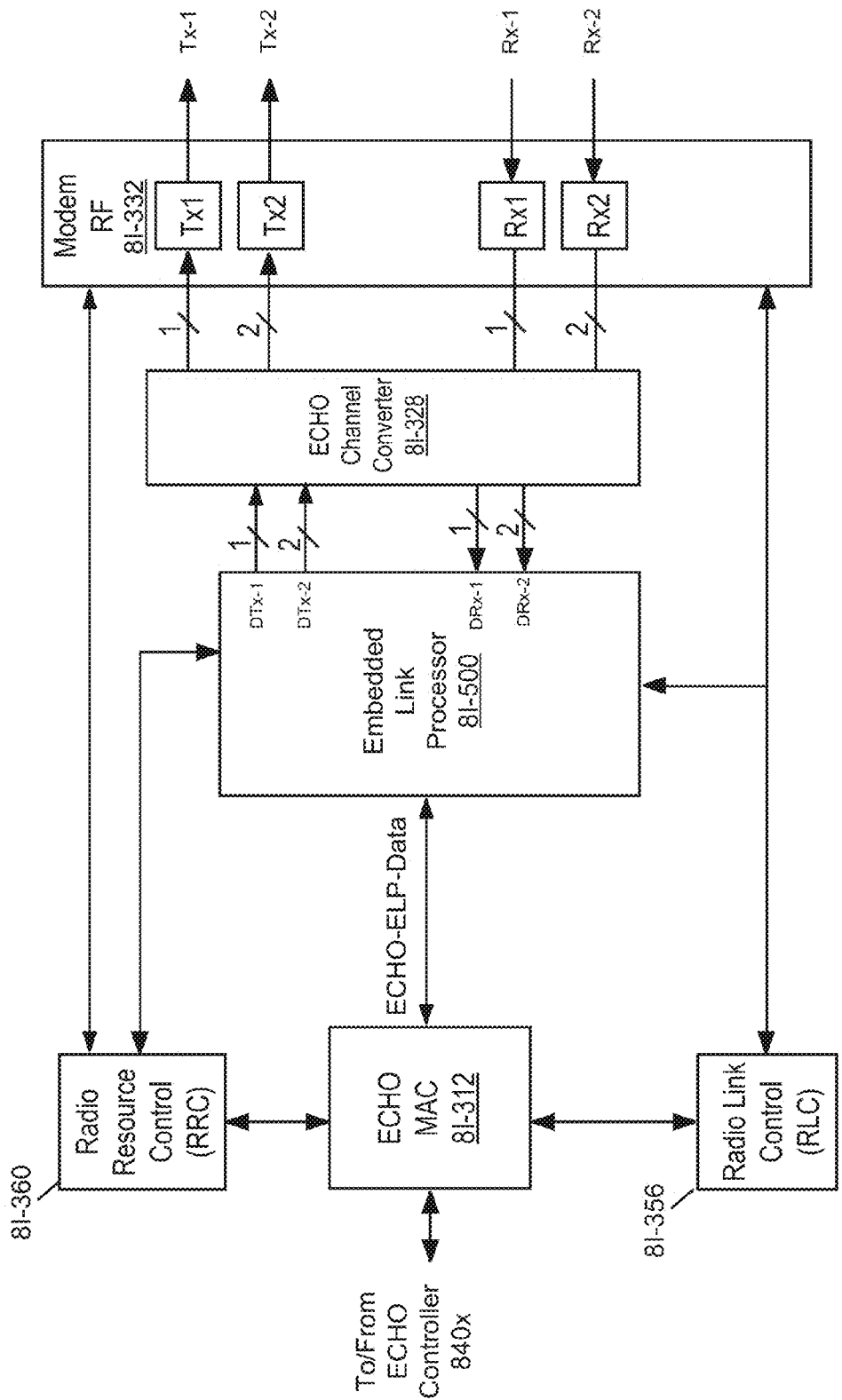
FIG. 8I is an exemplary block diagram of an ECHO Modem including an Embedded Link Processor (ELP).

FIG. 8I is an exemplary block diagram of an ECHO Modem including an Embedded Link Processor (ELP). The ELP 8I-500 functions as described above with reference to the ELP 500 of FIG. 5A, FIG. 5B, and FIG. 5C. Embodiments of ELP 8I-500 provide for the functionality of ELP 500, with no pass-through data summation of a Transmit Symbol Stream input to the ELP. The RRC block 8I-360 and RLP block 8I-356 generally provide functionality similar to the RRC 360A and RLP 356A of FIG. 3A. ECHO MAC 8I-312 provides MAC control functions and MAC Protocol Data Units (MPDUs) to ELP 8I-500. Transmit Symbol Streams including Embedded Control Channels DTx-1 and DTx-2 are digitally sampled information having 12 bits real and 12 bits imaginary data, in one embodiment. Likewise, receive symbol streams including Embedded Control Channels (RTx-1 and RTx-2) are digitally sampled information having 12 bits real and 12 bits imaginary data, in one embodiment. ECHO Channel Converter 8I-328 provides digital to analog conversion and associated filtering to interface with Modem RF 8I-332. Likewise, analog receive signals from Modem RF 8I-332 are converted to digital samples resulting in receive symbol streams with Embedded Control Channels by ECHO Channel Converter 8I-328.

Figure 9A:
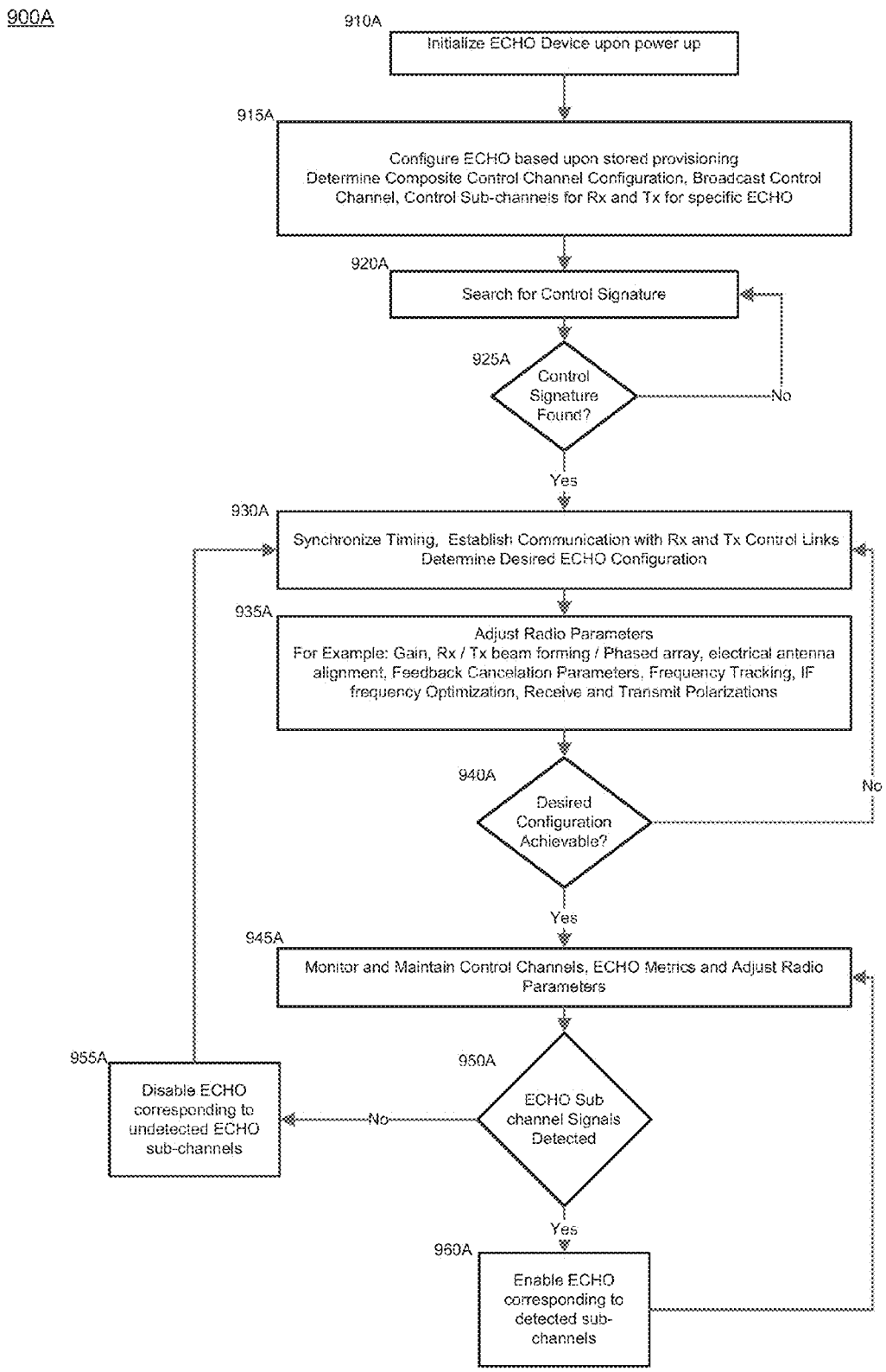
FIG. 9A is a flow diagram of the controller for an ECHO Relay according to one embodiment of the invention.

FIG. 9A is a flow diagram for an ECHO Relay at the controller, according to one embodiment of the invention. FIG. 9A further provides a description of embodiments of the ECHO repeater and a flowchart depicting specific embodiments of the control and operation of a state machine associated with the controller modem and functional elements of embodiments of the ECHO repeater.

In Step 910A, the ECHO device initializes upon power-up. Initialization may include self-tests, configuration, reading of stored parameters from non-volatile memory, the application of those parameters, specific measurements associated with isolation, calibration associated with adjustments in gain and phase of various components and the like.

In Step 915A, the ECHO device is configured based upon stored provisioning information associated with items such as the signature signal or other parameters associated with pilot signals associated with qualified source signals to which the repeater is to search, and to allow for use as a pilot signal, or in the communication with other devices. For instance, an example of stored parameters, in specific embodiments, would include the desired gain of the repeater or stored equalizer settings and the like.

Additionally, parameters associated with the "composite control channel" configuration, a broadcast control channel configuration, control sub-channels for receive and transmit signaling for specific ECHO devices are also determined. The composite control channel, in some embodiments, may be as simple as a spread spectrum pilot signal transmitted from the source transmitter of the signal to be repeated by the instant ECHO device, or it may be as complex as the summation of a series of signals.

One embodiment of a composite control channel may be a direct sequence spread spectrum signal with a chip rate of 25 nanoseconds for an occupied bandwidth of approximately 40 MHz. In such an embodiment, the repeater bandwidth may also be 40 MHz (though not required to be the same), which would be equivalent to the intermediate frequency band pass filter bandwidth as described in various embodiments for the IF channel selection filters. Such a chip rate would additionally allow for the discrimination of time delays from the transmitter of the instant ECHO device to the receiver of the same ECHO device. Such temporal discrimination, in steps of 25 nanoseconds, are achieved as the correlation peaks resulting from a correlation process between a stored copy of the reference pilot signal injected into the repeater by the modem, and a delayed copy of the injected pilot reference signal which has been received as "leakage" from the instant ECHO transmitter into one or more of it's own receivers. Following the injection of the pilot reference signal into the instant ECHO device, the reference pilot signal is transmitted along with the repeated source signal. The transmitted signal from the instant ECHO device, including the injected pilot reference signal, is received as leakage signal into the receiver in the same ECHO device. As mentioned, the coupled and "leaked" pilot reference signal is detected, in one embodiment, by performing a correlation between a stored copy of the transmitted pilot reference signal with the received leaked pilot reference signal in the modem 835F. For instance, Modem 835F performs a correlation of stored copies of the transmitted waveforms into MTx-1 and MTx-2 wherein the delay D1 and D2 would have a delay in excess of a multiple of 25 nanoseconds, or in general, the current signal chip rate. Alternatively the delays required to discriminate the correlation peaks of the transmitter from the receiver pilot reference signals may be provided inherently within components such as the IF band pass filters or the like.

The foregoing processing allows for the transmitted and received waveforms to be discriminated versus time delay using such correlation processing. Such processing prevents the un-delayed injected signals (MTx-1,2, . . . Q) from being confused with the delayed and coupled pilot reference signal transmitted from Antennas 803F-4 and 803F-3 and received by receive Antennas 803F-1 and 803F-2. Therefore, in this embodiment, the chip rate must be high enough so as to allow this temporal discrimination of the transmitted signals pilot reference signals relative to the coupled and received leaked pilot reference signals. Note that in alternative embodiments, the correlation need not be performed based upon a modem (such as 835F) injecting the pilot reference signal, but based upon a pre-existing pilot reference signal previously added to the source signal to be repeated. Such a signal may be a pilot reference signal as described herein, but injected by a source IBR or ECHO device. The foregoing correlation process remains effective so long as the stored reference of the pilot reference signal is contained within the received source signal; thereby allowing the transmitted and repeated signal in view of the delay of the ECHO device to continue to provide temporal discrimination of the leakage signal relative to the source signal as described.

In additional to being used for transmitter to receiver interference management, the pilot reference signal includes a portion of or the entire composite control channel. The chip rate of the composite control channel must be high enough so as to allow the signal information carried to be spread over the 40 MHz or an appropriate bandwidth, the bandwidth being the inverse of the chip rate, and as a result providing processing gain. Such processing gain is important for a number of reasons, including that it allows for the composite control channel to be "buried" within the source signal to be repeated. The composite control channel, in some embodiments, may act as a noise source to the quality of the repeated signal, resulting a limitation of the signal to noise ratio (SNR) of the desired source signal to be repeated. Therefore injecting the pilot reference signal or other components of the composite control channel at a lower signal level relative to the received source signal allows for minimizing the impact to the repeated signal SNR.

Such processing gain is approximately equal to $10*\log_{10}$(BW/BR), wherein BW is the bandwidth of the composite control channel and BR is the bit rate of the information carried within that channel. For instance, a bandwidth of 40 MHz divided by an information bit rate of 1000 bits per second would result in 46 dB of processing gain. As a result the power level of the signal transmitted from Modem 835F in specific embodiments may be equal to the received signal strength indicator (RSSI) from the coupler minus 35 dB, for example, such that the received information signal of the injected pilot signal would have a signal-to-noise ratio of 46 dB−35 dB=11 dB signal-to-noise ratio (SNR). Thus, the injected signal would be "buried" by 35 dB relative to the source signal to be repeated. Such an SNR (11 dB) would be more than sufficient typically for the demodulation of a BPSK signal in one example. In alternative embodiments, different ratios of the RSSI to the transmitted injected spread spectrum signal or composite control channel into Coupler 836F-1 and 836F-2 may be used so as to optimize particular desired information rates and performance. For instance, a desired information bit rate of 100 bits per second would provide for an additional 10 dB of processing gain, thereby allowing for the signal to be injected at least 10 dB lower than in the previous example.

The structure of a composite control channel in one embodiment is a spread spectrum signal with a chip rate of 25 nanoseconds, as discussed, and additionally include an orthogonal code such as a Walsh function, which allows for each injected signal to be orthogonal with all other injected signals providing for less interference between different injected signals comprising a composite control channel. Each injected signal may be from a different ECHO device, IBR, or ECHO MODEM channel (MTx-i). As a result, signals in each control channel collectively sum together in an orthogonal mode, and the composite control channel, in one embodiment, is made of injected and synchronized signals from multiple sources. Each orthogonal code may be assigned to an IBR or an ECHO device or ECHO device IF modem coupler (such as 836-1 and 836-2 for example). Such an arrangement allows for specific sub-channels to be utilized to listen to transmissions from specific IBRs or ECHO devices or to transmit from a specific IBR or ECHO device. Alternatively the orthogonal codes may be assigned according to the receiving device rather than the transmitting device.

In one embodiment, the orthogonal code is synchronized to specific timings of the PN code (potentially already embedded with the source signal), so that all orthogonal codes for all such sub-channels are appropriately aligned in time so as to maintain orthogonally in a pre-determined configuration of the timing retrieved from non-volatile memory. The PN code, as is known in the industry, may be a maximal length M code, a Golay code, a gold code or any one of codes known and used in the art. Further the orthogonal codes may be Walsh codes, Walsh Hadamard codes, CAZAC codes, Zadoff Chu codes, or any one of a number of orthogonal codes that are known in the art. The modulation used on the channel may be BPSK, QPSK, QAM, FSK, AM, OFDM or any number of known modulations. Furthermore, a DSSS or CDMA modulation such as that used in 802.11, IS-95, CDMA2000 or WCDMA/HSPA may be employed.

Upon provisioning, the specific assignment of orthogonal codes, in one embodiment, to specific target transmitters and target receivers of the ECHO device are stored in non-volatile memory. The specific PN sequence are stored to allow the ECHO device to first search for the PN sequence within the source signal and then to search for the specific source transmitter to which it is assigned to be repeating or relaying as well as the signals for each stream from a specific IBR. Different embodiments may have a different orthogonal code assigned to each source stream to be repeated or relayed.

Such a composite control channel signal may carry information in the form of a BPSK signal and may carry pilot channels or symbols that provide for phase reference. In one embodiment, a pilot channel, which may have the Walsh 0 code (all ones or all zeros), is provided, whereas other sub-channels may have other Walsh codes configured for them.

As the configuration process of FIG. 9A continues in Step 915A, a broadcast control channel or sub-channel with a specific assigned Walsh code is configured which includes, in some embodiments, information associated with the current performance of the network or updated parameters or potentially software updates or the like. In some exemplary embodiments, a particular control channel may be assigned to convey updated software for an instant ECHO device while continuing normal operation of such device as a repeater or relay. Such software update control channel, or another designated control channel, may also convey messages causing such ECHO device to stop repeating designated source signals temporarily in order to change over to such updated software. For example, such a change over may be scheduled at a time when data networking traffic amongst the IBRs is minimal such as in the middle of the night.

The control sub-channels for receive and transmit signals for a specific ECHO device may also be communicated over the broadcast control channel allowing the specific Walsh codes or orthogonal codes in various embodiments to be dynamically assigned to each device within the network based upon the serial number or other unique identifiers of each ECHO device within the network. Such an approach may be similar to DHCP for IP address assignment to MAC addresses within IP subnets utilizing network address translation via routers.

In Step 920A, once the specific PN sequence for the local network is configured it is searched. Additionally target sub-channels are searched for so as to allow repeater configuration and enablement in some embodiments. In Step 925A, the specific control signature is tested to determine if it is found or not. The "signature" is the target Walsh codes in combination with the PN sequence allowing for the determination of the desired source signals to be repeated in one embodiment.

If such a signature is not detected, the ECHO device continues to search for it in Step 920A. When the control signature is found, Step 930A is performed. The timing is synchronized to the pilot signal and the control signal. Further, the transmitter's PN sequence is synchronized to the received PN sequence of the control signature and pilot channel of the composite control channel.

Next, the ECHO device establishes communications with the intended destination receive device via receive and transmit control links that utilize the composite control channel and attempts to receive information from its source transmitter device. The instant ECHO device uses the control signature of a specific sub-channel to determine if the desired ECHO configuration stored in the non-volatile memory is feasible and that communications with the destination and source IBR or ECHO devices allow communications. In such a configuration, in some embodiments, the present ECHO device transmits to the destination receiving IBR or ECHO device utilizing an assigned orthogonal code added to the synchronized composite control channel. The destination receiving IBR or ECHO device demodulates the composite control channel looking for the signature of the instant ECHO device, and demodulates the information. The destination device may then forward the received information to either a central control function or directly to the source transmitting IBR. Such forwarding allows for the communication of feedback information from the receiving ECHO device to the transmitting source device for use in optimization of RF parameters. Such communication to the instant ECHO device may utilize a different common control channel sub-channel and/or a different orthogonal code of the composite control channel, from that transmitted by the instant ECHO device.

Once communication has been established, at Step 935, the radio parameters in the instant ECHO device are adjusted. Example radio parameters may include: the current gain of the receive and transmit beam forming parameters, phased array parameters, electrical antenna alignment, electromechanical adjustment, alignment of transmit and receive antenna elements, feedback cancellation parameters to enhance transmit to receive isolation, gain margin, stability margin, and C/I of the transmitted signal may be measured, adjusted or otherwise monitored for achievability. Other RF parameters may include frequency tracking, channel bandwidth, IF frequency optimization and centering as well as receive and transmit polarization adjustments. These are some specific examples of radio parameters, which may optimized so as to allow the current ECHO device to achieve particular performance goals as stored during provisioning.

In Step 940, it is determined if the desired performance goals are achievable based upon the desired configuration and communications are established in Step 930A. Additionally, it is determined if the transmission signatures of the source IBR or ECHO device to be repeated are detected appropriately. Further, it is determined whether transmissions to the destination IBR or ECHO device have been received and relayed back from the source device. In some embodiments, it is determined whether the minimum target for the gain and the desired isolation margin of the repeater has been appropriately achieved or if other performance parameters are achievable which are critical to the system performance. If the answer is no to these critical configuration tests, processing returns to Step 930A to re-synchronize and determine a different desired ECHO configuration for further adjustments made in 935A.

Once the desired performance level or configuration is achieved, processing proceeds to Step 945A wherein the composite control channels are monitored and maintained. Maintenance involves adjustment of RF parameters to maintain the current performance of the communication links as well as the performance of the repeater. ECHO metrics, in some embodiments, are collected on the received signal as well as various isolation metrics, which may be communicated to the source transmitting ECHO or IBR device or to the destination receiving ECHO or IBR device. Additionally, certain metrics or commands are transmitted from the source transmitting ECHO or IBR device and received at the instant ECHO, thereby allowing for the adjustment of radio parameters to achieve the desired goals within the instant ECHO. Processing then proceeds to Step 950A wherein the ECHO sub-channel signals are determined if they are individually detected. If they are detected then repeating is enabled and the monitoring and maintaining is continued. If they are not detected then the ECHO relay or repeating channel is disabled for the specific receiver corresponding to the undetected ECHO sub-channels so that indiscriminant repeating of unintended signals is not performed. In some embodiments, such qualifying of repeater signals is required for FCC regulations in unlicensed bands, allowing such regulation to be satisfied. As a result, indiscriminate repeating is not performed but repeating of signals by a known transmitter is performed exclusively.

If a signature of a desired target source signal or control channel is not detected for a period of time, processing then proceeds to Step 930A wherein the process is begun for re-synchronizing. This may require re-adjusting radio parameters so as to find and locate the correct frequencies and other radio parameters required to detect ECHO sub-channels, thereby allowing the repeater to be enabled in the repeating step.

Figure 9B:
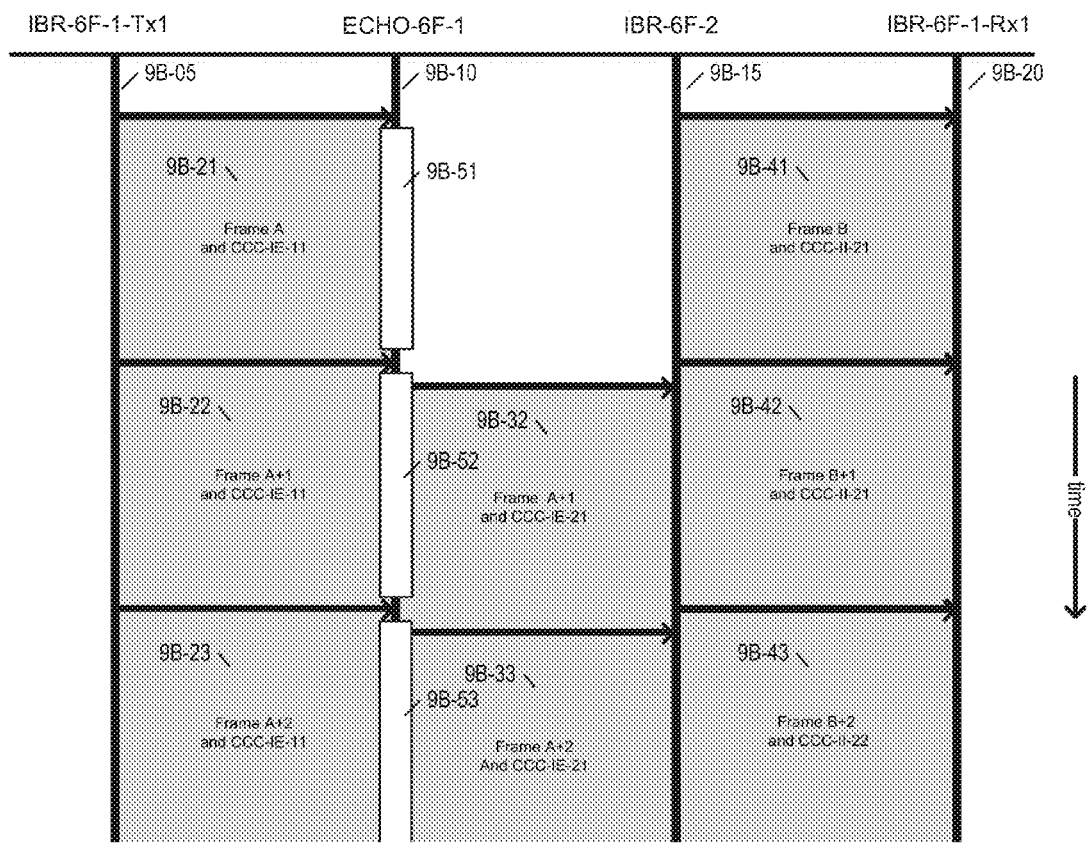
FIG. 9B is a message sequence chart for a network of IBR radios and an ECHO Relay deployed in a point-to-point (PTP) configuration.

FIG. 9B is a message sequence chart for a network of IBR radios and an ECHO Relay deployed in a point-to-point (PTP) configuration. FIG. 9B provides an example of the qualification and processing of an ECHO device within a network of IBRs transmitting to the ECHO device. Additionally a destination device receiving from the ECHO device is depicted in a protocol diagram as well. IBR-6F-1-Tx1 (9B-05) transmits Frame A and the composite control channel (embedded within the frame) including sub-channel CCC-IE-11 from the IBR 9B-05 to ECHO-6F-1 (9B-10). The frame is qualified during processing of the composite control channel, as described associated with FIG. 9A, during processing time period 9B-51. Note that frame A is not being stored and repeated by ECHO-6F-1 (in this embodiment) because no target control signature has been found for a long enough duration so as to qualify the packet to be repeated. Upon the receiving of Frame A+1, the composite control channel including sub-channel CCC-IE-11 has been detected and the frame A+1 has been enabled for real time RF repeating per the previously disclosed embodiments. This transmission can be seen as 9B-32. Additionally, further processing is performed during time period processing 9B-52 by the ECHO device. This processing includes the further detection of the composite control channel including the source signal signatures, which qualify for continued repeating. If such signatures were not found, then within a predetermined time period, the repeating by the ECHO device would stop in the current embodiment.

Additionally, information to be communicated to both the destination device (IBR-6F-2) as well as to be relayed to the source device IBR-6F-1 is injected during the processing step 9B-52 by ECHO-6F-1. Further, Frame A+1 is repeated during step 9B-32 and includes the composite control channel code CCC-IE-21 along with any other previously present composite control channels. The composite control channel information is received by IBR-6F-2 then relayed to IBR-6F-1 within Frame 9B-43 as composite control channel CCC-II-22. Any information a destination IBR wishes to communicate to ECHO-6F-1 may be communicated in such a manner. Therefore, any closed loop optimization such as metrics intended for the transmitting IBR, IBR-6F-1 would be communicated via IBR-6F-2.

As disclosed, the composite control channel is utilized in the communication with other nodes of the network (ECHO and IBR devices), and utilized for stability, adaptation, and gain control of the current ECHO device. Additionally, such a composite control channel is for the satisfaction of a frame by frame qualification of the source that is repeated. Such qualification allows for the satisfaction of FCC or other regulatory requirements for operation in specific bands. Such testing of each frame may be performed in a number of different manners in various embodiments. In one embodiment, an entire frame may be detected to qualify for the repeating of the next frame. In alternative embodiments, the delay of the receiver may be used to qualify each signal prior to transmission. For instance, referring FIG. 8F, the modem receives MRx-1 signal prior to the delay block 837F-1. Therefore, if the delay of 837F-1 is long enough to perform a detection of the control signatures of the composite control channel, then the ECHO device may be enabled and allow a real time frame by frame qualification.

Figure 10:
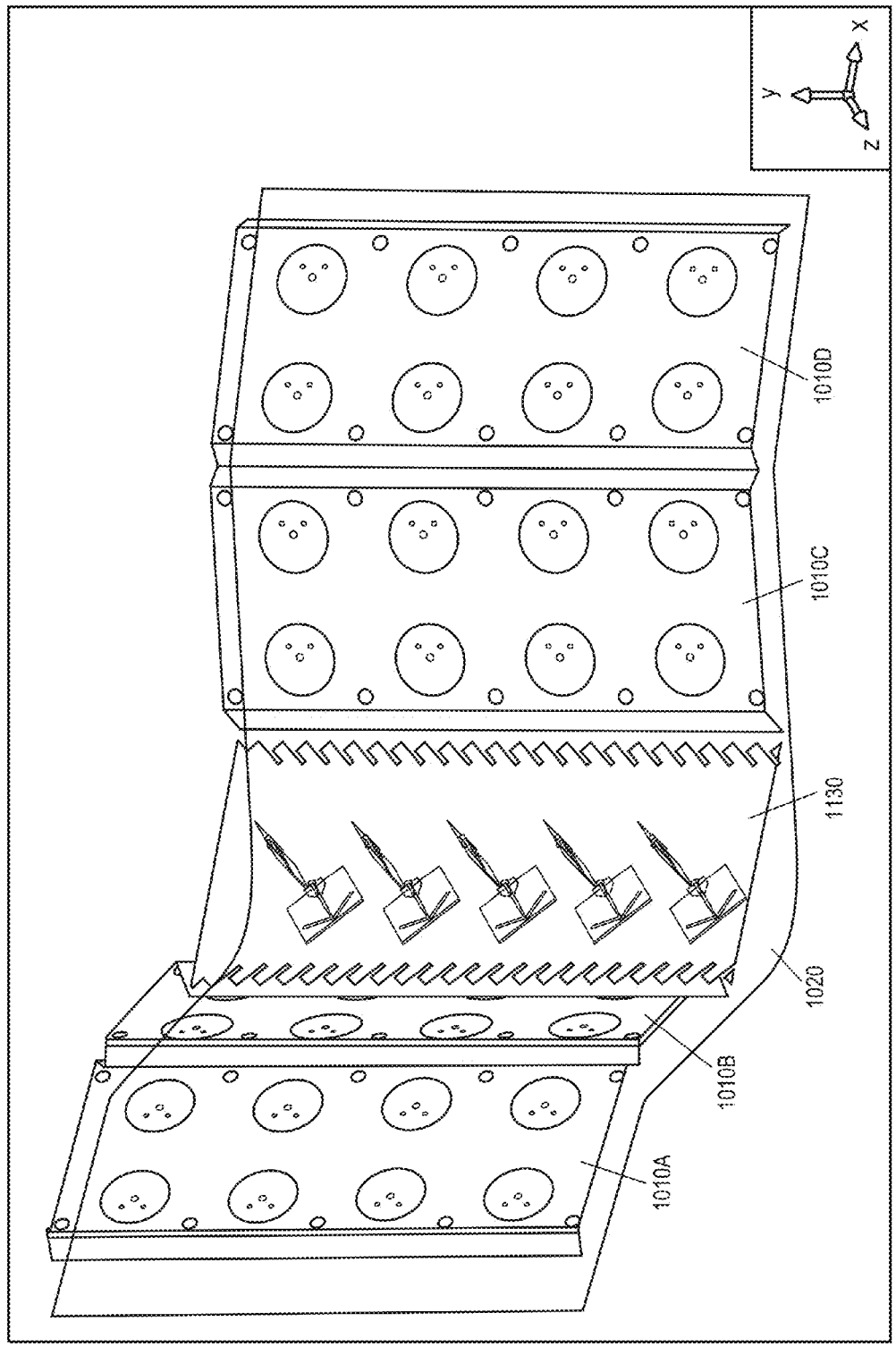
FIG. 10 is a block diagram of an ECHO antenna array according to one embodiment of the invention

As described in greater detail in U.S. Pat. No. 8,238,318 and U.S. patent application Ser. No. 13/536,927 and incorporated herein by reference, various antenna configurations may be utilized in point-to-point and point-to-multipoint embodiments of the current invention. With reference to FIG. 10, a block diagram of an exemplary IBR antenna array is depicted. Such an array may also be used in part or in entirety as a receive and/or transmit antenna array for an ECHO device according to one embodiment of the invention. As the array includes a plurality of antenna panels, each panel may include one of the antenna structures or individual antennas having the antenna structures of, for example, antenna structure 803-1. In an ECHO device, normally two such antenna arrays having some or all of the antenna panels depicted in FIG. 10 are utilized with an azimuthal directional bias different for each array or for each collection of one or more such antenna panels to optimize link performance between the instant ECHO and the source and destination devices.

Figure 11:
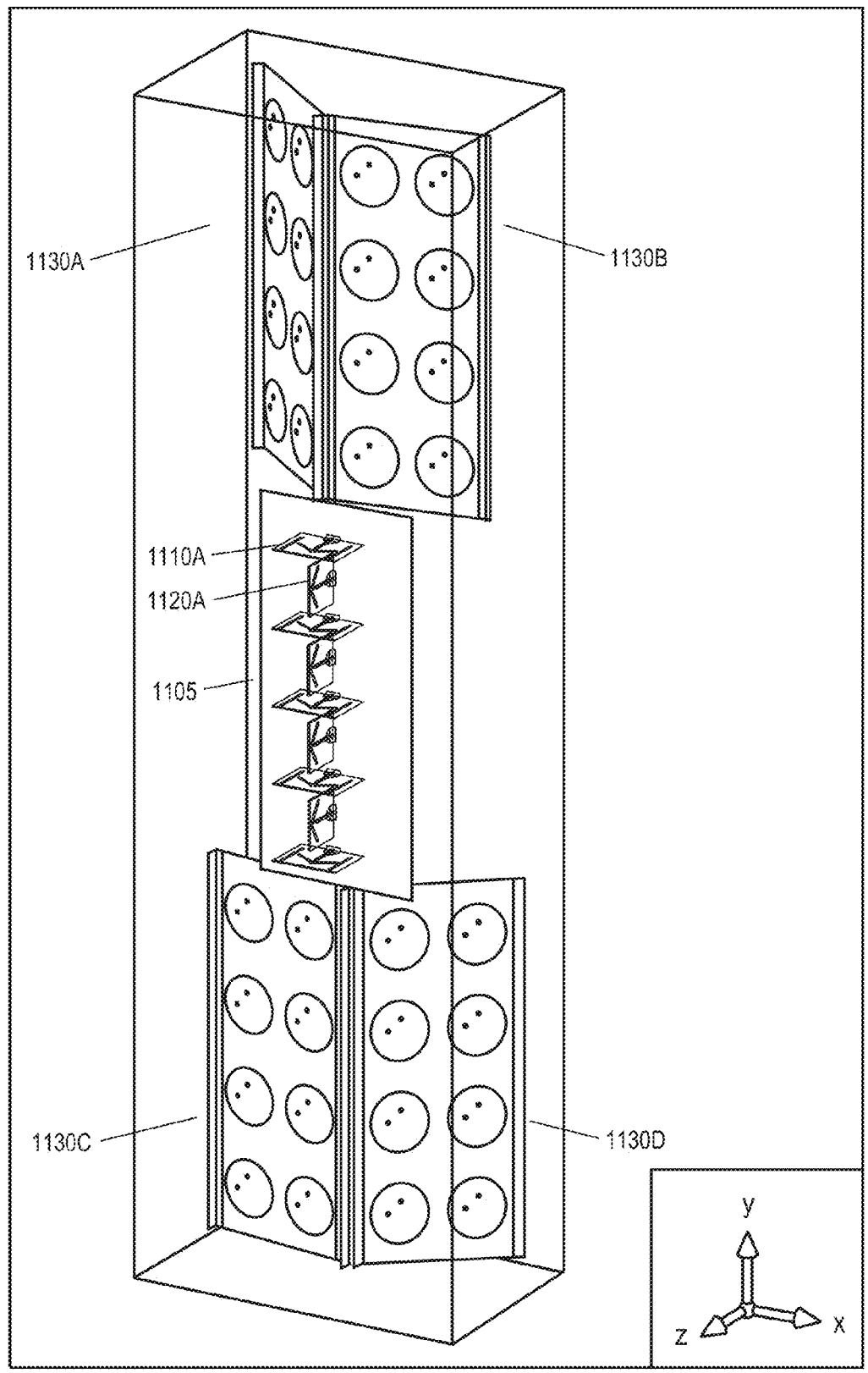
FIG. 11 is a block diagram of an ECHO antenna array according to one embodiment of the invention.

While FIG. 10 is a diagram of an exemplary horizontally arranged intelligent backhaul radio antenna array, FIG. 11 is a diagram of an exemplary vertically arranged intelligent backhaul radio antenna array that may also be used in part or in entirety as a receive and/or transmit antenna array for an ECHO device according to one embodiment of the invention. The depicted antenna arrays shown in FIGS. 10 and 11 are intended for operation in the 5 to 6 GHz band. Analogous versions of the arrangement shown in FIGS. 10 and 11 are possible for any bands within the range of at least 500 MHz to 100 GHz as will be appreciated by those of skill in the art of antenna design.

The exemplary transmit directive antenna elements depicted in FIGS. 10 and 11 include multiple dipole radiators arranged for either dual slant 45 degree polarization (FIG. 10) or dual vertical and horizontal polarization (FIG. 11) with elevation array gain as described in greater detail in U.S. patent application Ser. No. 13/536,927 and incorporated by reference herein. In one exemplary embodiment, each transmit directive antenna element has an azimuthal beam width of approximately 100-120 degrees and an elevation beam width of approximately 15 degrees for a gain Gqt of approximately 12 dB.

The receive directive antenna elements depicted in FIGS. 10 and 11 include multiple patch radiators arranged for either dual slant 45 degree polarization (FIG. 10) or dual vertical and horizontal polarization (FIG. 11) with elevation array gain and azimuthal array gain as described in greater detail in U.S. patent application Ser. No. 13/536,927 and incorporated herein. In one exemplary embodiment, each receive directive antenna element has an azimuthal beam width of approximately 40 degrees and an elevation beam width of approximately 15 degrees for a gain Gqr of approximately 16 dB.

In exemplary ECHO devices, it may be preferable to use only the "receive" antenna elements depicted in FIGS. 10 and 11 for their higher azimuthal directivity properties in both transmit and receive. For certain FDD and/or ZDD applications, such exemplary ECHO devices may have certain antenna elements assigned specifically for transmit only while in other applications (including certain FDD and/or ZDD scenarios), and especially in TDD applications, the same antenna elements may be usable for both transmit and receive within an exemplary ECHO device.

Preliminary measurements of exemplary antenna arrays similar to those depicted in FIG. 10 show isolation of approximately 40 to 50 dB between individual transmit directive antenna elements and individual receive directive antenna elements of same polarization with an exemplary circuit board and metallic case behind the radiating elements and a plastic radome in front of the radiating elements. Analogous preliminary measurements of exemplary antenna arrays similar to those depicted in FIG. 11 show possible isolation improvements of up to 10 to 20 dB for similar directive gain elements relative to FIG. 10. For ECHO applications where multiple such arrays (or sub-elements thereof) may be physically and azimuthal directionally disparate as depicted, for example, in FIG. 14, additional isolation improvements of a further 10-20 dB (or more) are expected.

Other directive antenna element types are also known to those of skill in the art of antenna design including certain types described in greater detail in U.S. patent application Ser. No. 13/536,927 and incorporated herein by reference.

Figure 12:
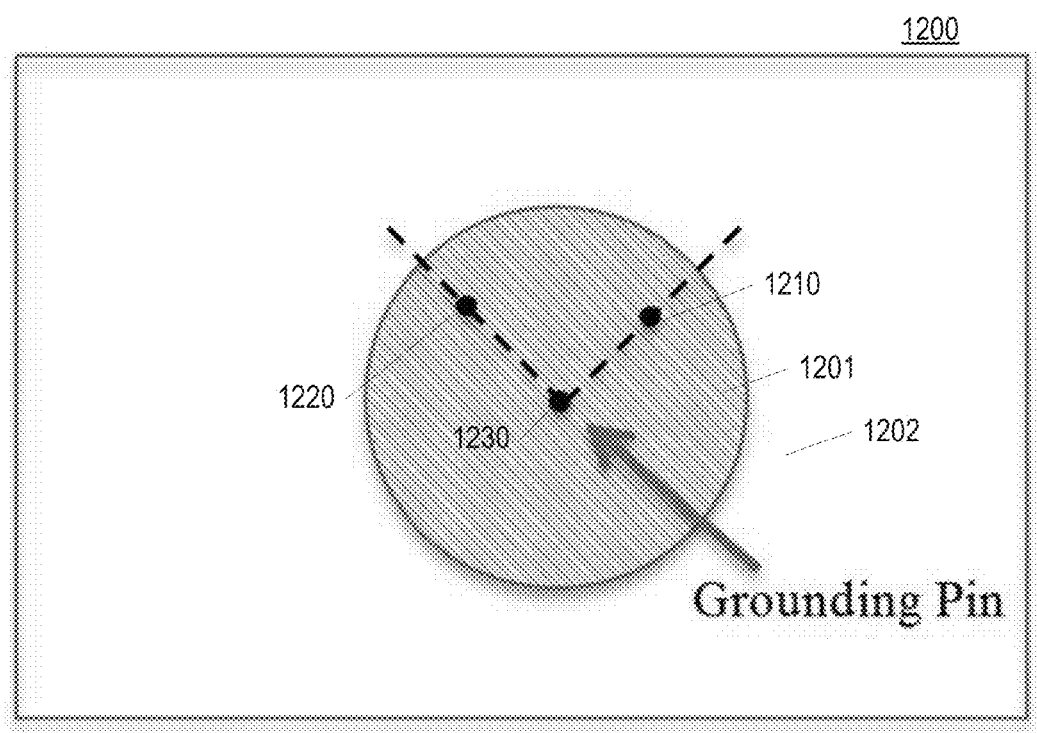
FIG. 12 is an exemplary diagram of a dual-polarity, two-port patch antenna element including feed and grounding points.

FIG. 12 illustrates a dual-polarity, two-port patch antenna element including feed and grounding points. The arrangement of FIG. 12 may be used as a component of the antenna arrays described herein for use within a receive or a transmit antenna panel. In FIG. 12, the dual-port design is based on a circular patch antenna 1200. In FIG. 12, two orthogonal modes are excited by two orthogonal probe feeds 1220 and

1210. Each mode excites linearly polarized far-field radiation. A shorting pin 1230 is provided in the center of the patch to suppress the DC-mode of the patch that would normally be the primary mechanism creating undesired coupling between the two ports. The construction is based on two microwave-grade PCBs: one is used as a ground-plane 1202 for the patch, and the other contains the etched circular patch 1201. The ground-plane PCB 4302 also provides micro strip feed structure to feeds 1220 and 1210.

Figure 13A:
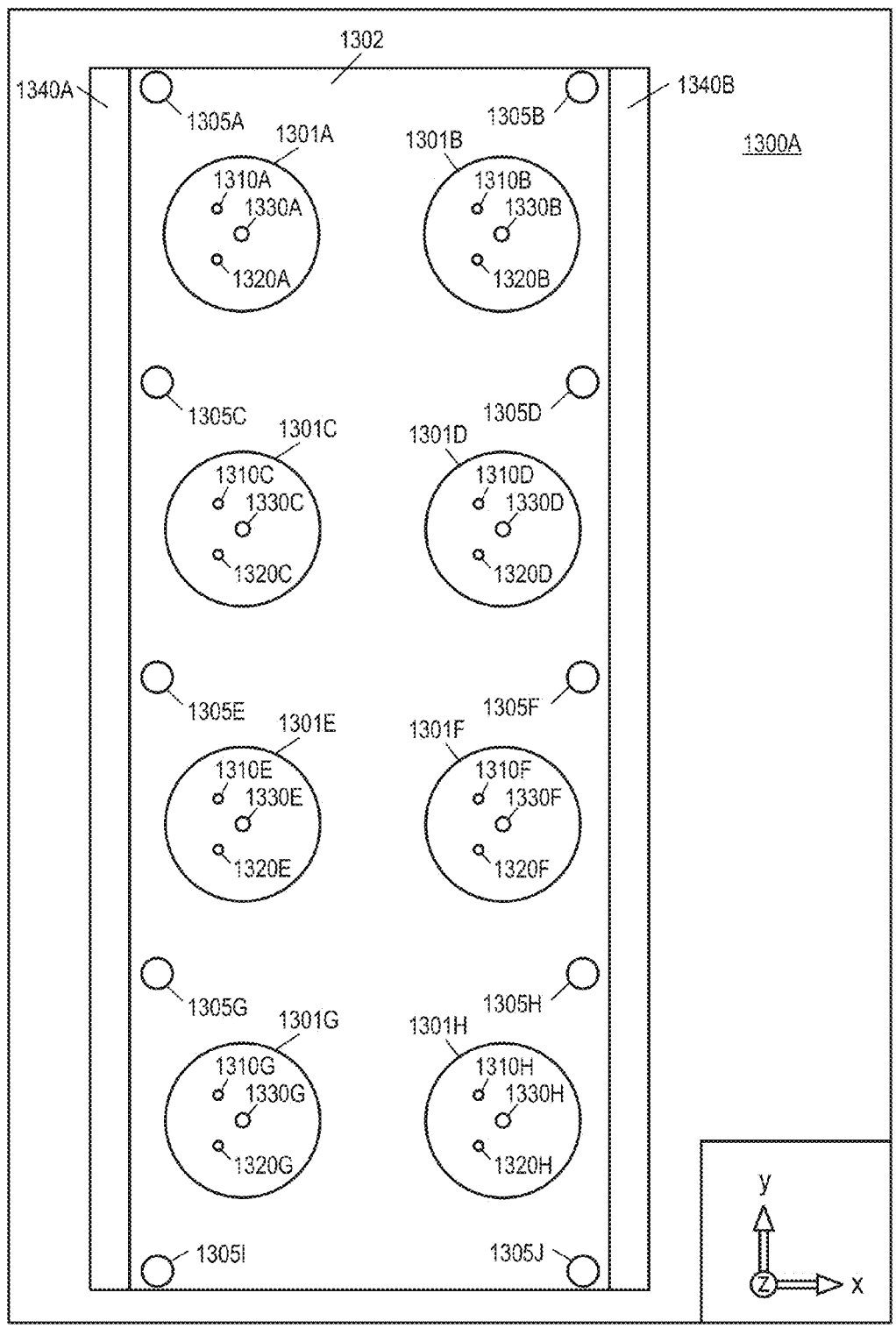
FIG. 13A is an exemplary diagram of a front view of a dual-polarity, two port, patch antenna array.
Figure 13B:
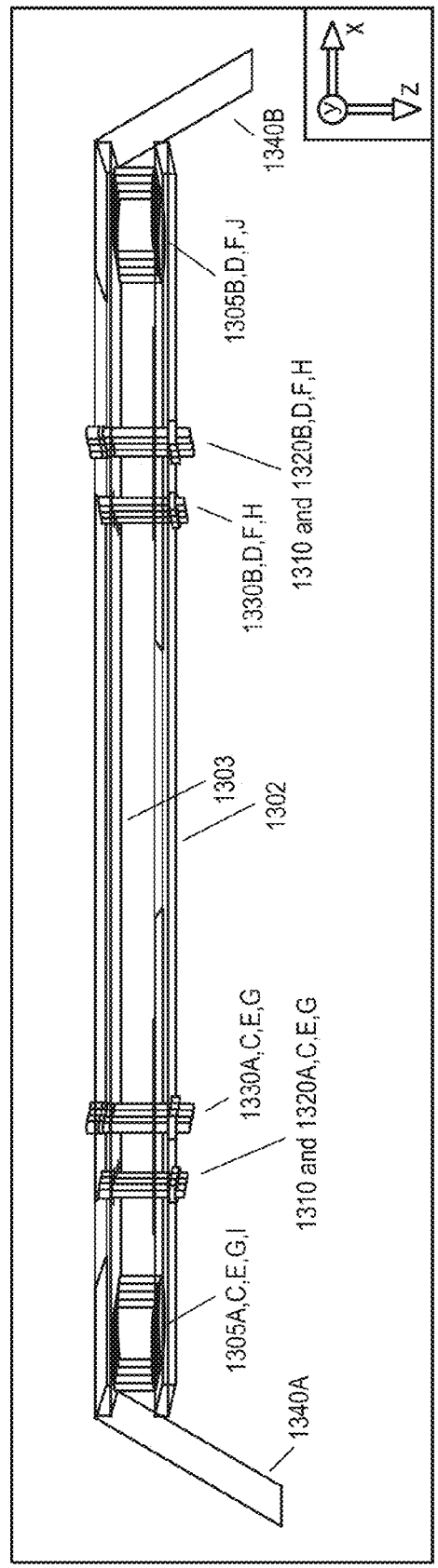
FIG. 13B is an exemplary diagram of a side view of a dual-polarity, two port, patch antenna array.

FIG. 13A and FIG. 13B illustrate an exemplary dual-polarity, two port, patch antenna array. The antenna array includes etched patch antenna elements 1301A-H. In FIGS. 13A and 13B, the antenna elements 1301A-H include patch 1201. A shared patch array ground plane 1302, which corresponds to the ground plane 1202, is provided for each patch element. Each patch element 1301A-H includes a two port antenna element utilizing orthogonal polarization modes. In one embodiment, feeds 1310A-H are provided for a first polarization, and feeds 1320A-H are provided for the second polarization.

In some embodiments, the collective patch antenna array 1300A provides for a collective two port interface and provides for a common micro strip cooperate feed network integrated with the ground plane 1303 PCB. For example, a first port feeds each of the same polarization feeds 1310A-H providing for a polarized sub-array of array 1300A, while a second port feeds each of the other same polarization feeds 4420A-H providing for the other polarized sub-array. In some embodiments, a micro strip cooperative feed network is provided for each polarization to have a common delay from each array port to each of the respective polarization feeds to achieve a desired array factor, and, in turn, a desired array far-field pattern. In yet further embodiments, variations on the relative array port to polarization feeds are provided to achieve various modified antenna patterns such as a modified beam width, side lobe levels, or the like.

In some embodiments, the antenna array also includes a grounded fence structure 1340A and 1340B which provides advantages relating to improved azimuthal array gain directivity, and side lobe levels, as well as potentially improved near field isolation from other additional antenna structures. In some embodiments, the antenna array includes supporting structures 1305A-J to provide structural support of printed patch PCB 1302 from ground plane 1303 PCB. It will be appreciated that the patch array 1300A may be used in the receive or transmit panels of FIG. 10 and FIG. 11, as well as other embodiments disclosed herein.

Figure 14:
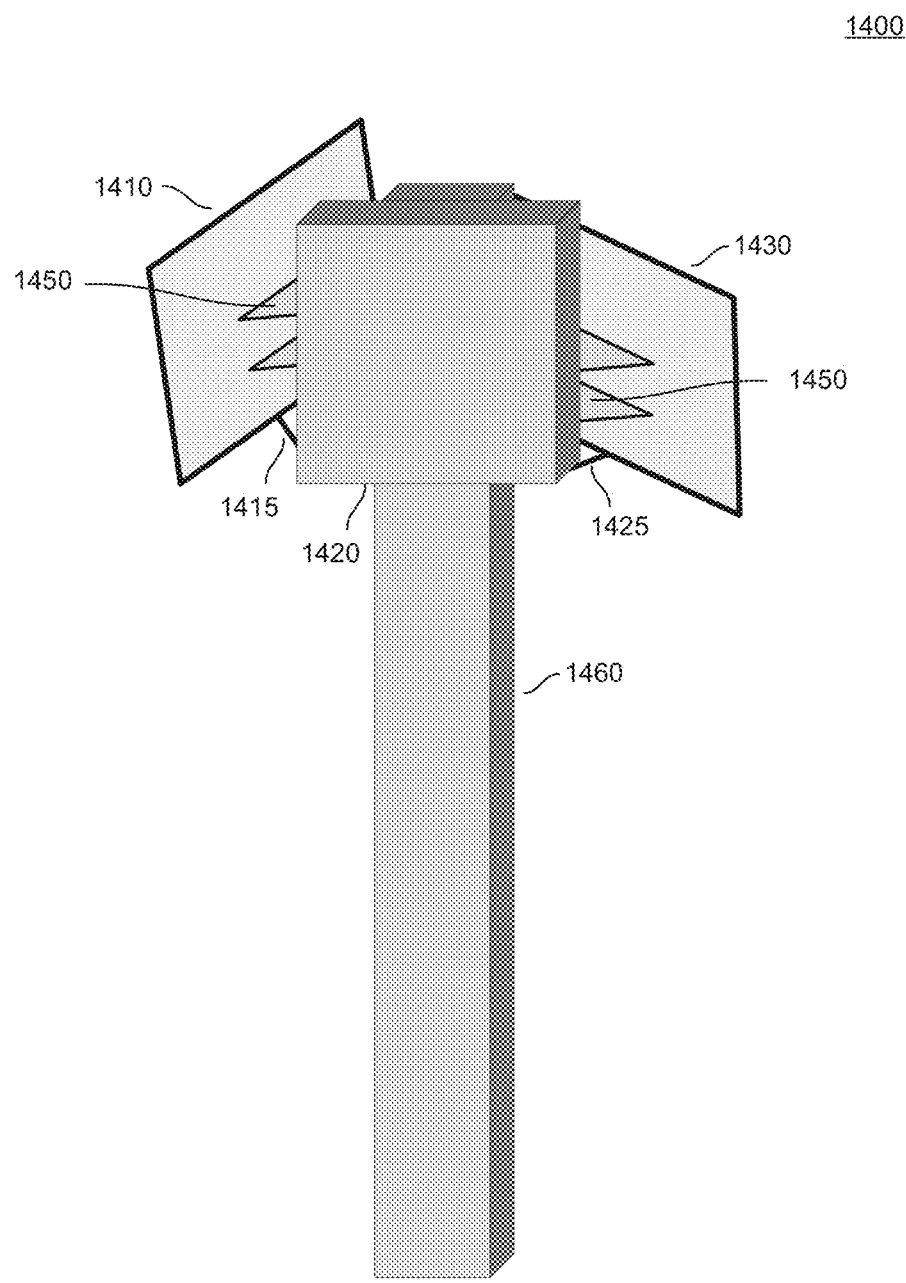
FIG. 14 is an illustration of an ECHO device according to one embodiment of the invention.

FIG. 14 is an illustration of an ECHO device according to one embodiment of the invention corresponding to embodiments depicted in FIG. 8F. ECHO device enclosure 1420 and the associated antenna structures of the instant embodiment correspond to embodiments depicted in FIG. 8F including ECHO device 800F.

Antenna panel structure 1410, in the instant embodiment, acts as a receive antenna array and includes a single dual-polarity, two port, patch antenna array 1300A of FIG. 13A, where each port corresponds to a respective port of antenna structures 803F-1 and 803F-2 of FIG. 8F.

Antenna panel structure 1430 in the instant embodiment acts as a transmit antenna array and includes a single dual-polarity, two port, patch antenna array 1300A of FIG. 13A, where each port corresponds to a respective port of antenna structures 803F-4 and 803F-3 of FIG. 8F.

Antenna panel structures 1410 and 1430 are mounted to pole 1460 utilizing mounting brackets 1450. Mounting brackets 1450, in the current embodiment provide for manual mechanical articulation in elevation and azimuth for antenna pattern alignment with the signal source transmitter or target signal destination receiver, and for the minimization of mutual coupling between antenna panel structures 1410 and 1430, as well as other factors. Alternative embodiments may provide for an electromechanically adjustment of such brackets utilizing stepper motors, positioners, or the like as known to one of ordinary skill in the art. The control of such electromechanical adjustments may be provided by the ECHO device itself, or by a remote management entity utilizing wired or wireless communication links such as a GPRS module. Additionally, such a GPRS module or the equivalent may be utilized for any of the control communications for the ECHO device as an alternative to a portion or all the communication provided by the composite control channel disclosed previously.

Pole 1460 may be a preexisting pole such as a power pole, a streetlight, or the like. Alternatively, pole 1460 may be installed specifically for the mounting of the ECHO device and associated antenna structures and brackets.

The cable assembly 1415 provides for the coupling of receive signals from antenna panel structure 1410 to the ECHO device structure 1420, such coupling providing for two signal paths for the dual polarized antenna panel 1300A in the current embodiment. Likewise, the cable assembly 1425 provides for the coupling of transmit signals from the ECHO device enclosure 1420 to the antenna panel structure 1430, such coupling providing for two signal paths for the dual polarized antenna panel 1300A in the current embodiment.

In alternative embodiments more than a single dual polarized antenna panel 1300A may be included in one or more of the antenna panel structures 1410 and 1430, providing for additional RF ports and signal paths to and/or from ECHO device enclosure 1420, via cable assemblies 1415 and 1425. In addition, alternative antenna structures may be used in substitution or in addition to one or more of the individual dual polarized antenna panels 1300A, including within one or more antenna panel structures 1410 and 1430. In yet further embodiments, additional antenna ports interfacing to the ECHO device enclosure may be provided by additional antenna panel structures for more receive inputs or transmit outputs. One such embodiment corresponds to the arrangement of 800G of FIG. 8G providing for FDD ECHO operation.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

The term "computer-readable medium" should be taken to include a single medium or multiple media that store the one or more sets of instructions. The term "computer-readable medium" shall also be taken to include any medium that is capable of storing, encoding or carrying a set of instructions for execution by a machine and that cause a machine to perform any one or more of the methodologies of the present invention. The term "computer-readable medium" shall accordingly be taken to include, but not be limited to, solid-state memories, and optical and magnetic media.

Embodiments of the invention have been described through functional modules at times, which are defined by executable instructions recorded on computer readable media which cause a computer, microprocessors or chipsets to perform method steps when executed. The modules have been segregated by function for the sake of clarity. However, it should be understood that the modules need not correspond to discreet blocks of code and the described functions can be carried out by the execution of various code portions stored on various media and executed at various times.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The invention has been described in relation to particular examples, which are intended in all respects to be illustrative rather than restrictive. Those skilled in the art will appreciate that many different combinations of hardware, software, and firmware will be suitable for practicing the present invention. Various aspects and/or components of the described embodiments may be used singly or in any combination. It is intended that the specification and examples be considered as exemplary only, with a true scope and spirit of the invention being indicated by the claims.

What is claimed is:

1. A first radio comprising:
a plurality of combiners each respective combiner for linearly combining at least one of a plurality of first information streams with one or more associated first control signals to provide a respective combined transmission signal wherein at least one of the one or more associated first control signals is a spread spectrum signal;
a plurality of transmitter antennas each for simultaneously transmitting at least one respective combined transmission signal; and
at least one receiver for receiving control information from a second radio wherein the control information is usable to adjust one or more parameters at the first radio to enhance or prevent degradation to at least one performance characteristic of at least one of the first radio and the second radio and wherein the control information is based upon a reception of at least one of the one or more associated first control signals at the second radio.

2. The first radio of claim 1, wherein each respective combiner is further for linearly combining a unique one of the plurality of first information streams with a unique one of the one or more associated first control signals to provide the respective combined transmission signal.

3. The first radio of claim 1, wherein each respective combiner is further for linearly combining at least two of the plurality of first information streams with a unique one of the one or more associated first control signals to provide the respective combined transmission signal.

4. The first radio of claim 1, wherein each respective combiner linearly combines at least one of the plurality of first information streams with one or more associated first control signals simultaneously in time such that the one or more associated first control signals are embedded within the respective combined transmission signal at a same time as at least one or more of a set of symbols associated with at least one of the plurality of first information streams.

5. The first radio of claim 1, wherein each of the one or more associated first control signals comprises a signature signal.

6. The first radio of claim 1, wherein each of the one or more associated first control signals comprises a unique signature signal.

7. The first radio of claim 1, wherein a power level for each of the one or more associated first control signals within the respective combined transmission signal is set so as to not interfere with a demodulation of the at least one of the plurality of first information streams within the respective combined transmission signal at a receiving radio.

8. The first radio of claim 1, wherein each of the respective combined transmission signals is usable at one or more receiving radios for detecting a transmission from the first radio and wherein said detecting does not require demodulation of any of the plurality of first information streams at any one of the one or more receiving radios.

9. The first radio of claim 1, wherein each respective one of the plurality of transmitter antennas simultaneously transmits a unique respective combined transmission signal.

10. The first radio of claim 1, wherein at least one of the one or more associated first control signals that is a spread spectrum signal comprises or more of the following:
a PN code,
a Gold code,
a Walsh code,
Walsh Hadamard code,
an orthogonal code,
a CAZAC code,
a Zadoff-Chu code,
a maximal length "M" code,
a Golay Code,
a code for use as a phase reference,
a code for use as a amplitude reference,
a code for using to derive timing synchronization,
a pilot channel code for synchronization and as a phase and amplitude reference for demodulation.

11. The first radio of claim 1, wherein the received control information from the second radio is derived by the second radio without a use of demodulated information from the plurality of first information streams.

12. The first radio of claim 1, wherein the one or more parameters at the first radio comprise one or more of the following:
digital transmit beam former weights settings or parameters,
digital receive beam former weights settings or parameters,
phased array weights settings or parameters
gain of receive or transmit beam former parameters,
alignment of transmit or receive antenna elements,
electromechanical adjustments of antennas,
interference cancellation parameters
frequency tracking parameters,
timing tracking parameters,
receive antenna polarization related parameters,
transmit antenna polarization related parameters,
channel bandwidth,
operating frequencies,
antenna selection settings,
transmit power levels of one or more first information streams,
transmit power levels of one or more first control signals,
transmit power levels of one or more first information streams based upon reception of one or more first control signals.

13. The first radio of claim 1, wherein the at least one performance characteristic of at least one of the first radio and the second radio further comprises one or more of the following: Signal to noise ratio (SNR), C/I, Io, Es, Ec, Ec/Io, Es/Io, Modulation and Coding Scheme (MCS), bit rate, RSSI, modulation, forward error correction (FEC), interference level.

14. The first radio of claim 1, wherein the adjustment of parameters includes a change to a signal level of one of the plurality of the first information streams as received at the second radio.

15. The first radio of claim 1, wherein the at least one performance characteristic of at least one of the first radio and the second radio further comprises one or more of the following:
- at least one performance characteristic of each of the first radio and the second radio;
- at least one performance characteristic of the first radio and no performance characteristics of the second radio;
- at least one performance characteristic of the second radio and no performance characteristics of the first radio.

16. A wireless communication system comprising:
a first radio comprising:
- a plurality of combiners each respective combiner for linearly combining at least one of a plurality of first information streams with one or more associated first control signals to provide a respective combined transmission signal wherein at least one of the one or more associated first control signals is a spread spectrum signal;
- a plurality of transmitter antennas each for simultaneously transmitting at least one respective combined transmission signal; and a second radio comprising:
- at least one receiver for receiving control information from at least one of the one or more associated first control signals wherein the control information is usable to adjust one or more parameters at either of the first radio or the second radio to enhance or prevent degradation to at least one performance characteristic of at least one of the first radio and the second radio.

17. The wireless communication system of claim 16, wherein each respective combiner is further for linearly combining a unique one of the plurality of first information streams with a unique one of the one or more associated first control signals to provide the respective combined transmission signal.

18. The wireless communication system of claim 16, wherein each respective combiner is further for linearly combining at least two of the plurality of first information streams with a unique one of the one or more associated first control signals to provide the respective combined transmission signal.

19. The wireless communication system of claim 16, wherein each respective combiner linearly combines at least one of the plurality of first information streams with one or more associated first control signals simultaneously in time such that the one or more associated first control signals are embedded within the respective combined transmission signal at a same time as at least one or more of a set of symbols associated with at least one of the plurality of first information streams.

20. The wireless communication system of claim 16, wherein each of the one or more associated first control signals comprises a signature signal.

21. The wireless communication system of claim 16, wherein each of the one or more associated first control signals comprises a unique signature signal.

22. The wireless communication system of claim 16, wherein a power level for each of the one or more associated first control signals within the respective combined transmission signal is set so as to not interfere with a demodulation of the at least one of the plurality of first information streams within the respective combined transmission signal at a receiving radio.

23. The wireless communication system of claim 16, wherein each of the respective combined transmission signals is usable at one or more receiving radios for detecting a transmission from the first radio and wherein said detecting does not require demodulation of any of the plurality of first information streams at any one of the one or more receiving radios.

24. The wireless communication system of claim 16, wherein each respective one of the plurality of transmitter antennas simultaneously transmits a unique respective combined transmission signal.

25. The wireless communication system of claim 16, wherein at least one of the one or more associated first control signals that is a spread spectrum signal comprises or more of the following:
- a PN code,
- a Gold code,
- a Walsh code,
- Walsh Hadamard code,
- an orthogonal code,
- a CAZAC code,
- a Zadoff-Chu code,
- a maximal length "M" code,
- a Golay Code,
- a code for use as a phase reference,
- a code for use as a amplitude reference,
- a code for using to derive timing synchronization,
- a pilot channel code for synchronization and as a phase and amplitude, reference for demodulation.

26. The wireless communication system of claim 16 wherein the received control information from the second radio is derived by the second radio without a use of demodulated information from the plurality of first information streams.

27. The wireless communication system of claim 16, wherein the one or more parameters at the first radio comprise one or more of the following:
- digital transmit beam former weights settings or parameters,
- digital receive beam former weights settings or parameters,
- phased array weights settings or parameters
- gain of receive or transmit beam former parameters,
- alignment of transmit or receive antenna elements,
- electromechanical adjustments of antennas,
- interference cancellation parameters,
- frequency tracking parameters,
- timing tracking parameters,
- receive antenna polarization related parameters,
- transmit antenna polarization related parameters,
- channel bandwidth,
- operating frequencies,
- antenna selection settings,
- transmit power levels of one or more first information streams,
- transmit power levels of one or more first control signals,
- transmit power levels of one or more first information streams based upon reception of one or more first control signals.

28. The wireless communication system of claim 16, wherein the at least one performance characteristic of at least one of the first radio and the second radio further comprises one or more of the following: Signal to noise ratio (SNR), C/I, Io, Es, Ec, Ec/Io, Es/Io, Modulation and Coding Scheme (MCS), bit rate RSSI modulation forward error correction (FEC), interference level.

29. The wireless communication system of claim 16, wherein the adjustment of parameters includes a change to a signal level of one of the plurality of the first information streams as received at the second radio.

30. The wireless communication system of claim 16, wherein the at least one performance characteristic of at least one of the first radio and the second radio further comprises one or more of the following:
- at least one performance characteristic of each of the first radio and the second radio;
- at least one performance characteristic of the first radio and no performance characteristics of the second radio;
- at least one performance characteristic of the second radio and no performance characteristics of the first radio.

* * * * *